United States Patent
Kang et al.

(10) Patent No.: US 8,966,401 B2
(45) Date of Patent: Feb. 24, 2015

(54) ELECTRONIC DEVICE AND METHODS OF SENDING INFORMATION WITH THE ELECTRONIC DEVICE, CONTROLLING THE ELECTRONIC DEVICE, AND TRANSMITTING AND RECEIVING INFORMATION IN AN INFORMATION SYSTEM

(75) Inventors: Minhun Kang, Seoul (KR); Mijun Yoo, Seoul (KR); Yuonui Chong, Seoul (KR); Hyoni Kim, Seoul (KR); Minjoo Kim, Seoul (KR); Youri Shin, Seoul (KR); Yooseok Cho, Seoul (KR); Uniyoung Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 400 days.

(21) Appl. No.: 13/092,863

(22) Filed: Apr. 22, 2011

(65) Prior Publication Data

US 2011/0268218 A1 Nov. 3, 2011

(30) Foreign Application Priority Data

May 3, 2010 (KR) .......................... 10-2010-0041561
May 13, 2010 (KR) .......................... 10-2010-0044836

(51) Int. Cl.
*G06F 3/048* (2013.01)
*H04N 5/445* (2011.01)
(Continued)

(52) U.S. Cl.
CPC .......... *H04N 5/44543* (2013.01); *G06F 3/0482* (2013.01); *G06F 3/0486* (2013.01);
(Continued)

(58) Field of Classification Search
CPC ... G06F 3/1423; G06F 3/1431; G06F 3/1438;
G06F 3/1454; G06F 3/04815; G06F 3/0486;
G06F 3/14; G06F 3/0481; G06F 3/0482;
G06F 3/04845; G06F 3/0488
USPC ................. 715/848, 850, 782, 798, 799, 800;
709/217; 714/43
See application file for complete search history.

(56) References Cited

U.S. PATENT DOCUMENTS 5,745,109 A * 4/1998 Nakano et al. ................. 715/838
6,002,403 A * 12/1999 Sugiyama et al. ............. 715/717
(Continued)

FOREIGN PATENT DOCUMENTS

CN 1207225 2/1999
CN 101035057 9/2007
(Continued)

OTHER PUBLICATIONS

The State Intellectual Property Office of the People's Republic of China Application Serial No. 201110114882.0, Office Action dated Apr. 16, 2013, 8 pages.

*Primary Examiner* — Weilun Lo
*Assistant Examiner* — Rashedul Hassan
(74) *Attorney, Agent, or Firm* — Lee, Hong, Degerman, Kang & Waimey

(57) ABSTRACT

An electronic device includes a display unit, a communication unit communicating with one or more external electronic devices, and a controller controlling a display unit to display information about the one or more external electronic devices in a first region, corresponding to a first side of a plurality of sides of the display unit, and displaying detailed information related to an image, displayed in a middle region of the display unit, in a second region corresponding to a second side different from the first side from among the plurality of sides.

13 Claims, 48 Drawing Sheets

(51) Int. Cl.
  *G06F 3/0482* (2013.01)
  *G06F 3/0486* (2013.01)
  *G06F 3/0488* (2013.01)
  *H04N 21/482* (2011.01)
  *H04N 21/485* (2011.01)
  *H04N 21/422* (2011.01)
  *H04N 21/431* (2011.01)
  *H04N 21/4363* (2011.01)
  *H04N 21/442* (2011.01)
  *H04N 21/462* (2011.01)
  *H04N 21/4782* (2011.01)
  *H04N 21/488* (2011.01)
  *H04N 21/4788* (2011.01)
  *H04N 21/8405* (2011.01)
  *G09G 5/14* (2006.01)

(52) U.S. Cl.
  CPC .......... *G06F3/04886* (2013.01); *H04N 21/482* (2013.01); *H04N 21/485* (2013.01); *H04N 21/4222* (2013.01); *H04N 21/4316* (2013.01); *H04N 21/4363* (2013.01); *H04N 21/44227* (2013.01); *H04N 21/44231* (2013.01); *H04N 21/4622* (2013.01); *H04N 21/4782* (2013.01); *H04N 21/488* (2013.01); *H04N 21/4788* (2013.01); *H04N 21/8405* (2013.01); *G09G 5/14* (2013.01); *G09G 2370/16* (2013.01)
  USPC .......... 715/848; 715/761; 715/782; 715/850

(56) References Cited

U.S. PATENT DOCUMENTS

| | | | |
|---|---|---|---|
| 6,784,925 B1 * | 8/2004 | Tomat et al. | 348/207.11 |
| 7,460,134 B2 * | 12/2008 | Robertson et al. | 345/619 |
| 2003/0046335 A1 * | 3/2003 | Doyle et al. | 709/203 |
| 2003/0188322 A1 * | 10/2003 | Bontempi | 725/139 |
| 2004/0055018 A1 * | 3/2004 | Stone | 725/113 |
| 2004/0253991 A1 * | 12/2004 | Azuma | 455/566 |
| 2005/0022236 A1 * | 1/2005 | Ito et al. | 725/39 |
| 2005/0132299 A1 * | 6/2005 | Jones et al. | 715/759 |
| 2006/0031889 A1 * | 2/2006 | Bennett et al. | 725/80 |
| 2007/0192806 A1 * | 8/2007 | Park et al. | 725/80 |
| 2008/0001924 A1 * | 1/2008 | de los Reyes et al. | 345/173 |
| 2008/0295012 A1 * | 11/2008 | Sloo et al. | 715/769 |
| 2008/0311894 A1 | 12/2008 | Klein et al. | |
| 2010/0082784 A1 * | 4/2010 | Rosenblatt et al. | 709/222 |
| 2010/0257473 A1 * | 10/2010 | Kang | 715/769 |
| 2010/0262673 A1 * | 10/2010 | Chang et al. | 709/217 |
| 2011/0037851 A1 * | 2/2011 | Kim et al. | 348/143 |
| 2011/0088068 A1 * | 4/2011 | Patnoe et al. | 725/61 |
| 2011/0225330 A1 * | 9/2011 | Lavian et al. | 710/63 |
| 2012/0144416 A1 * | 6/2012 | Wetzer et al. | 725/14 |

FOREIGN PATENT DOCUMENTS

| | | |
|---|---|---|
| CN | 101466064 | 6/2009 |
| CN | 101588408 | 11/2009 |

* cited by examiner

FIG. 30

|  | Web address | ID | Password |
|---|---|---|---|
| 30a | www.google.com | aaa | 1234abc |
| 30b | www.lge.com |  |  |
| 30c | www.facebook.com | bbb | 1234abc |
| 30d | twitter.com | bbb | def5678 |

(columns labeled 30, 31, 32)

ELECTRONIC DEVICE AND METHODS OF SENDING INFORMATION WITH THE ELECTRONIC DEVICE, CONTROLLING THE ELECTRONIC DEVICE, AND TRANSMITTING AND RECEIVING INFORMATION IN AN INFORMATION SYSTEM

CROSS-REFERENCE TO RELATED APPLICATIONS

Pursuant to 35 U.S.C. §119(a), this application claims the benefit of earlier filing date and right of priority to Korean Patent Application Nos. 10-2010-0041561 filed on May 3, 2010, and 10-2010-0044836 filed on May 13, 2010, the contents of which are hereby incorporated by reference herein in their entirety.

FIELD OF THE INVENTION

This invention relates to electronic devices that communicate with each other, an information system including the electronic devices, a method of sending information from at least one of the electronic devices, a method of transmitting and receiving information within an information system, and a method of controlling the electronic devices and the information system.

DISCUSSION OF THE RELATED ART

With recent developments of hardware and software and the convergence of networks, electronic devices can communicate with each other in various ways. Moreover, the range of applications for the electronic devices has increased.

For this reason, a user-friendly user interface (UI) needs to be provided to electronic devices capable of communicating with other electronic devices. There is also a need for the development of various methods for efficiently controlling electronic devices so that a user can enjoy various content in a plurality of electronic devices at the same time (for example, three-screen play). Furthermore, in order to transmit and receive information between a plurality of electronic devices, there is a need for the development of technology that can send information more efficiently.

SUMMARY

An aspect of this invention is to provide electronic devices and a controlling method thereof, which are capable of providing a user-friendly user interface (UI) and efficiently controlling the electronic devices in a system environment that includes a plurality of electronic devices that can communicate with each other.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims thereof as well as the appended drawings.

To achieve these objects and other advantages and in accordance with the purpose of the invention, as embodied and broadly described herein, an electronic device according to the present invention includes a display unit having a plurality of sides and at least a first region corresponding to a first of the plurality of sides, a second region corresponding to a second of the plurality of sides and a middle region, a communication unit configured to communicate with one or more external electronic devices, and a controller configured to control the display unit to display information related to the one or more external electronic devices in the first region, to display an image in the middle region and to display detailed information related to the image in the second region, wherein the first region of the display unit corresponds to a first side of the plurality of sides, and wherein the second region of the display unit corresponds to a second side of the plurality of sides that is different from the first side.

In another aspect of the present invention, an electronic device includes a communication unit configured to communicate with an external electronic device, and a controller configured to receive, via the communication unit, information from the external electronic device and content from an external source, and to automatically perform an operation related to the received content in response to the received information, wherein the received information relates to the external source providing the content.

In a further aspect of the present invention, an electronic device includes a communication unit configured to transmit and receive information, and a controller configured to receive content from an external source via the communication unit, detect a communication failure while receiving the content, and to control the communication unit to transmit information related to the external source to an external electronic device.

In another aspect of the present invention, a method for controlling an electronic device includes receiving, from an external electronic device, via a communication unit, information related to an external source configured to provide content, and automatically performing, via a controller, an operation related to the content in response to the received information.

In a further aspect of the present invention, a method for transmitting information from an electronic device includes receiving, via a communication unit, content from an external source via a network, detecting, via a controller, a communication failure while receiving the content, and transmitting, via the communication unit, information related to the external source to an external electronic device upon detection of the communication failure.

In an additional aspect of the present invention, a method for transmitting and receiving information in an information system including a plurality of electronic devices capable of communicating with each other includes transmitting, via a first of the plurality of electronic devices to a second of the plurality of electronic devices, information related to an external source configured for providing content, receiving, via the second of the plurality of electronic devices, the information related to the external source, accessing, via the second of the plurality of electronic devices, the external source in response to the received information, and receiving, via the second of the plurality of electronic devices, the content from the external source.

It is to be understood that both the foregoing general description and the following detailed description of the present invention are exemplary and explanatory and are intended to provide further explanation of the invention as claimed.

BRIEF DESCRIPTION OF THE DRAWINGS

The accompany drawings, which are included to provide a further understanding of the invention and are incorporated in and constitute a part of this application, illustrate embodiments of this invention and together with the description serve to explain the principles of this invention.

FIGS. 29A to 29C and 30 are diagrams illustrating the method of an electronic device sending information according to the sixth embodiment of the invention.

DETAILED DESCRIPTION

Figure 1:
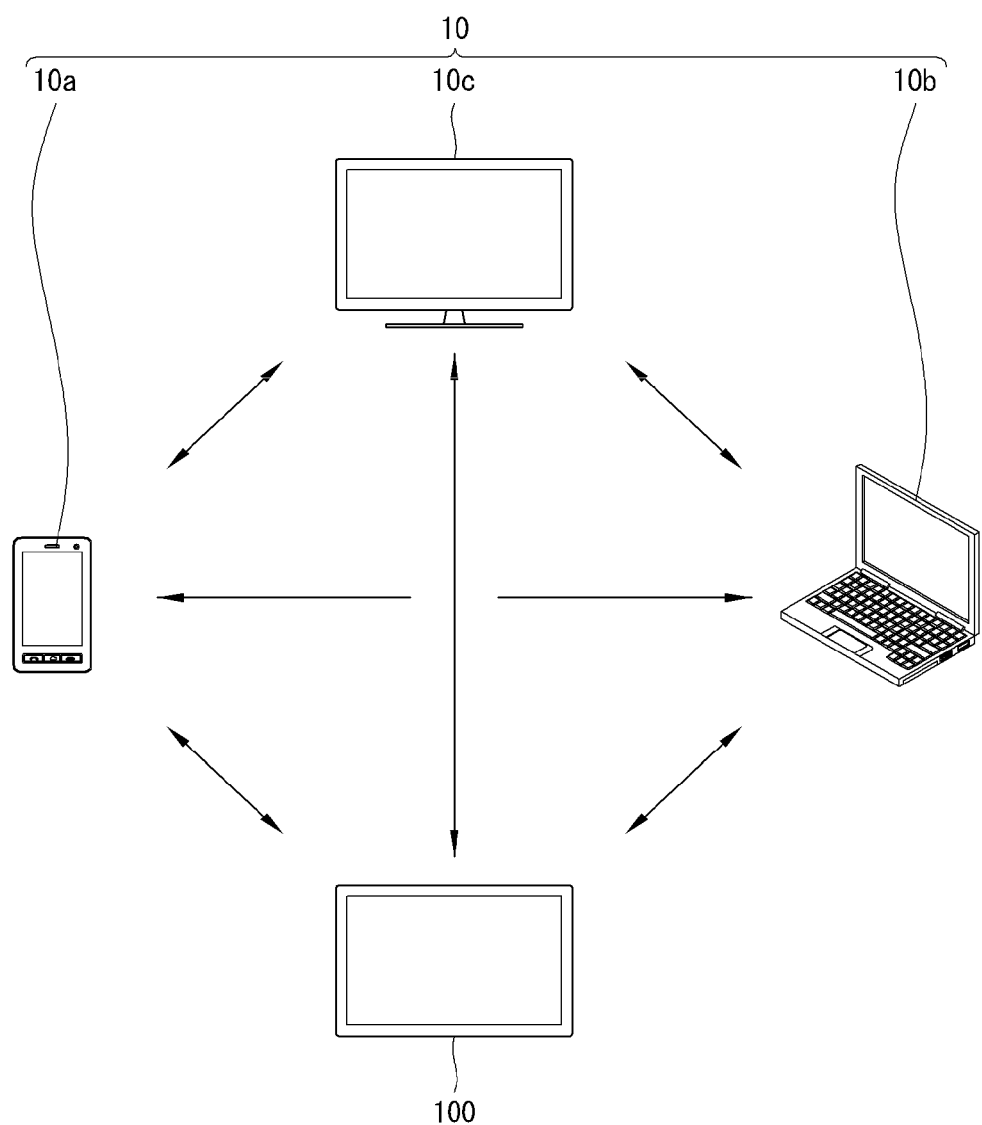
FIGS. 1 and 2 are schematic diagrams showing system environments to which the invention applies.

The above objects, characteristics, and merits of this invention will become more apparent from the following detailed description taken in conjunction with the accompanying drawings. Embodiments of this invention are described in detail with reference to the accompanying drawings. The same reference numerals are used to refer to the same elements throughout the drawings. Furthermore, detailed descriptions of known functions and/or constructions are omitted if they are deemed to make the substance of the invention unnecessarily vague.

Figure 2:
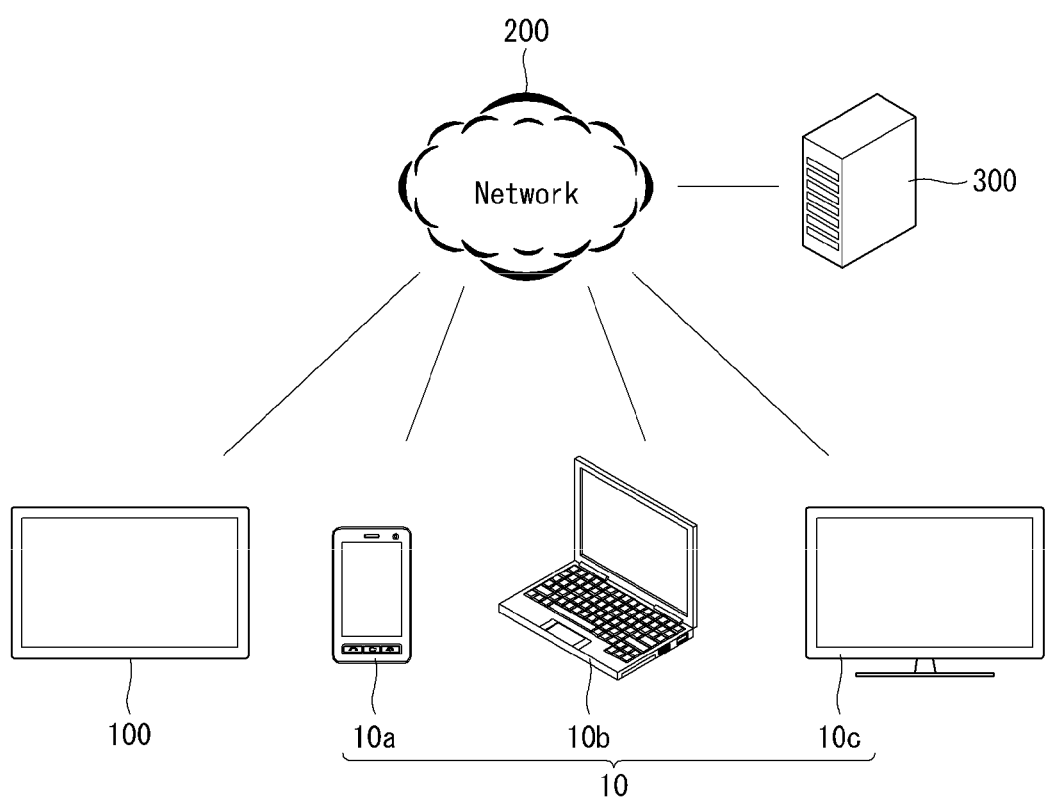

FIGS. 1 and 2 are schematic diagrams showing system environments to which the invention applies. Referring to FIGS. 1 and 2, the system environment to which the invention applies may include an electronic device 100 according to an embodiment of the invention, external electronic devices 10 separate from the electronic device 100, a network 200, and a server 300 existing on the network 200. The external electronic devices 10 may include a first external electronic device 10*a*, a second external electronic device 10*b* and a third external electronic device 10*c*. The electronic device 100 and the external electronic devices 10, as shown in FIG. 1, can communicate with each other through a wireless or wired communication method.

Communication between the electronic device 100 and the external electronic devices 10 is not limited to a specific method. This invention may be applied to all existing wireless communication methods between electronic devices and all future communication methods.

For example, the electronic device 100 and the external electronic devices 10 can communicate with each other according to known communication methods, such as UPnP®, DLNA® and WiFi®. Furthermore, for example, the electronic device 100 and the external electronic devices 10 can communicate with each other via a short-range communication method.

As shown in FIG. 2, each of the electronic device 100 and the external electronic devices 10 can communicate over a network 200. For example, the electronic device 100 and the external electronic devices 10 can receive multimedia content from a server 300 existing on the network 200. The network 200 includes, for example, a mobile communication network, wired Internet, wireless Internet or a broadcasting network.

The electronic device 100 and the external electronic devices 10 may be fixed terminals or mobile terminals. For example, any of the electronic device 100 and the external electronic devices 10 can comprise a portable phone, a smart phone, a personal computer, a laptop computer, a terminal for digital broadcasting, a Personal Digital Assistants (PDA), a Portable Multimedia Player (PMP), a navigator, or a Mobile Internet Device (MID).

Figure 3:
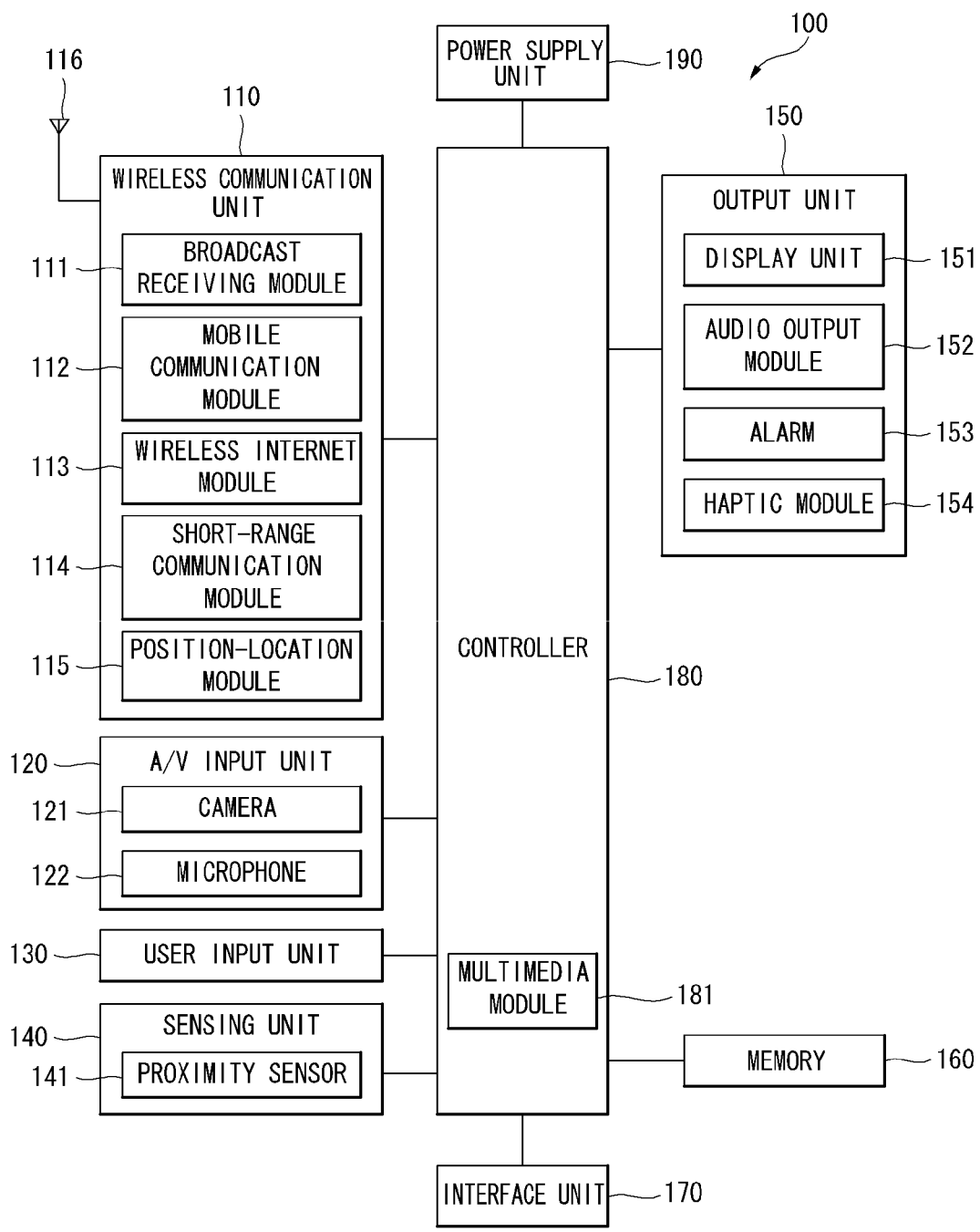
FIG. 3 is a block diagram of a mobile terminal according to an embodiment of the invention.

Referring to FIG. 3, a mobile terminal 100, as an example of the electronic device 100 related to this invention, is described in detail with reference to the accompanying drawings. FIG. 3 is a block diagram of the mobile terminal according to an embodiment of this invention. As used herein, the suffixes 'module' and 'unit' are used for elements in order to facilitate the disclosure only. Therefore, significant meanings or roles are not given to the suffixes themselves and it is understood that the 'module' and 'unit' can be used together or interchangeably.

Referring to FIG. 3, the mobile terminal 100 includes a wireless communication unit 110, an audio/video (A/V) input unit 120, a user input unit 130, a sensing unit 140, an output unit 150, a memory 160, an interface unit 170, a controller 180, and a power supply unit 190. Although FIG. 1 shows the mobile terminal 100 having various components, it is understood that implementing all of the illustrated components is not a requirement. More or fewer components may alternatively be implemented.

The wireless communication unit 110 includes one or more components that permit wireless communication between the mobile terminal 100 and a wireless communication system or a network within which the mobile terminal 100 is located. For example, the wireless communication unit 110 includes a broadcast receiving module 111, a mobile communication module 112, a wireless Internet module 113, a short-range communication module 114 and a position-location module 115. For non-mobile terminals, the wireless communication unit 110 may be replaced with a wired communication unit. The wireless communication unit 110 and the wired communication unit may be commonly referred to as a communication unit.

The broadcast receiving module 111 receives a broadcast signal and/or broadcast associated information from an external broadcast managing entity via a broadcast channel. The broadcast channel may include a satellite channel and/or a terrestrial channel.

The broadcast managing entity may refer to a system that transmits a broadcast signal and/or broadcast associated information. The broadcast managing entity may be a server that generates and transmits broadcast signals and/or broadcast associated information or a server for receiving previously generated broadcast signals and/or broadcast-related information and transmitting the broadcast signals and/or the broadcast associated information to the mobile terminal 100. The broadcast signals may include not only TV broadcast signals, radio broadcast signals, and data broadcast signals, but also signals in the form of a TV broadcast signal combined with a radio broadcast signal.

The broadcast associated information may be information about a broadcast channel, a broadcast program, or a broadcast service provider. The broadcast associated information may even be provided over a mobile communication network. In the latter case, the broadcast associated information may be received via the mobile communication module 112. Examples of broadcast associated information include an electronic program guide (EPG) of digital multimedia broadcasting (DMB) and an electronic service guide (ESG) of digital video broadcast-handheld (DVB-H).

The broadcast receiving module 111 may receive broadcast signals transmitted from various types of broadcast systems. As a non-limiting example, the broadcast systems include digital multimedia broadcasting-terrestrial (DMB-T), digital multimedia broadcasting-satellite (DMB-S), digital video broadcast-handheld (DVB-H), a data broadcasting system known as media forward link only (MediaFLO®) and integrated services digital broadcast-terrestrial (ISDB-T). The broadcast receiving module 111 may also receive multicast signals. The broadcast signals and/or the broadcast associated information received by the broadcast receiving module 111 may be stored in a suitable storage device, such as in the memory 160.

The mobile communication module 112 transmits/receives wireless signals to/from at least one of a base station, an external terminal or a server over a mobile communication network. The wireless signals may represent, for example, voice call signals, video telephony call signals or data in various forms according to the transmission/reception of text and/or multimedia messages.

The wireless Internet module 113 supports Internet access for the mobile terminal 100. This wireless Internet module 113 may be internally or externally coupled to the mobile terminal 100. Suitable technologies for wireless Internet include, but are not limited to, WLAN (Wireless LAN), Wi-Fi®, Wibro® (Wireless broadband), Wimax® (World Interoperability for Microwave Access), and HSDPA (High Speed Downlink Packet Access). The wireless Internet module 113 may be replaced with a wired Internet module in non-mobile terminals. The wireless Internet module 113 and the wired Internet module may be commonly referred to as an Internet module.

The short-range communication module 114 facilitates relatively short-range communications. Suitable technologies for short-range communication include, but are not limited to, radio frequency identification (RFID), infrared data association (IrDA), ultra-wideband (UWB), as well as networking technologies such as Bluetooth® and ZigBee®.

The position-location module 115 identifies or otherwise obtains a location of the mobile terminal 100. The position-location module 115 may obtain position information by using a global navigation satellite system (GNSS). The GNSS is a term used to describe radio navigation satellite systems configured to send reference signals capable of determining their positions on the surface of the earth or near the surface of the earth while revolving around the earth. The GNSS includes: a global position system (GPS) operated by the U.S.A.; Galileo, operated by Europe; a global orbiting navigational satellite system (GLONASS) operated by Russia; COMPASS, operated by China; and a quasi-zenith satellite system (QZSS) operated by Japan.

As a typical example of the GNSS, the position-location module 115 is a GPS module. The position-location module 115 may calculate information related to distances between one point or object and at least three satellites and information related to the time when the distance information was measured and apply trigonometry to the obtained distance information to obtain three-dimensional position information on the point or object according to the latitude, longitude, and altitude at a predetermined time. Furthermore, a method of calculating position and time information using three satellites and correcting the calculated position and time information using another satellite may also used. The position-location module 115 continues to calculate a current position in real time and to calculate velocity information based on the position information.

With continued reference to FIG. 3, the audio/video (A/V) input unit 120 may be configured to provide audio or video signal input to the mobile terminal 100. The A/V input unit 120 may include a camera 121 and a microphone 122. The camera 121 processes image frames of still pictures or video obtained by an image sensor in a photographing mode or a video telephony mode. The processed image frames may be displayed on a display unit 151.

The image frames processed by the camera 121 may be stored in the memory 160 or transmitted to an external device through the wireless communication unit 110. Optionally, the mobile terminal 100 can include two or more cameras 121, if appropriate.

The microphone 122 receives an external audio signal while the mobile terminal 100 is in a particular mode, such as a phone call mode, a recording mode and/or a voice recognition mode. The received audio signal is processed and converted into digital data. In the call mode, the processed digital data is transformed into a format transmittable to a mobile communication base station via the mobile communication module 112 and then output. Furthermore, the mobile terminal 100, and in particular the A/V input unit 120, may include a noise removing algorithm to remove noise generated in the course of receiving the external audio signal.

The user input unit 130 generates input data in response to user manipulation of an associated input device or devices. Examples of such devices include a keypad, a dome switch, a touchpad (e.g., static pressure/capacitance), a jog wheel and a jog switch. A specific example of the user input unit 130 is a touch screen in which a touchpad is combined with a display, as will be described below.

The sensing unit 140 provides status measurements of various aspects of the mobile terminal 100. For example, the sensing unit 140 may detect an open/closed status of the mobile terminal 100, relative positioning of components (e.g., a display and a keypad) of the mobile terminal 100, a change of position of the mobile terminal 100 or a component of the mobile terminal 100, a presence or absence of user contact with the mobile terminal 100, an orientation of the mobile terminal 100 and/or acceleration/deceleration of the mobile terminal 100.

As an example, the mobile terminal 100 may be configured as a slide-type mobile terminal in which the sensing unit 140 may sense whether a sliding portion of the mobile terminal 100 is open or closed. The sensing unit 140 may also sense presence or absence of power provided by the power supply unit 190 or the presence or absence of a coupling or other connection between the interface unit 170 and an external device.

The output unit 150 generates output relevant to the senses of sight, hearing and touch. The output unit 150 may include a display unit 151, an audio output module 152, an alarm 153, and a haptic module 154.

The display unit 151 displays information processed by the mobile terminal 100. For example, when the mobile terminal 100 is in a call mode, the display unit 151 may display a user interface (UI) or a graphic user interface (GUI) associated with the call. If the mobile terminal 100 is in a video communication mode or a photograph mode, the display unit 151 may display a photographed and/or received picture, a UI or a GUI.

The display unit 151 may include a liquid crystal display (LCD), a thin film transistor liquid crystal display (TFT LCD), an organic light-emitting diode (OLED), a flexible display, or a 3-dimensional display. The mobile terminal 100 may include one or more of such displays.

The display unit 151 may have a transparent or light-transmittive type configuration, hereinafter referred to as a transparent display. A transparent OLED (TOLED) is an example of a transparent display. A rear configuration of the display unit 151 may also have the light-transmittive type configuration. In this configuration, a user is able to see an object located behind the terminal body via the area occupied by the display unit 151 of the terminal body.

At least two display units 151 may be provided. For example, a plurality of display units 151 may be provided on a single face of the mobile terminal 100 spaced apart from each other or built in one body. Alternatively, each of a plurality of display units 151 may be provided on different faces of the mobile terminal 100.

If the display unit 151 and a sensor for detecting a touch action (hereafter referred to as a 'touch sensor') are constructed in a mutual-layered structure (hereafter referred to as a 'touch screen'), the display unit 151 may be used as an input device and an output device. For example, the touch sensor may include a touch film, a touch sheet or a touchpad.

The touch sensor can be configured to convert a pressure applied to a specific portion of the display unit 151 or a variation of electrostatic capacity generated from a specific portion of the display unit 151 to an electric input signal. The touch sensor may detect a pressure of a touch as well as a touched position or magnitude of the touch.

If a touch input is made to the touch sensor, a signal(s) corresponding to the touch input is transferred to a touch controller (not shown). The touch controller processes the signal(s) and then transfers corresponding data to the controller 180. The controller 180 may determine, therefore, which portion of the display unit 151 is touched.

With continued reference to FIG. 3, a proximity sensor 141 can be provided within the mobile terminal 100 enclosed by the touch screen or around the touch screen. The proximity sensor 141 may detect a presence or non-presence of an object approaching a specific detecting surface or an object existing around the proximity sensor 141 using an electromagnetic field strength or infrared ray without mechanical contact. Accordingly, the proximity sensor 141 may have greater durability and greater utility than a contact type sensor.

The proximity sensor 141 can include a transmittive photoelectric sensor, a direct reflective photoelectric sensor, a mirror reflective photoelectric sensor, a radio frequency oscillation proximity sensor, an electrostatic capacity proximity sensor, a magnetic proximity sensor or an infrared proximity sensor. If the touch screen is an electrostatic type touch screen, the proximity sensor 141 may detect proximity of a pointer using a variation of an electric field according to the proximity of the pointer and the touch screen (touch sensor) may be classified as the proximity sensor 141.

An action in which a pointer approaches the touch screen without contacting the touch screen, yet is recognized as being located on the touch screen, is referred to as a 'proximity touch'. An action in which the pointer actually touches the touch screen is referred to as a 'contact touch'. The position on the touch screen proximity-touched by the pointer refers to the position of the pointer that vertically opposes the touch screen when the pointer performs the proximity touch.

The proximity sensor 141 may detect a proximity touch and/or a proximity touch pattern (e.g., proximity touch distance, proximity touch duration, proximity touch position, proximity touch shift state). Information corresponding to the detected proximity touch action and/or the detected proximity touch pattern may be displayed on the touch screen.

Figure 4:
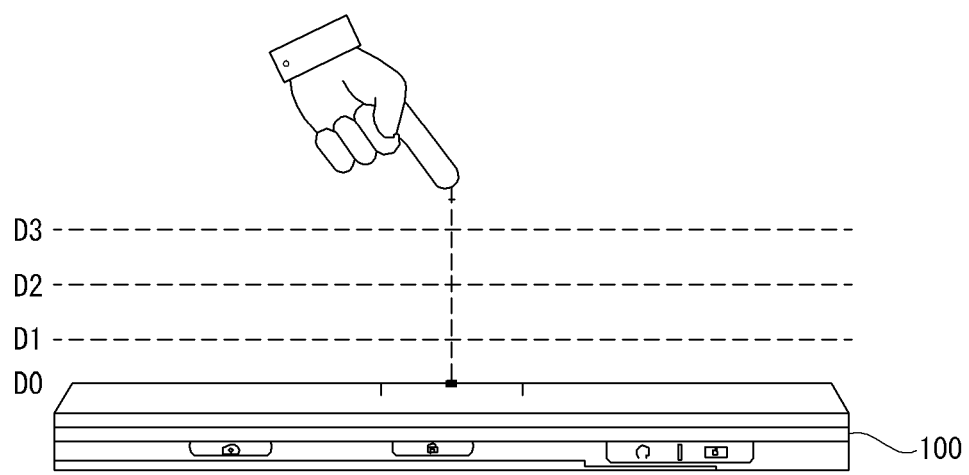
FIG. 4 is a diagram illustrating the concept of proximity depth of a proximity sensor.

The proximity sensor 141 described with reference to FIG. 3 is described in detail with reference to FIG. 4. FIG. 4 is a diagram for explaining a proximity depth of the proximity sensor 141. Other embodiments, arrangements and configurations may also be used.

As shown in FIG. 4, when a pointer, such as a user's finger, a pen or a stylus, for example, approaches the touch screen, the proximity sensor 141 (FIG. 3) provided within or in a vicinity of the touch screen detects the approach of the pointer and outputs a proximity signal. The proximity sensor 141 can be configured to output a different proximity signal according to a distance between the pointer and the proximity-touched touch screen (hereafter referred to as a proximity depth).

FIG. 4 shows a cross-section of the touch screen provided with the proximity sensor 141 (FIG. 3) capable of detecting three proximity depths. It is understood that a proximity sensor 141 capable of detecting more or fewer proximity depths is possible.

If the pointer fully contacts the touch screen (D0), it is recognized as a contact touch. If the pointer is positioned a distance from the touch screen that is less than (D1) but does not fully contact the touch screen, it is recognized as a proximity touch to a first proximity depth. If the pointer is positioned a distance from the touch screen equal to or greater than (D1) and less than (D2), it is recognized as a proximity touch to a second proximity depth. If the pointer is positioned a distance from the touch screen equal to or greater than (D2) or less than (D3), it is recognized as a proximity touch to a third proximity depth. If the pointer is positioned a distance from the touch screen equal to or greater than (D3), no proximity touch is recognized.

The controller 180 (FIG. 3) recognizes the proximity touch as one of various input signals according to proximity depth and position of the pointer. The controller 180 performs various operation controls according to various input signals.

Referring again to FIG. 3, the audio output module 152 may output audio data that is received from the wireless communication unit 110 in, for example, a call-receiving mode, a call-placing mode, a recording mode, a voice recognition mode or a broadcast receiving mode. The audio output module 152 may output audio data stored in the memory 160. The audio output module 152 may output an audio signal relevant to a function (e.g., a call signal receiving sound, a message receiving sound, etc.) performed by the mobile terminal 100. The audio output module 152 may include, for example, a receiver, a speaker or a buzzer.

The alarm 153 outputs a signal for announcing an occurrence of a particular event associated with the mobile terminal 100. Typical events include a call signal reception, a message reception, a key signal input and a touch input. The alarm 153 outputs a signal for announcing the event occurrence via vibration as well as a video signal or an audio signal. The video signal is output via the display unit 151 and the audio signal is output via the audio output module 152. Hence, at least the display unit 151 or the audio output module 152 can be regarded as part of the alarm 153.

The haptic module 154 may generate various haptic effects that can be sensed by a user. Vibration is a representative tactile effect generated by the haptic module 154. Strength and pattern of the vibration generated from the haptic module 154 may be controllable. For example, vibrations differing from each other can be output by being synthesized together or can be output in sequence.

The haptic module 154 may generate various haptic effects in addition to vibration. For example, the haptic module 154 may generate an effect caused by a pin array vertically moving against skin being touched, an air injection force via an injection hole, an air suction force via a suction hole, an effect of skimming on a skin surface, an effect of contact with an electrode, an effect of electrostatic power and/or an effect of a hot/cold sense using an endothermic or exothermic device.

The haptic module 154 can be configured to provide the haptic effect via direct contact. The haptic module 154 can also be configured to enable a user to experience the haptic effect via muscular sense of a finger or an arm. Two or more haptic modules 154 can be provided according to a configuration of the mobile terminal 100.

The memory 160 is configured to store programs for operation of the controller 180. The memory 160 may temporarily store input/output data (e.g., phonebook, message, still picture, moving picture, etc.). The memory 160 may store data of vibration and sound in various patterns output when the touch screen receives a touch input.

The memory 160 may include, for example, a flash memory, a hard disk, a multimedia card micro type memory, a card type memory (e.g., SD memory, XD memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk or an optical disk. The mobile terminal 100 may operate in association with a web storage that performs a storage function of the memory 160 via the Internet.

The interface unit 170 couples the mobile terminal 100 with external devices. The interface unit 170 receives data from an external device. The interface unit 170 is supplied with power and may be configured to deliver the power to elements within the mobile terminal 100. The interface unit 170 may be configured to enable data to be transferred from the mobile terminal 100 to an external device. The interface unit 170 may be configured to include a wired/wireless headset port, an external charger port, a wire/wireless data port, a memory card port, a port for coupling to a device having an identity module, an audio input/output (I/O) port, a video input/output (I/O) port or an earphone port.

The identity module is a chip or card that stores various types of information for authenticating a use authority of the mobile terminal 100 and can include a user identity module (UIM), a subscriber identity module (SIM) and/or a universal subscriber identity module (USIM). A device provided with the above identity module (hereafter referred to as an 'identity device') may be manufactured in the form of a smart card. The identity device is connectable to the mobile terminal 100 via a corresponding port.

The interface unit 170 may be configured as a passage for supplying power to the mobile terminal 100 from a cradle that is connected to the mobile terminal 100. The interface unit 170 may facilitate delivery of various command signals, which are input via the cradle by a user, to the mobile terminal 100. Various command signals input via the cradle or the power may work as a signal for recognizing that the mobile terminal 100 is correctly loaded in the cradle.

The controller 180 typically controls the overall operations of the mobile terminal 100. For example, the controller 180 performs control and processing associated with voice calls, data communications and video conferences. The controller 180 may include a multimedia module 181 that provides multimedia playback. The multimedia module 181 may be configured as part of the controller 180 or may be configured as a separate component. The controller 180 may also perform pattern recognizing processing for recognizing a handwriting input performed on the touch screen as a character and/or recognizing a picture drawing input performed on the touch screen as characters or images.

The power supply unit 190 provides power required by the various components for the mobile terminal 100. The power may be internal power, external power, or combinations thereof.

Embodiments of the present invention described in the following description may be implemented within a recording medium that can be read by a computer or a computer-like device using software, hardware or combinations thereof. For hardware implementations, arrangements and embodiments may be implemented using at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors or electrical units for performing other functions. Such embodiments may also be implemented by the controller 180.

For a software implementation, arrangements and embodiments described herein may be implemented with separate software modules, such as procedures and functions, each of which may perform one or more of the functions and operations described herein. Software codes may be implemented with a software application written in any suitable programming language and may be stored in the memory 160 and executed by the controller 180.

Figure 5A:
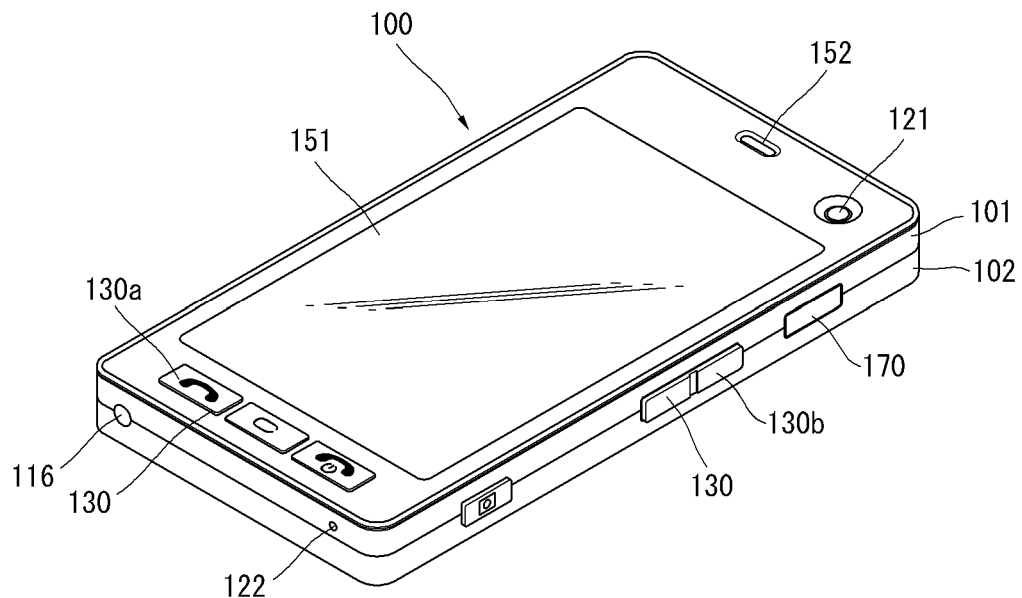
FIG. 5A is a perspective view showing an example of a front of a portable terminal according to the invention.

FIG. 5A is a front perspective view showing an example of a front of the mobile terminal 100. The mobile terminal 100 of FIG. 5A is depicted as a bar-type terminal body, the mobile terminal 100 may be implemented in a variety of different configurations. Examples of such configurations include a folder-type, a slide-type, a rotational-type, a swing-type and combinations thereof. For clarity, further disclosure will primarily relate to a bar-type mobile terminal 100. However such teachings apply equally to other types of mobile terminals.

The mobile terminal 100 includes a case (casing, housing, cover, etc.) that forms an exterior thereof. The case may be divided into a front case 101 and a rear case 102. Various electric/electronic parts are provided in a space between the front case 101 and the rear case 102. A middle case may be further provided between the front case 101 and the rear case 102. The cases can be formed by injection molding of synthetic resin or may be formed of a metallic material, such as stainless steel (STS) or titanium (Ti).

The display unit 151, the audio output module 152, the camera 121, user input units 130a and 130b, the microphone 122 and/or the interface unit 170 can be provided on the terminal body, and more particularly on the front case 101.

The display unit 151 occupies most of a main face of the front case 101. The audio output module 152 and the camera 121 may be provided at an area adjacent to one end portion of the display unit 151, while the user input unit 130a and the microphone 122 may be provided at an area adjacent to the other, opposite end portion of the display unit 151. The user input unit 130b and the interface unit 170 can be provided on lateral sides of the front and rear cases 101 and 102.

The user input unit 130 may receive a command for controlling an operation of the mobile terminal 100. The user input unit 130 may include a plurality of manipulating units 130a and 130b. The manipulating units 130a and 130b can be named a manipulating portion and may adopt any mechanism of a tactile manner that enables a user to perform a manipulation action by experiencing a tactile feeling.

Content input via the first manipulating unit 130a or the second manipulating unit 130b can be set to be different. For example, commands such as start, end and scroll can be input via the first manipulating unit 130a. Commands for adjusting volume of sound output from the audio output module 152 and for switching the display unit 151 to a touch recognizing mode can be input via the second manipulating unit 130b.

Figure 5B:
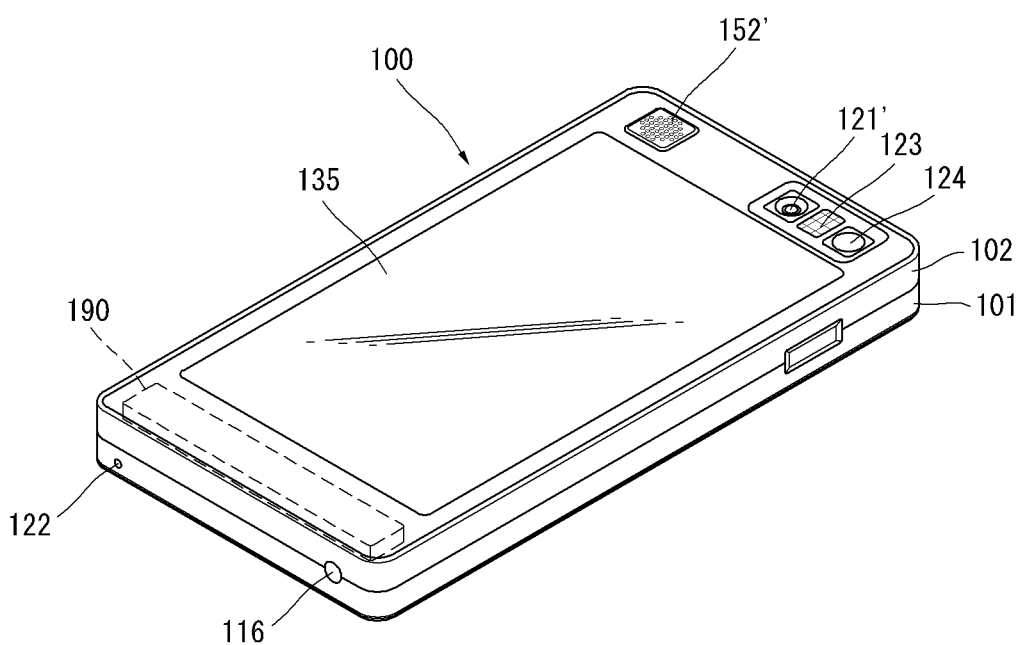
FIG. 5B is a rear perspective view of the portable terminal shown in FIG. 5A.

FIG. 5B is a rear perspective diagram of the mobile terminal 100 shown in FIG. 5A. Other embodiments, configurations and arrangements may also be provided.

As shown in FIG. 5B, an additional camera 121' can be provided on a rear side of the terminal body, and more particularly, on the rear case 102. The camera 121' on the rear case 102 has a photographing direction that is substantially opposite to that of the camera 121 shown in FIG. 5A and may have a different resolution.

For example, the camera 121 may have a smaller number of pixels, and thereby have a relatively lower resolution, to capture and transmit an image of the user's face for a video call, while the camera 121' may have a greater number of pixels, and thereby have a relatively greater resolution, for capturing an image of a general subject for photography without transmitting the captured image. Each of the cameras 121 and 121' can be configured to be rotated and/or popped up from the terminal body.

A flash 123 and a mirror 124 may be disposed adjacent to the camera 121'. The flash 123 projects light toward a subject when photographing the subject using the camera 121'. When a user attempts to take a picture of himself/herself (self-photography) using the camera 121', the mirror 124 enables the user to view his/her face reflected by the mirror 124.

An additional audio output module 152' can be disposed at the rear side of the terminal body. The additional audio output module 152' facilitates a stereo function in conjunction with the audio output module 152 illustrated in FIG. 5A and may be used for implementation of a speakerphone mode when communicating via the mobile terminal 100.

A broadcast signal receiving antenna 116 can be provided at a lateral side of the terminal body in addition to an antenna for communication. The antenna 116 incorporated into the broadcast receiving module 111 shown in FIG. 3 can be retractable within the terminal body.

The power supply unit 190 for supplying a power to the mobile terminal 100 may be provided in the terminal body. The power supply unit 190 can be configured to be built within the terminal body or to be detachably connected to the terminal body.

FIG. 5B also shows a touchpad 135 for detecting a touch input disposed at the rear case 102. The touchpad 135 can be a light transmittive type, similar to the display unit 151. If the display unit 151 is configured to output visual information from both its front and rear faces, it recognizes the visual information via the touchpad 135 as well. The information output from the front and rear faces can be entirely controlled by the touchpad 135. Alternatively, a display is provided at the touchpad 135 so that a touch screen can be disposed at the rear case 102.

The touchpad 135 is activated by interconnecting with the display unit 151 of the front case 101. The touchpad 135 can be disposed at the rear of the display unit 151 and in parallel thereto. The touchpad 135 can be of a size equal to or smaller than that of the display unit 151.

Figure 6A:
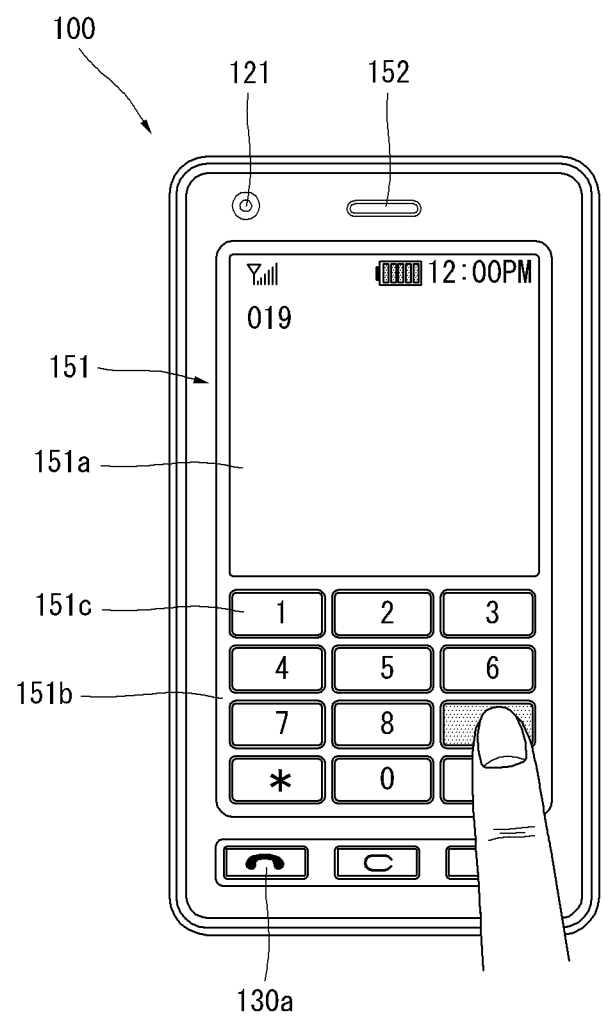
FIGS. 6A and 6B are front views of the portable terminal illustrating operating states of the portable terminal according to the invention.
Figure 6B:
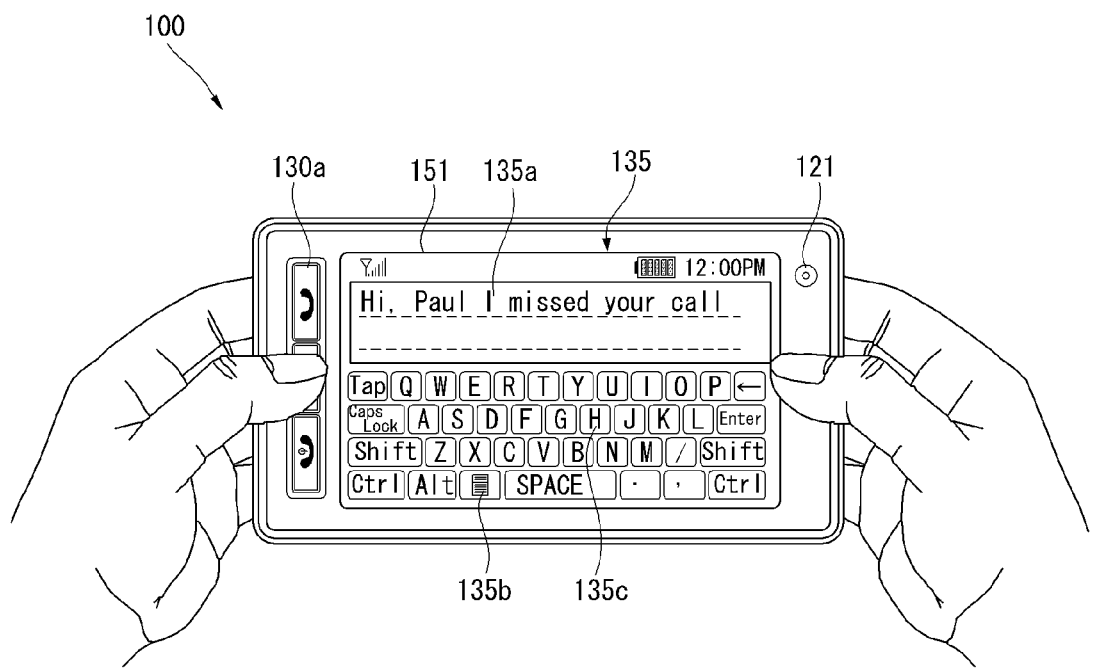

An interconnected operational mechanism between the display unit 151 and a touchpad 135 is explained with reference to FIGS. 6A and 6B. FIGS. 6A and 6B are front-view diagrams of a mobile terminal 100 according to one embodiment of the present invention for explaining an operational state thereof.

Various types of visual information can be displayed on the display unit 151. The information can be displayed as characters, numerals, symbols, graphics and/or icons.

In order to input the information, at least one of the characters, numerals, symbols, graphics and icons is represented as a single predetermined array to be implemented in a keypad formation. This keypad formation can be referred to as 'soft keys'. FIG. 6A depicts a touch applied to a soft key input through a front face of a terminal body.

The display unit 151 is operable through an entire area or by being divided into a plurality of regions. In the latter case, a plurality of the regions can be configured to be interoperable.

For example, an output window 151a and an input window 151b are displayed on the display unit 151. A soft key 151c representing a digit for inputting a phone number or other information is displayed on the input window 151b. If the soft key 151c is touched, a digit corresponding to the touched soft key is displayed on the output window 151a. If a first manipulating unit 130a is manipulated, a call connection for the phone number displayed on the output window 151a is attempted.

FIG. 6B depicts a touch being applied to a soft key input through a rear face of a terminal body. FIG. 6A shows the terminal body arranged vertically (i.e., in a portrait manner), while FIG. 6B shows the terminal body arranged horizontally (i.e., in a landscape manner). The display unit 151 can be configured to change an output picture according to the arranged direction of the terminal body.

FIG. 6B also shows a text input mode activated in the mobile terminal 100. FIG. 6B shows the touchpad 135 having an output window 135a and an input window 135b. The output window 135a and the input window 135b are visible on the display unit 151. A plurality of soft keys 135c representing characters, symbols and/or digits are arranged in the input window 135b. The soft keys 135c may be arranged in a QWERTY key formation.

If the soft keys 135c are touched using the touchpad 135, the characters, symbols and/or digits corresponding to the touched soft keys are displayed on the output window 135a. The touch input via the touchpad 135 is advantageous in that blocking the soft keys 135c by a finger during a touch can be prevented, as compared to the touch input via the display unit 151. If the display unit 151 and the touchpad 135 are configured as transparent, the user is able to visually see his/her fingers located at the rear side of the terminal body. Hence, more accurate touch inputs are possible.

The display unit 151 or the touchpad 135 can be configured to receive a touch input by scrolling. A user scrolls the display unit 151 or the touchpad 135 to shift a cursor or pointer located at an entity (e.g., an icon) displayed on the display unit 151. Furthermore, when a finger is shifted on the display unit 151 or the touchpad 135, a path of the shifted finger can be displayed visually on the display unit 151. This may be useful in editing an image displayed on the display unit 151.

When both the display unit (touch screen) 151 and the touchpad 135 are touched together within a predetermined time range, a function of the mobile terminal 100 can be executed. The simultaneous touch may occur when the terminal body is held by a user using a thumb and a first finger (clamping). The above function can include activation or deactivation for the display unit 151 or the touchpad 135.

The mobile terminal 100 described with reference to FIGS. 3 to 6 is only an example of the electronic device 100 disclosed by the technical spirit of this invention. The electronic device 100 disclosed by the technical spirit of this invention may omit some of the elements of the mobile terminal 100 or may include some elements not included in the mobile terminal 100.

Hereinafter, exemplary embodiments of this invention are described. In this invention, for convenience of description only, the display unit 151 of the electronic device 100 is a touch screen 151. As described above, the touch screen 151 can perform both an information display function and an information input function. It is to be noted, however, that this invention is not limited thereto. Furthermore, touch described in this document may include contact touch and proximity touch.

Figure 7:
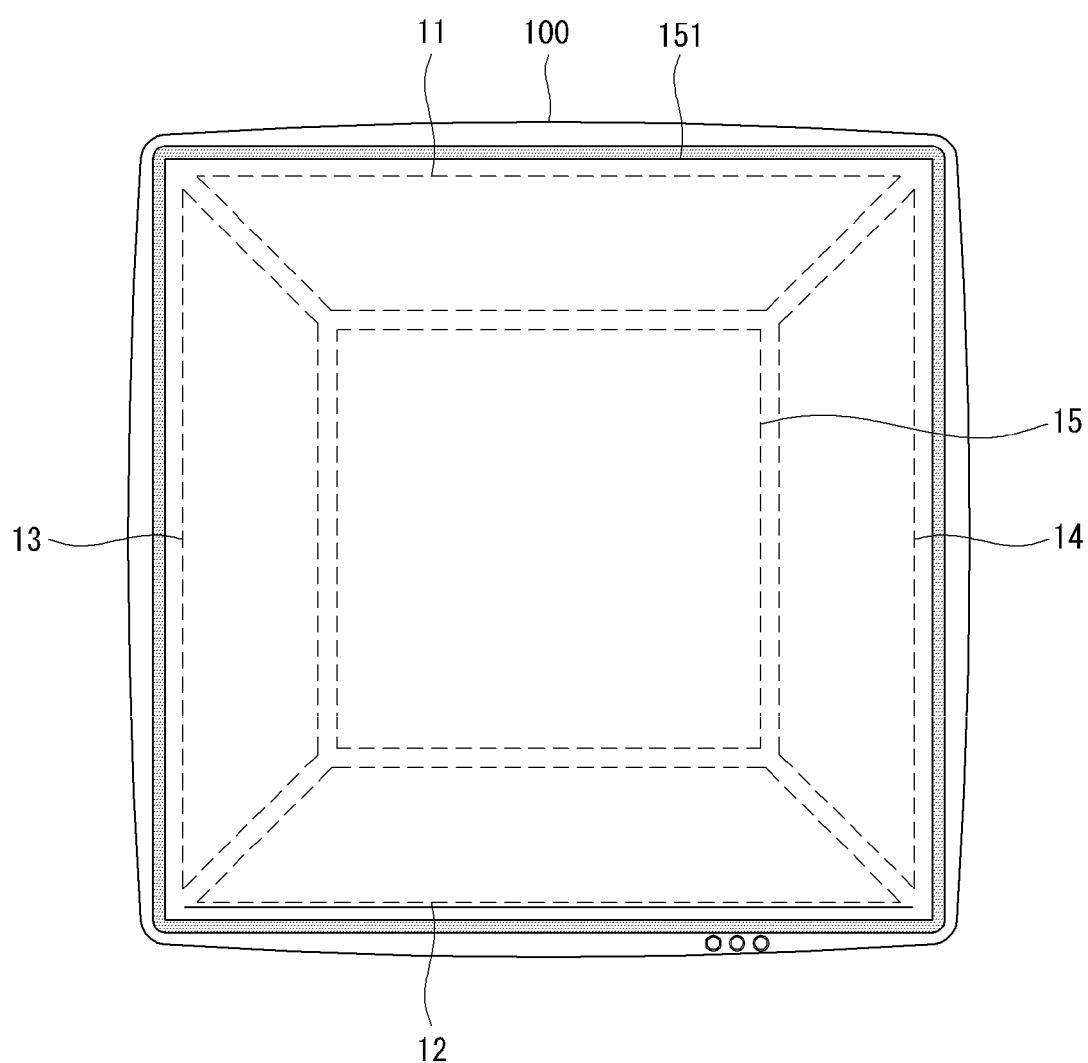
FIGS. 7 and 8 are diagrams illustrating a graphical user interface (GUI) provided in an electronic device of the invention.
Figure 8:
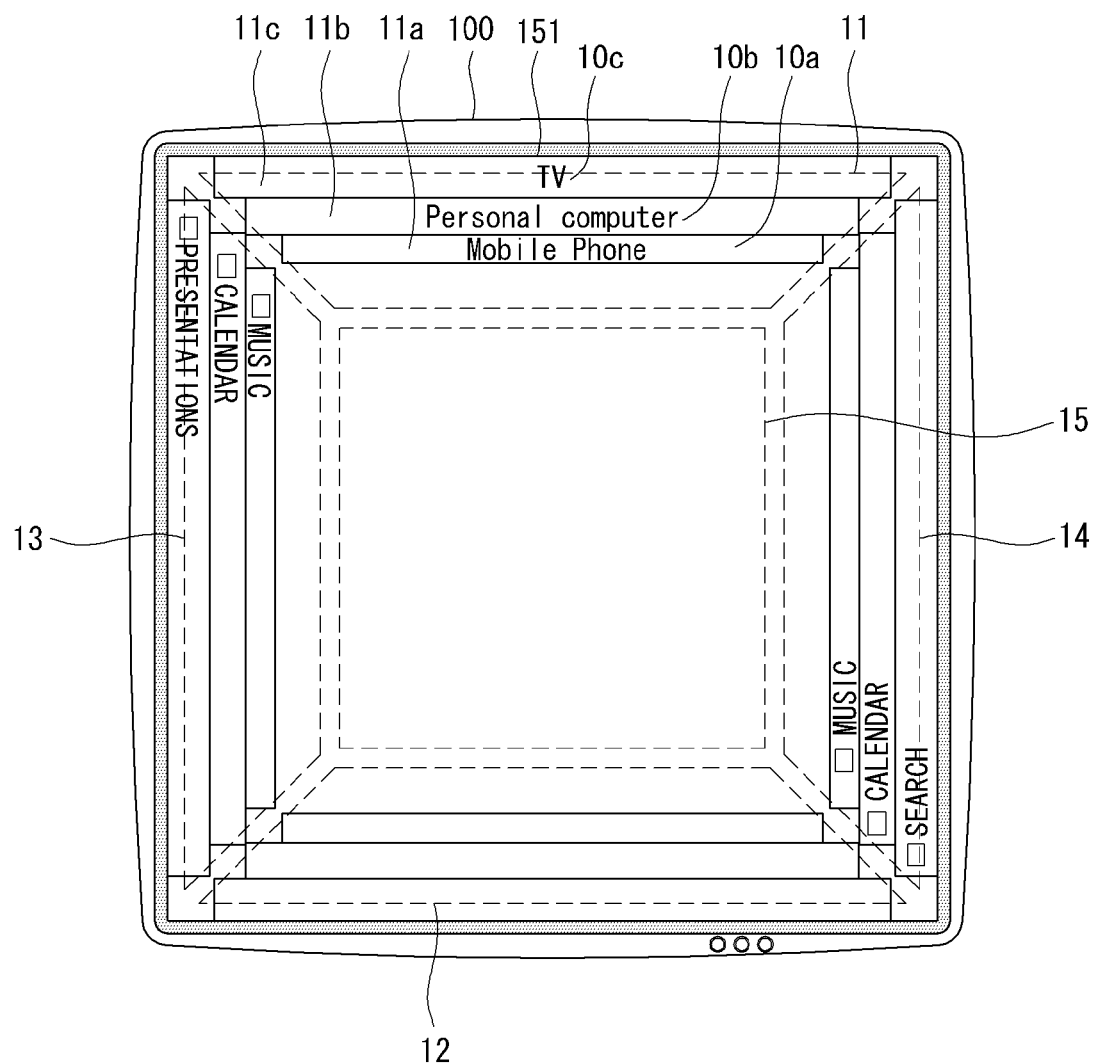

FIGS. 7 and 8 are diagrams illustrating a graphical user interface (GUI) provided in the electronic device 100. Referring to FIG. 7, the controller 180 (FIG. 3) of the electronic device 100 sets at least one region of one or more regions corresponding to a side of a plurality of sides of the touch screen 151 and displays pertinent information in the set region.

Referring to FIG. 7, the controller 180 (FIG. 3) sets a first region 11 corresponding to a first side (e.g., upper side) of the plurality of sides of the touch screen 151, a second region 12 corresponding to a second side (e.g., lower side) of the plurality of sides, a third region 13 corresponding to a third side (e.g., left side) of the plurality of sides, and a fourth region 14 corresponding to a fourth side (e.g., right side) of the plurality of sides. The controller 180 (FIG. 3) can also set a middle region 15 of the touch screen 151.

The controller 180 (FIG. 3) can set various information to correspond to the first to fourth regions 11, 12, 13, and 14 and the middle region 15. For example, referring to FIG. 8, the controller 180 set the first region 11 to display information about the at least one external electronic device 10 (FIG. 1). More particularly, the first region 11 displays information related to a plurality of external electronic devices 10 (e.g., mobile phone (first external electronic device 10a), personal computer (second external electronic device 10b) and TV (third external electronic device 10c)) which are currently connected or can be connected. The information about the external electronic devices 10a-10c may include identification information to identify the external electronic devices 10a-10c and activation states of the external electronic devices 10a-10c.

In FIG. 8, the first region 11 includes a list, including a portion 11a for a first external electronic device 10a, a portion 11b for a second external electronic device 10b, and a portion for a third external electronic device 10c. The activation states of the external electronic devices 10a-10c may include information about whether the external electronic devices 10a-10c are currently connected to the electronic device 100, whether the external electronic devices 10a-10c can communicate, and whether the external electronic devices 10a-10c are in an 'on' or an 'off' state. A variety of examples in which the controller 180 (FIG. 3) controls the first to fourth regions 11, 12, 13, and 14 and the middle region 15 of the touch screen 151 to display different information are described later in connection with other embodiments.

Meanwhile, the controller 180 (FIG. 3) can control the middle region 15 and the first to fourth regions 11, 12, 13, and 14 such that the middle region 15 and the first to fourth regions 11, 12, 13, and 14 are depicted as having different spatial depths. For example, the controller 180 may control the touch screen 151 to display the first to fourth regions 11, 12, 13, and 14 such that the spatial depth corresponding to one side of the first to fourth regions 11, 12, 13, and 14 coincides with the spatial depth of the middle region 15 and the spatial depth corresponding to another side of the first to fourth regions 11, 12, 13, and 14, which is opposite to the side of the first to fourth regions that coincides with the spatial depth of the middle region, does not coincide with the spatial depth of the middle region 15.

For example, referring to FIG. 8, one side of the first region 11 that corresponds to the edge of the touch screen 151 and the portion 11c for the third electronic device 10c is depicted to protrude more than the middle region 15 such that it appears to be closer. The opposite side of the first region 11 that corresponds to the portion 11a for the first electronic device 10a and which is adjacent to the middle region 15 is depicted to have the same spatial depth as the middle region 15. The controller 180 (FIG. 3) may control the depiction of the spatial depth of each of the second to fourth regions 12, 13, and 14 in the same manner as the first region 11. Accordingly, the controller 180 can control the first to fourth regions 11, 12, 13, and 14 to appear three dimensional, which causes a user to perceive depth.

It is not necessary for each of the first to fourth regions 11, 12, 13, and 14 and the middle region 15 to always be set and configured to display information. For example, the first to fourth regions 11, 12, 13, and 14 and the middle region 15 may be set and configured to display information only as occasions demand, as will be described in subsequent embodiments.

The mobile terminal 100 described above with reference to FIGS. 3 to 8 is merely an example of the plurality of electronic devices 100 and 10 that may employ the features of the invention. Each of the plurality of electronic devices 100 and 10a-10c disclosed may omit some of the elements of the mobile terminal 100 or include additional elements not included in the mobile terminal 100.

Some embodiments of this invention are described below. By means of example, some or all the electronic devices 100 and 10a-10c may include display means, such as display units, having the same function as the display unit 151. Furthermore, some or all electronic devices 100 and 10a-10c including the display means may include a touch screen as the display means.

As described above, the touch screen 151 can perform both the information display function and the information input function. It is to be noted, however, that this invention is not limited thereto. Additionally, 'touch,' as described in this invention, may include contact touch and proximity touch.

Figure 9A:
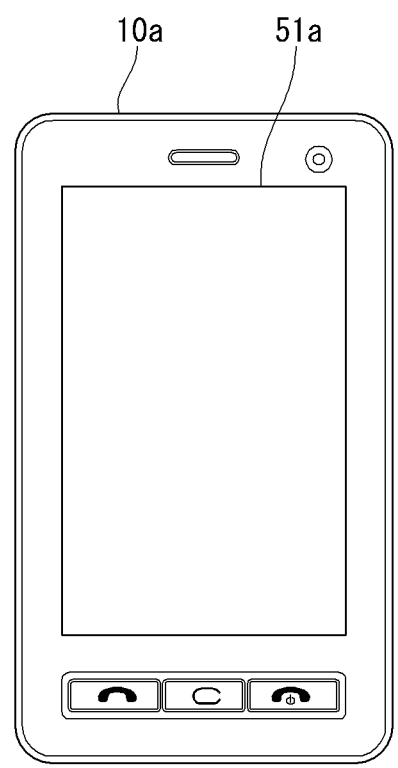
FIGS. 9A to 9C are diagrams showing examples of external electronic devices related to the invention.
Figure 9B:
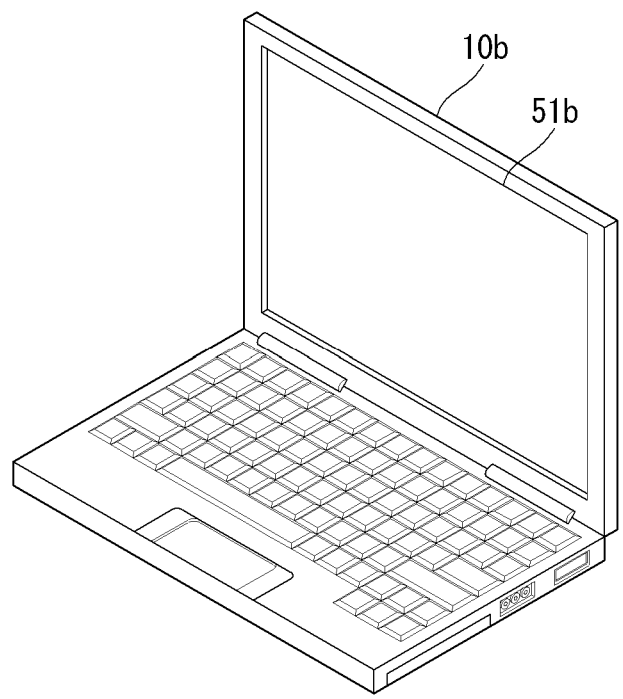
Figure 9C:
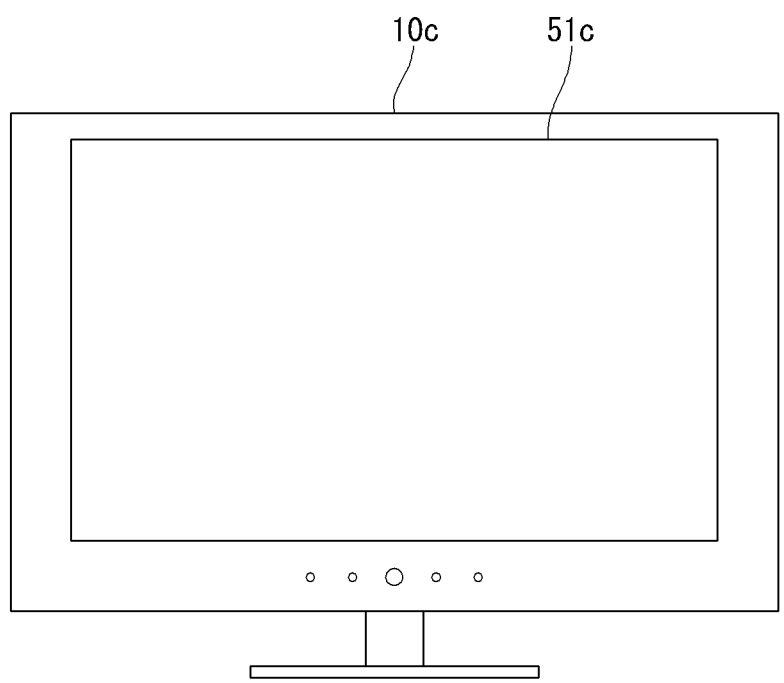

FIGS. 9A to 9C are diagrams showing examples of an external appearance of the first external electronic device 10a, the second external electronic device 10b, and the third external electronic device 10c, respectively. As shown in FIGS. 9A to 9C, the first to third external electronic devices 10a, 10b, and 10c may each include a display unit 51a, 51b, and 51c, respectively.

In this invention, an external source refers to an object that can provide content to the plurality of electronic devices 100 and 10a-10c over the network 200 (FIG. 2). The external source may include all the subjects existing on the network 200. For example, the external source may include a broadcasting station and servers and websites existing on the Internet.

Figure 10:
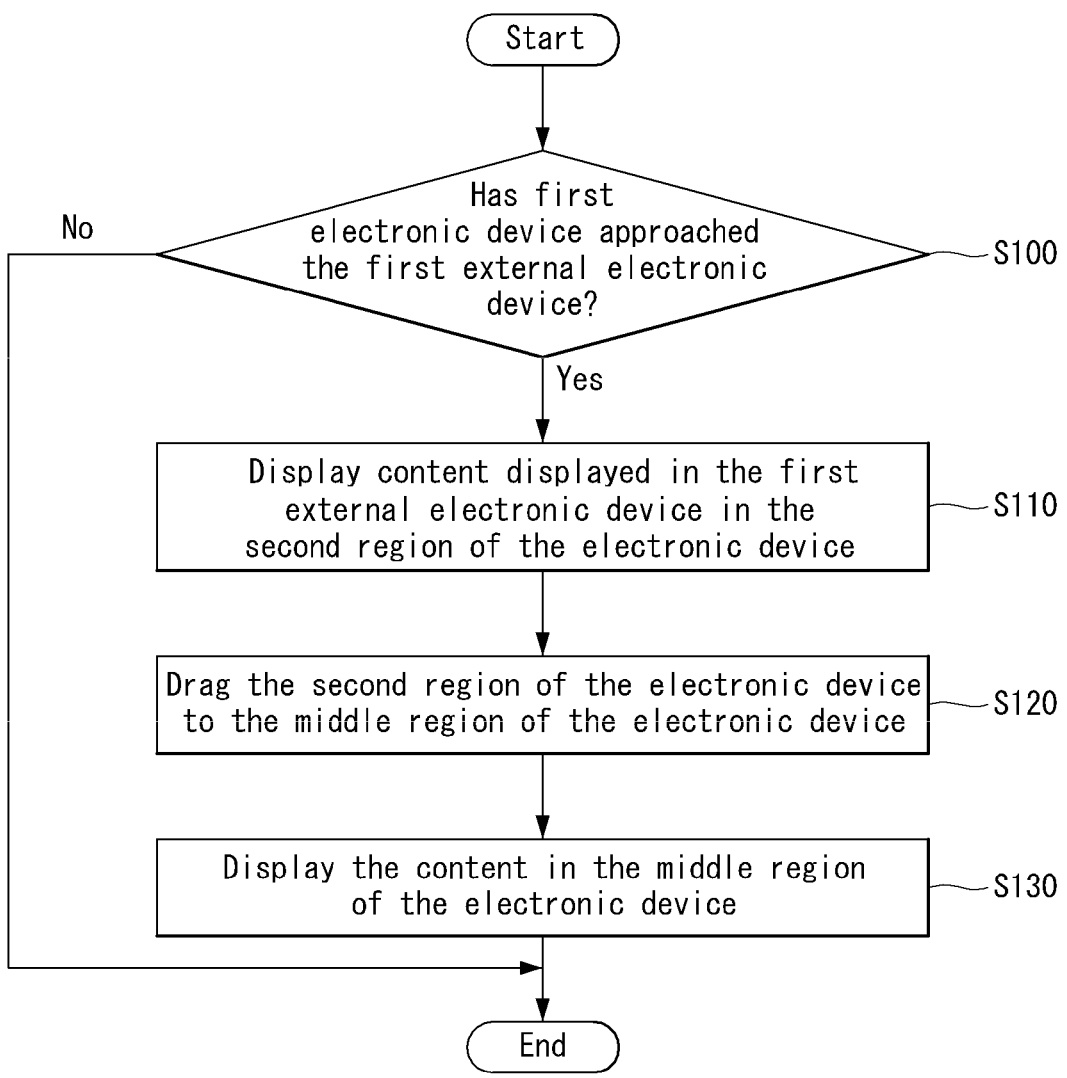
FIG. 10 is a flowchart illustrating a method of controlling an electronic device according to a first embodiment of the invention.
Figure 11:
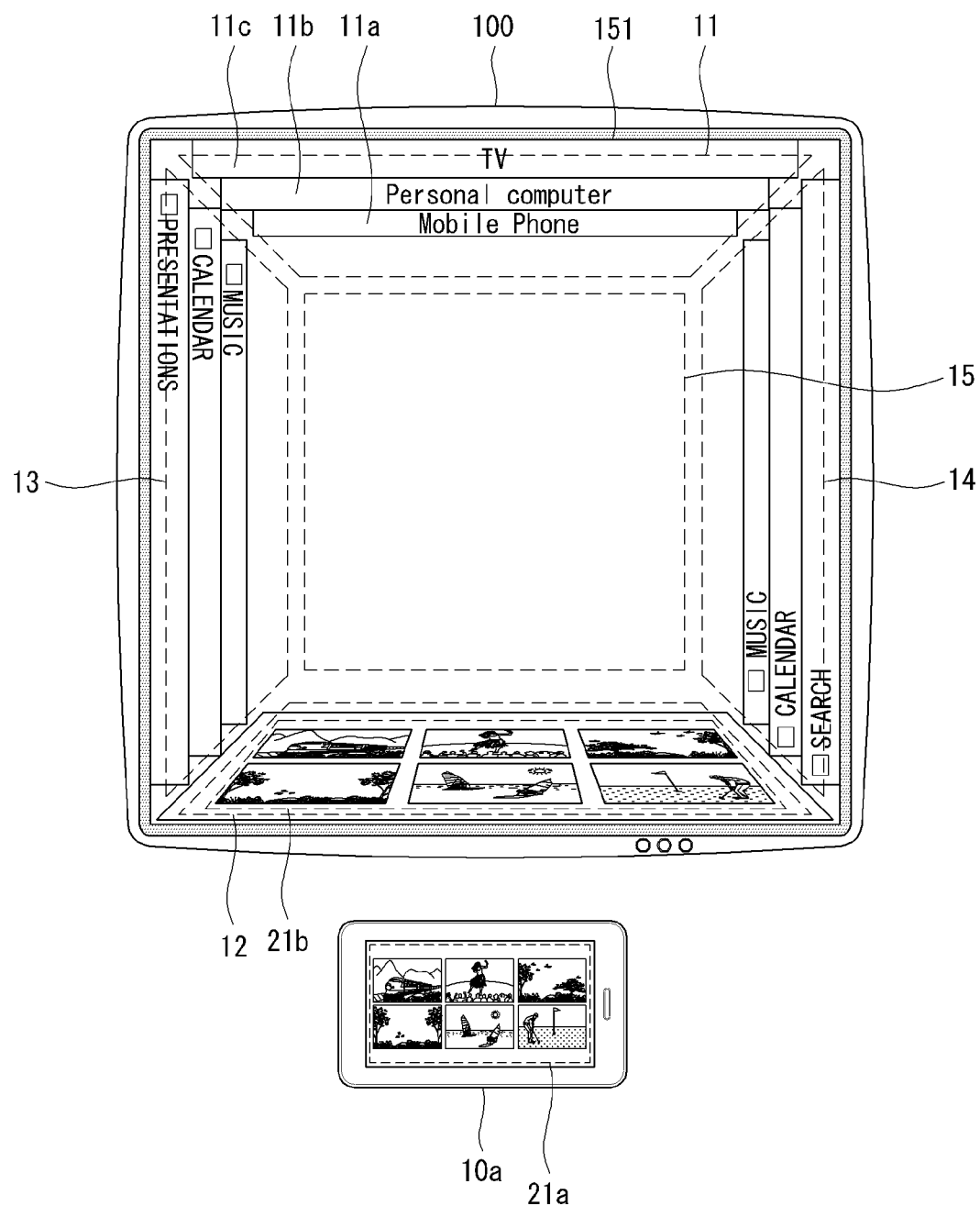
FIGS. 11 and 12 are diagrams illustrating the method of controlling an electronic device according to the first embodiment of the invention.
Figure 12:
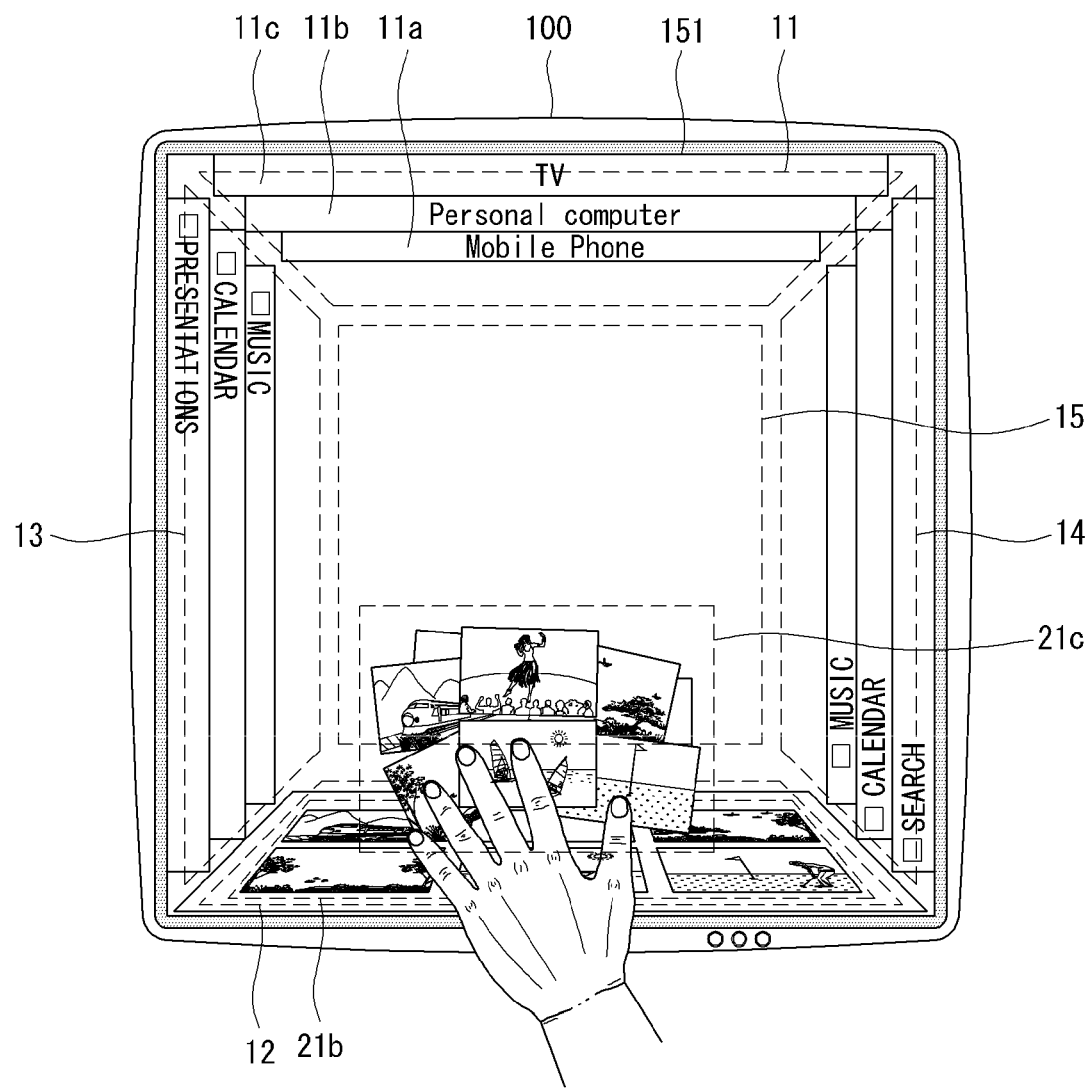

FIG. 10 is a flowchart illustrating a method of controlling an electronic device according to a first embodiment of this invention. FIGS. 11 and 12 are diagrams illustrating the method of controlling an electronic device according to the first embodiment of this invention.

The method of controlling an electronic device according to the first embodiment of this invention may be implemented in the system environment and the electronic device 100 described with reference to FIGS. 1 to 8. The method of controlling an electronic device according to the first embodiment of this invention and the operations of the electronic device 100 for implementing the method are described in detail below with reference to FIGS. 10-12.

Referring to FIGS. 10 and 11, the controller 180 (FIG. 3) determines whether the sensing unit 140 (FIG. 3) detects that the electronic device 100 approached the first external electronic device 10a (step S101). If it is determined that the electronic device 100 has approached the first external electronic device 10a, the controller 180 of the electronic device 100 controls the touch screen 151 of the electronic device 100 to display content displayed in the display means, such as the display unit 51a of the first external electronic device 10a of FIG. 9A, in the second region 12 of the touch screen 151 of the electronic device 100 (step S110).

Step S110 may be performed in various ways. For example, the controller 180 (FIG. 3) may directly receive the content displayed in the first external electronic device 10a from the first external electronic device 10a. Alternatively, the controller 180 may receive the content displayed in the first external electronic device 10a from a different external electronic device, such as the second external electronic device 10b (FIG. 9B) or the third external electronic device 10c (FIG. 9C), or may receive the content from the server 300 (FIG. 2) over the network 200 (FIG. 2).

In performing step S110, the controller 180 (FIG. 3) may control the touch screen 151 of the electronic device 100 to display the content displayed in the first external electronic device 10a as appearing slowly from the edge of the second region 12 of the touch screen. In this manner, the content displayed in the first external electronic device 10a appears to be transferred from the display unit 51a of the first external electronic device 10a to the touch screen 151 of the electronic device.

Referring to FIG. 11, in one example the content 21b displayed in the second region 12 of the touch screen 151 is identical to the content 21a displayed in the first external electronic device 10a. While FIG. 11 depicts that content 21a from the first external electronic device 10 is displayed as content 21b in the second region 12 of the touch screen 151, the controller 180 (FIG. 3) may fix the region in which the content 21a from the first external electronic device 10a is displayed to any one of the first to fourth regions 11, 12, 13, and 14 of the touch screen 151 or may vary the region in which the content 21b is displayed.

With continuing reference to FIG. 11, when the first external electronic device 10a approaches the second region 12 of the touch screen 151, the controller 180 (FIG. 3) may control the content 21a displayed in the first external electronic device 10a such that the content is displayed in the second region 12 of the touch screen 151. However, the controller 180 may recognize any one of the first to fourth regions 11, 12, 13, and 14 that the first external electronic device 10a approaches, acquire the content displayed in the first external electronic device 10a, and provide the acquired content to the recognized region. For example, when the first external electronic device 10a approaches the fourth region 14 of the touch screen 151, the controller 180 may control the content 21a displayed in the first external electronic device 10a to be displayed in the fourth region 14 of the touch screen.

Referring to FIG. 12, a user may drag the second region 12, or the content 21b displayed in the second region 12, to the middle region 15 at step S120. The controller 180 (FIG. 3) may recognize the drag performed at step S120 and display the content 21b displayed in the second region 12 in the middle region 15 as content 21c at step S130.

FIG. 12 shows an example of a screen in which the steps S120 and S130 are performed. In performing the step S130, the controller 180 (FIG. 3) may move the content 21b from the second region 12 of the touch screen 151 to be displayed as content 21c in the middle region 15 of the touch screen 151, in which case the content 21b is no longer displayed in the second region 12 of the touch screen 151, or may copy the content 21b from the second region 12 of the touch screen 151 and display the content 21c in the middle region 15 of the touch screen 151, in which case the content 21b is displayed in the second region 12 of the touch screen 151 and the content 21c is displayed in the middle region 15 of the touch screen 151.

Figure 13:
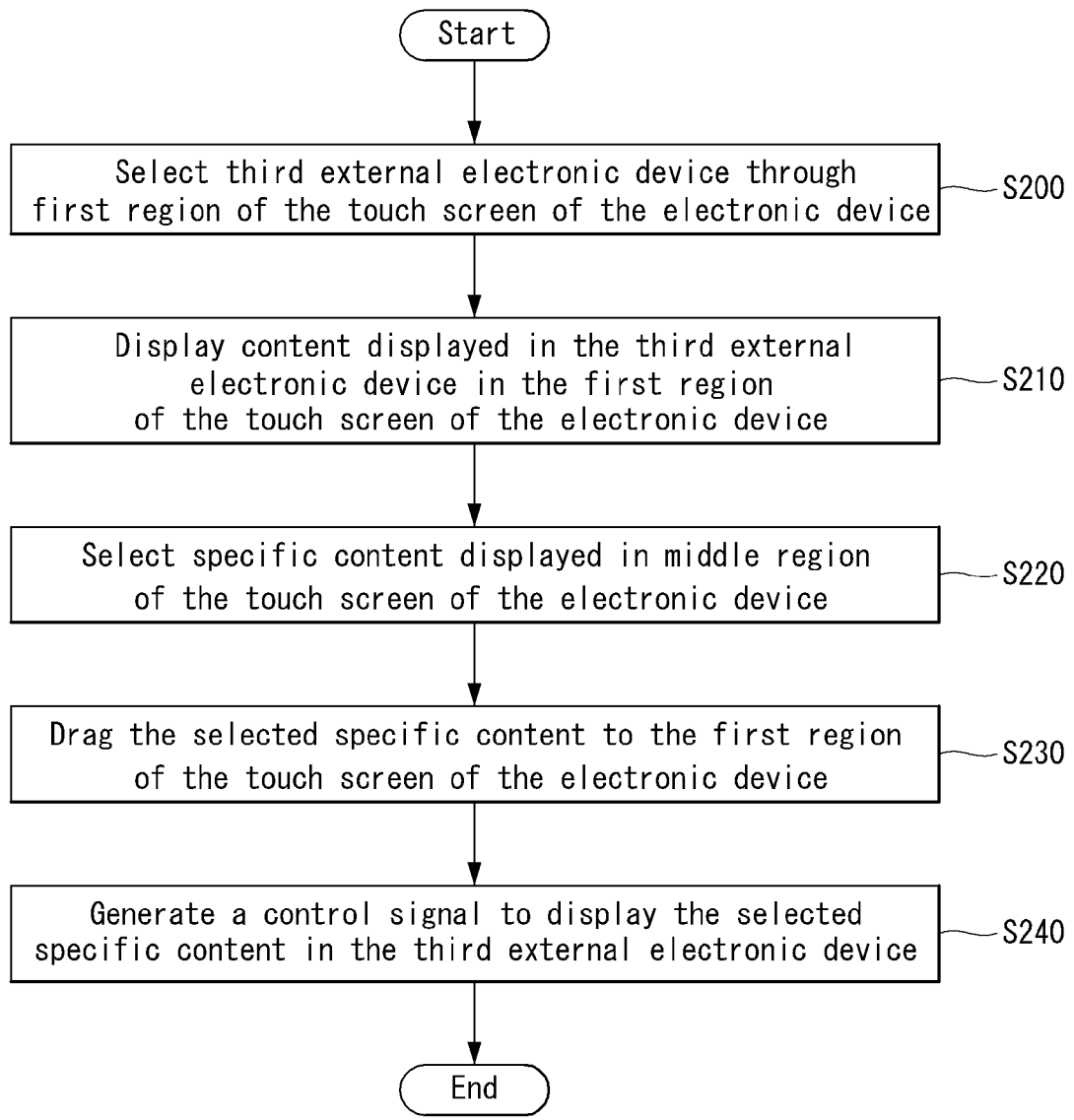
FIG. 13 is a flowchart illustrating a method of controlling an electronic device according to a second embodiment of the invention.

FIG. 13 is a flowchart illustrating a method of controlling an electronic device according to a second embodiment of this invention. FIGS. 14 to 19 are diagrams illustrating the method of controlling an electronic device according to the second embodiment of this invention.

The method of controlling an electronic device according to the second embodiment of this invention may be implemented in the system environment and the electronic device 100 described with reference to FIGS. 1 to 8. The method of controlling an electronic device according to the second embodiment of this invention and the operations of the electronic device 100 for implementing the method are described in detail below with reference to FIGS. 13-19.

Figure 14:
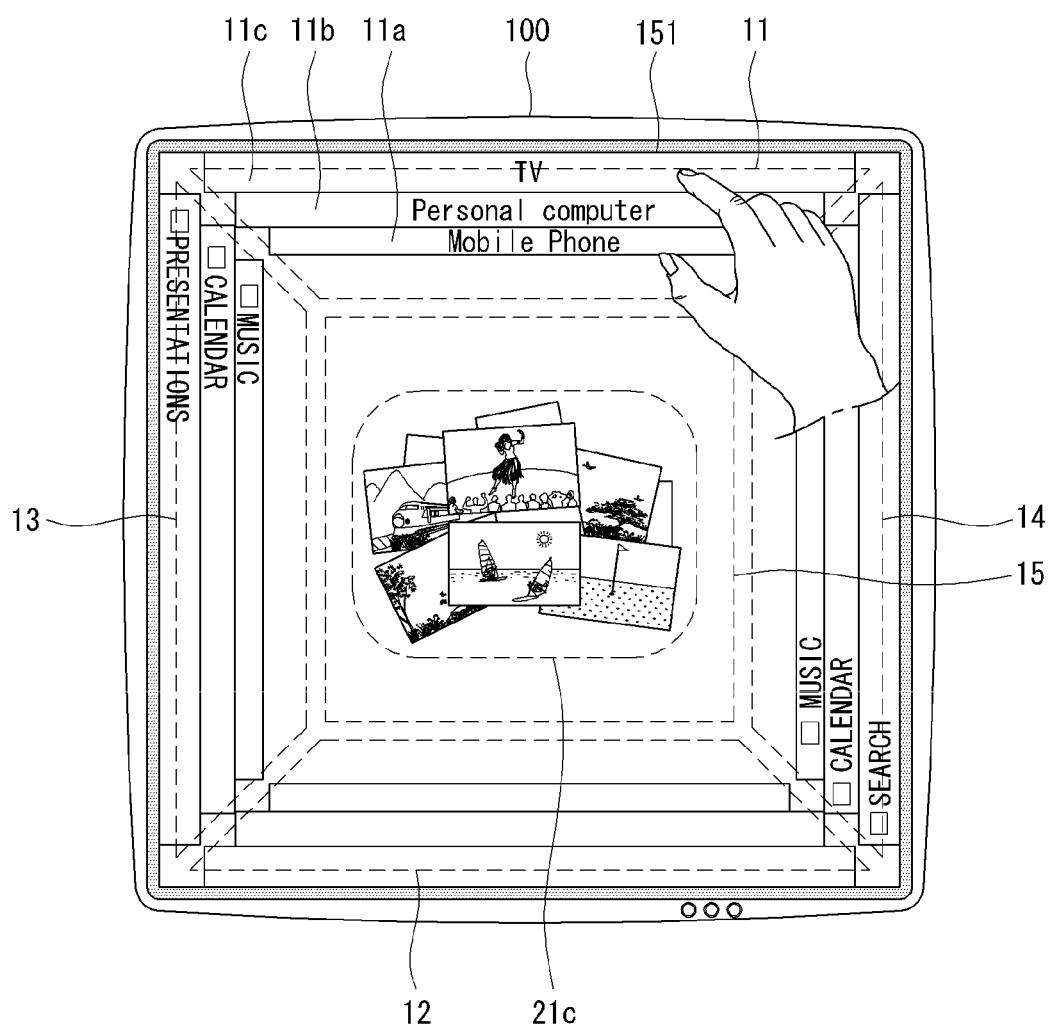
FIGS. 14 to 19 are diagrams illustrating the method of controlling an electronic device according to the second embodiment of the invention.

Referring to FIGS. 13 and 14, the controller 180 (FIG. 3) of the electronic device 100 may receive a selection signal for the third external electronic device 10c (FIG. 9C) through the first region 11 of the touch screen 151 at step S200. For example, referring to FIG. 14, a user may select the third external electronic device 10c by selecting a portion 11c, corresponding to the third external electronic device 10c, in a list displayed in the first region 11 of the touch screen 151, by using a finger, for example.

Figure 15:
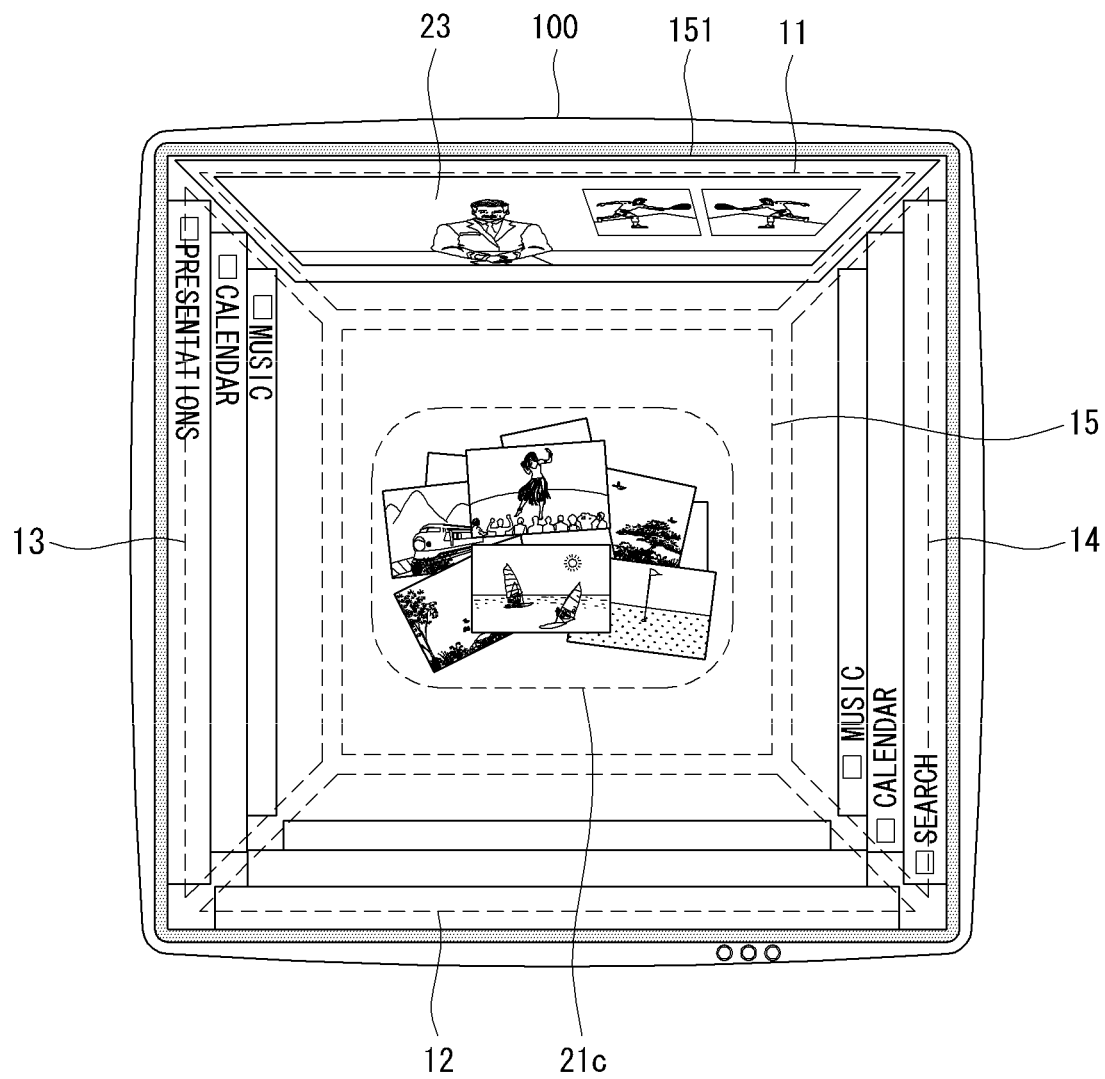

FIG. 15 shows an example in which content 23 displayed in the third external electronic device 10c (FIG. 9C) is displayed in the first region 11 of the touch screen 151. Referring to FIG. 15, the controller 180 (FIG. 3) may control the touch screen 151 to display the content 23 displayed in the display unit 51c (FIG. 9C) of the third external electronic device 10c in the first region 11 of the touch screen 151 at step S210. In performing step S210, the controller 180 may receive the content 23 displayed in the third external electronic device 10c directly from the third external electronic device 10c or may receive the content 23 from another external electronic device or from outside the system, such as over the network 200 (FIG. 2), as in the step S110 of FIG. 10 according to the first embodiment of this invention.

Figure 16:
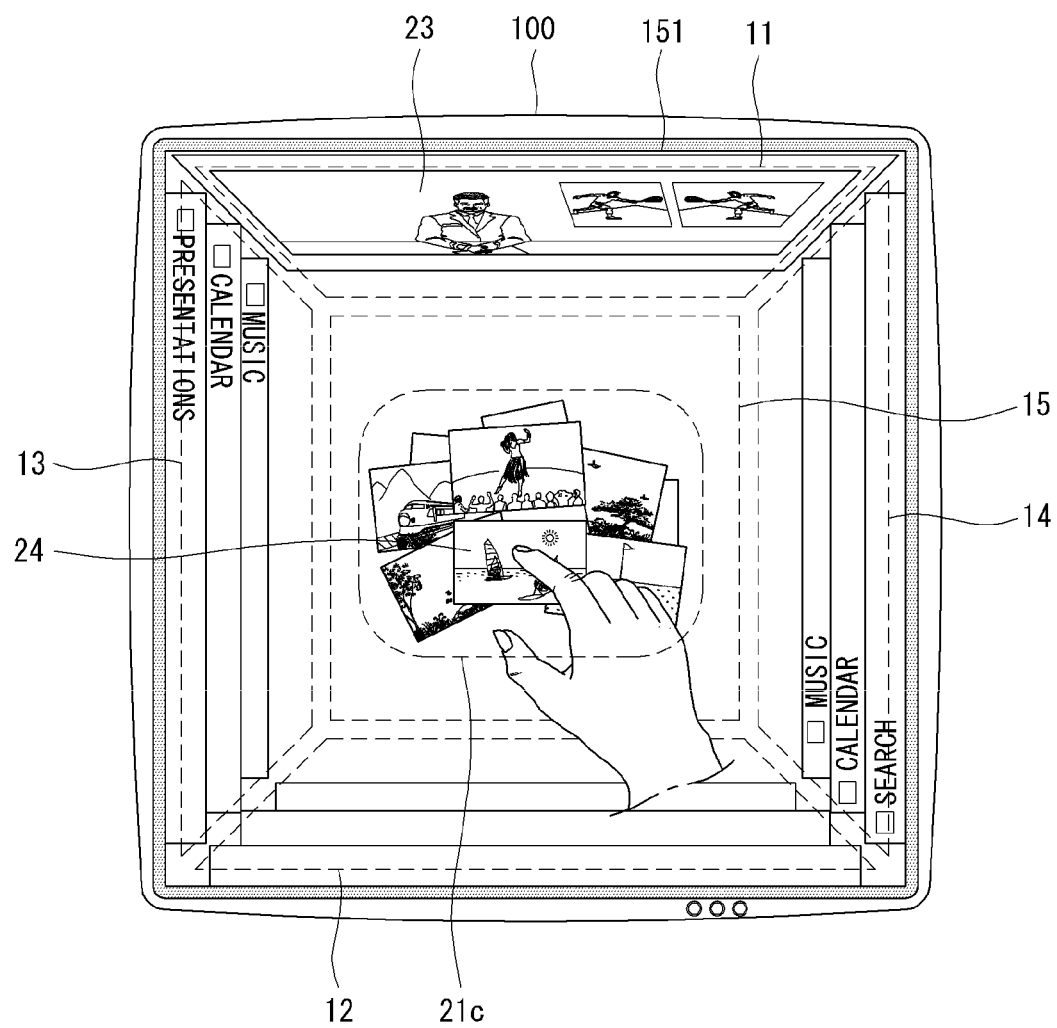

Referring to FIG. 16, the controller 180 (FIG. 3) may receive a selection signal for specific content 24 displayed in the middle region 15 of the touch screen 151 at step S220. For example, referring to FIG. 16, a user may select specific content 24 from among the content items 21c displayed in the middle region 15 by touching the specific content 24 using a finger, for example.

Figure 17:
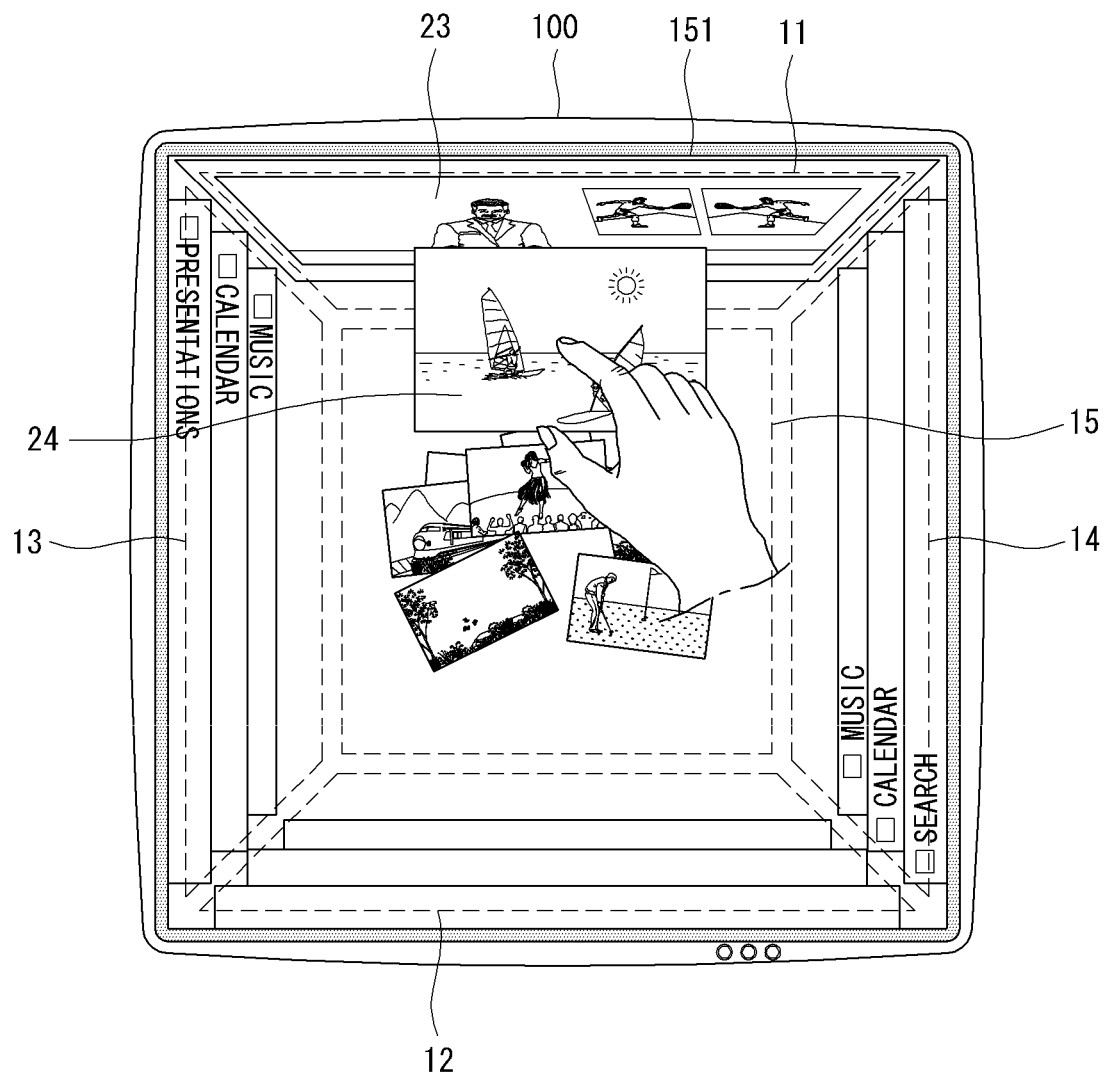
Figure 18:
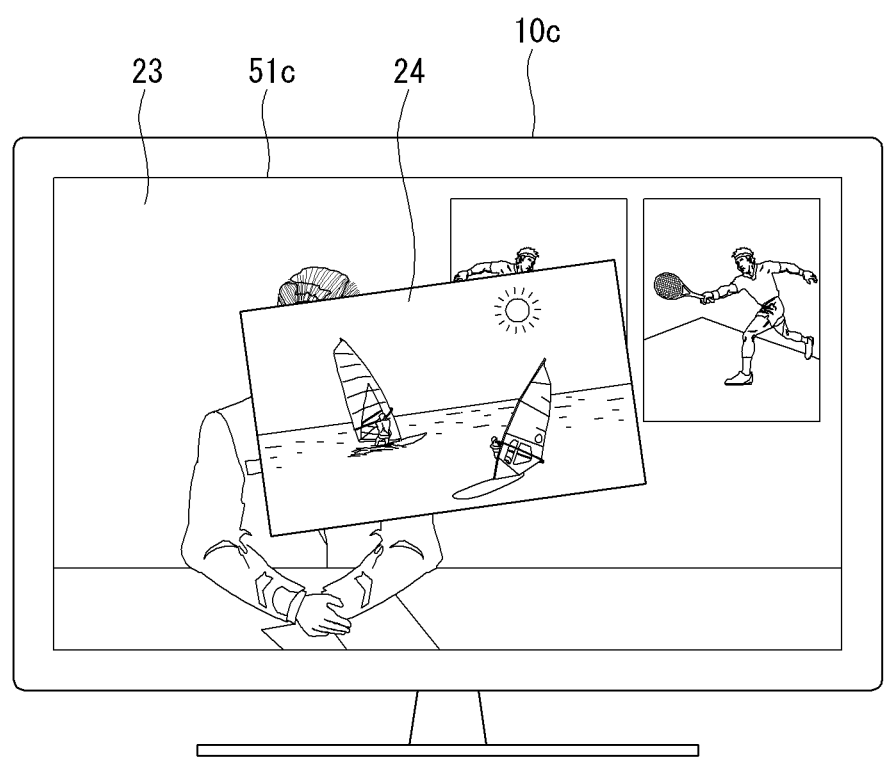

Referring to FIG. 17, the user may drag the selected content 24 to the first region 11 of the touch screen 151 at step S230. The controller 180 (FIG. 3) may detect the drag operation performed at step S230 and generate a control signal to display the selected content 24 in the display unit 51c (FIG. 9C) of the third external electronic device 10c (FIG. 9C) at step S240, as depicted in FIG. 18.

Step S240 may be performed in various ways. For example, the controller 180 (FIG. 3) of the electronic device 100 may send the selected content 24 directly to the third external electronic device 10c.

Alternatively, the controller 180 (FIG. 3) of the electronic device 100 may send information about the source of the selected content 24 to the third external electronic device 10c. After receiving the information about the source of the selected content 24, the third external electronic device 10c may receive the content 24 based on the information about the source and display the received content.

For example, when the content 24 is stored in the first external electronic device 10a (FIG. 9A), the controller 180 may inform the third external electronic device 10c that the content 24 is stored in the first external electronic device 10a. The third external electronic device 10c may request the content 24 from the first external electronic device 10a, receive the content 24 from the first external electronic device 10a, and display the received content.

Figure 19:
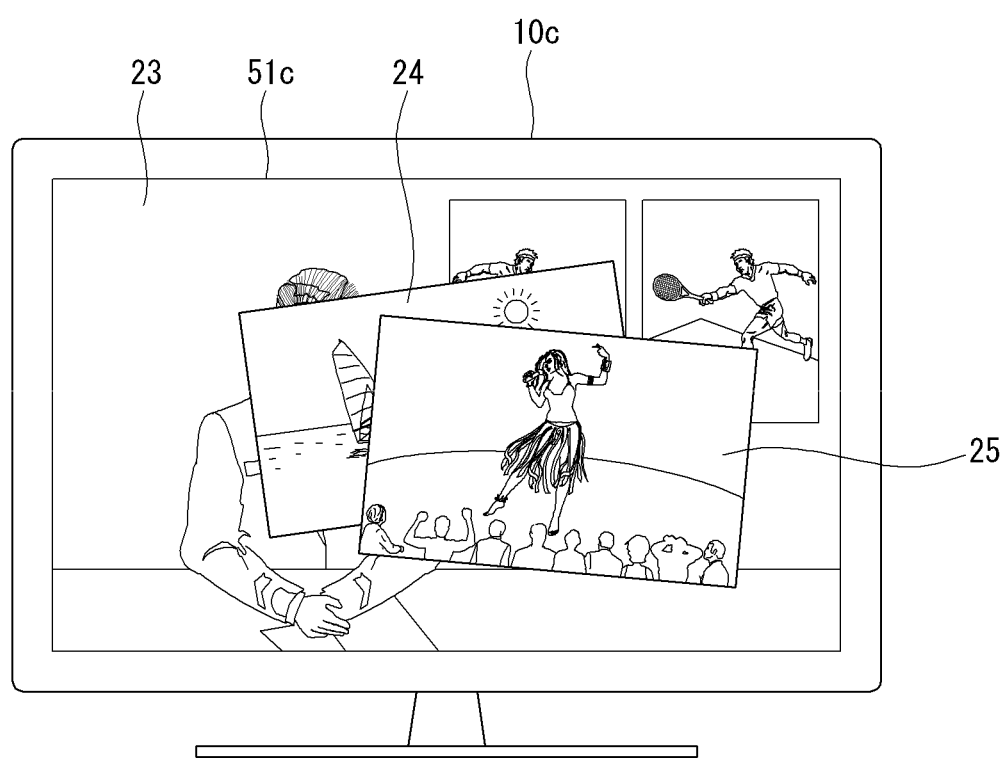

FIG. 19 is a diagram showing an example in which additional content 25 is also displayed on the display unit 51c of the third external electronic device 10c according to the execution of step S240. For example, a user may select a plurality of content items displayed in the middle region 15 of the touch screen 151 of the electronic device 100 and drag the plurality of content items to the first region 11 of the touch screen 151 of the electronic device 100. When the plurality of content items are dragged to the first region 11 of the touch screen 151, the plurality of content items can be displayed in the display unit 51c of the external electronic device 10c.

Figure 20:
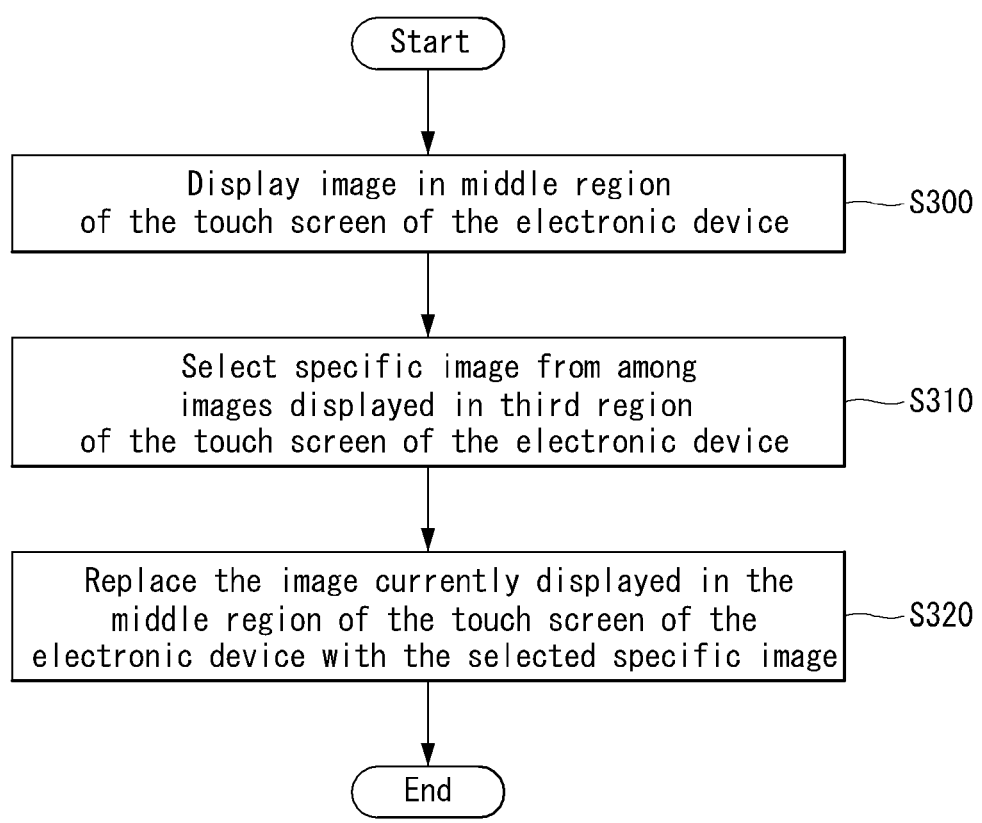
FIG. 20 is a flowchart illustrating a method of controlling an electronic device according to a third embodiment of the invention.
Figure 21:
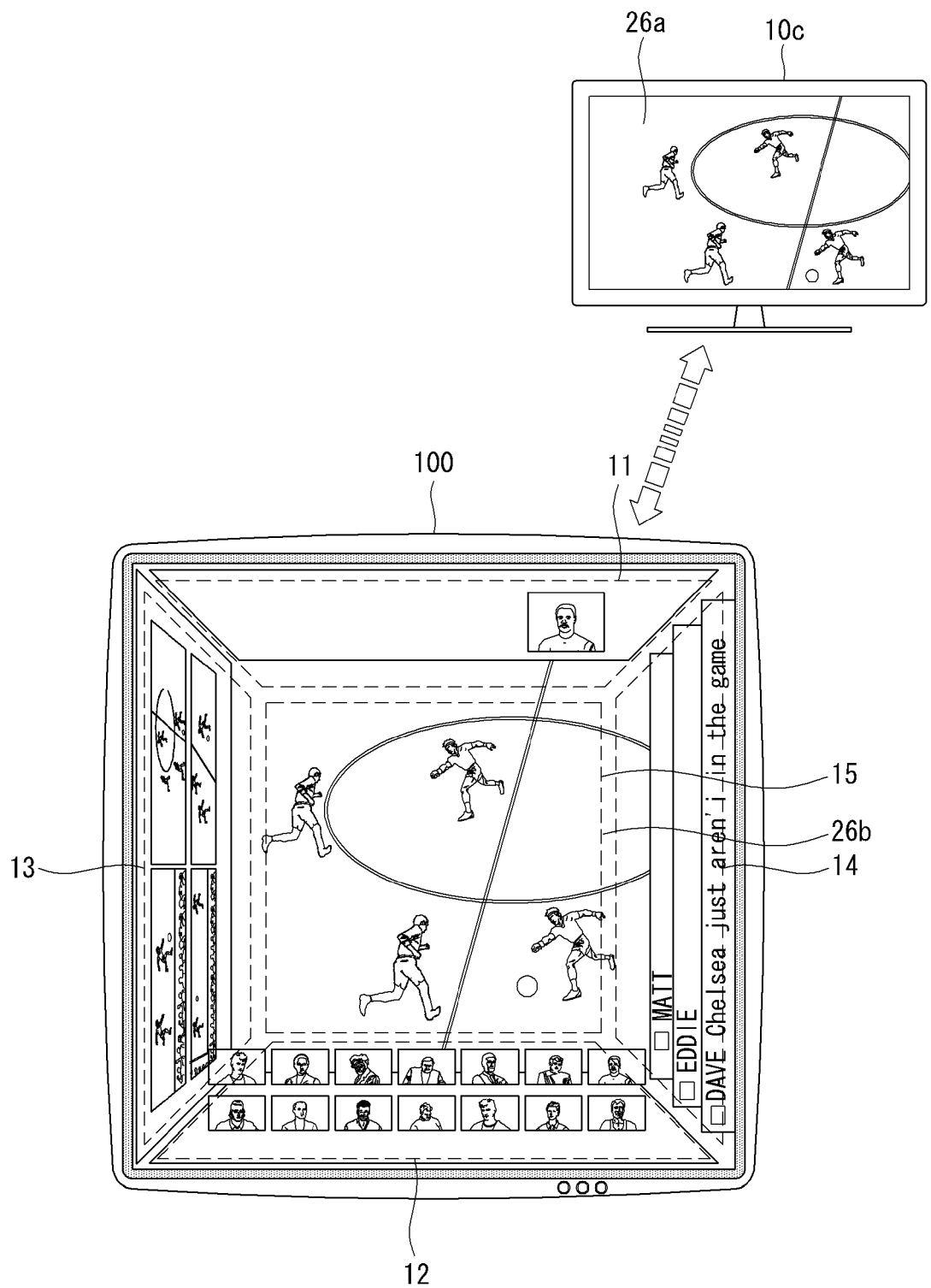
FIGS. 21 and 22 are diagrams illustrating the method of controlling an electronic device according to the third embodiment of the invention.
Figure 22:
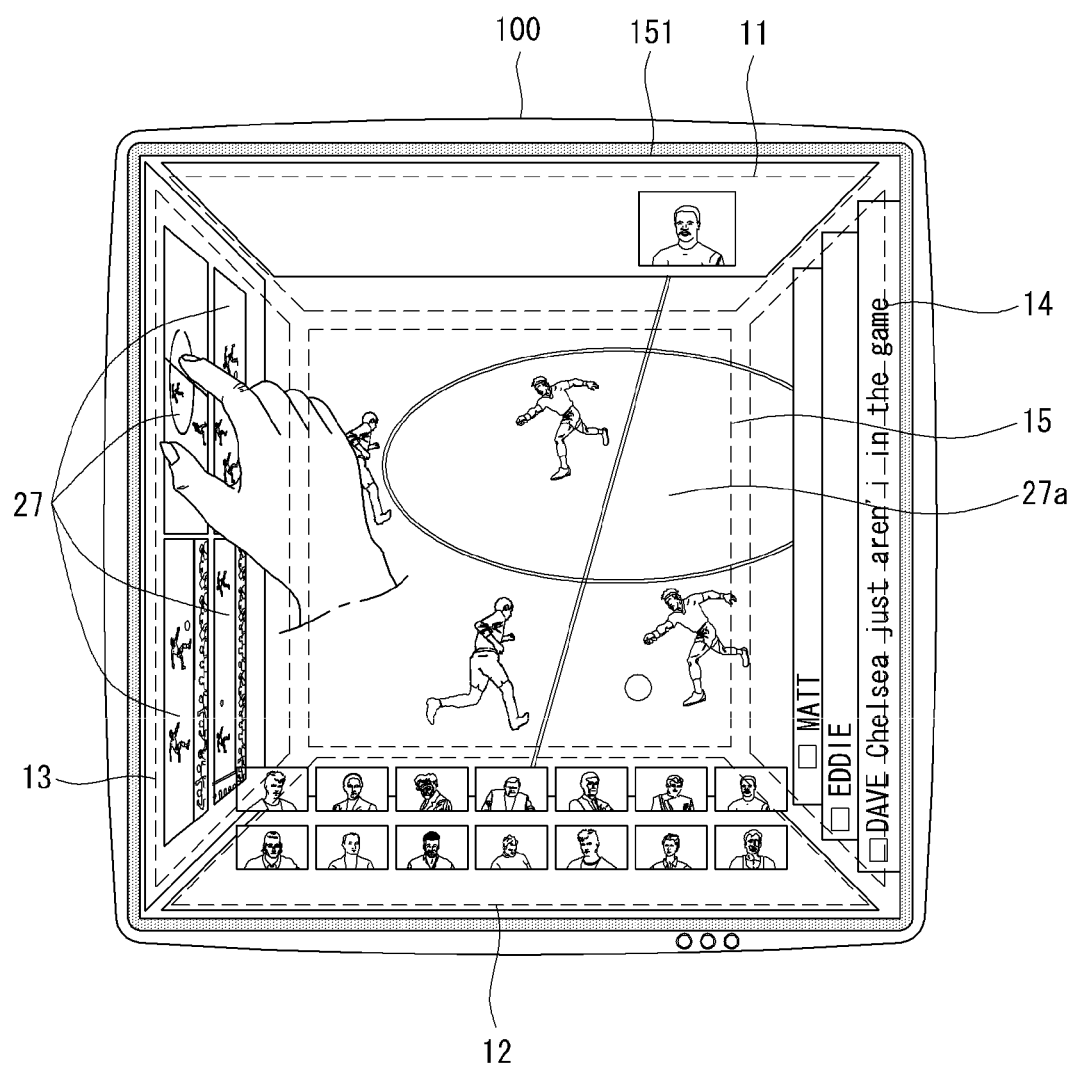

FIG. 20 is a flowchart illustrating a method of controlling an electronic device according to a third embodiment of this invention. FIGS. 21 and 22 are diagrams illustrating the method of controlling an electronic device according to the third embodiment of this invention.

The method of controlling an electronic device according to the third embodiment of this invention may be implemented in the system environment and the electronic device 100 described with reference to FIGS. 1 to 8. The method of controlling an electronic device according to the third embodiment of this invention and the operations of the electronic device 100 for implementing the method are described in detail below with reference to FIGS. 20-22.

Referring to FIGS. 20 and 21, the controller 180 (FIG. 3) of the electronic device 100 may display an image in the middle region 15 of the touch screen 151 at step S300. In this embodiment, the image displayed at step S300 is not limited to a specific source. For example, the image displayed in the middle region 15 of the touch screen 151 may be content stored in the memory 160 (FIG. 3) of the electronic device 100, content received through the broadcast receiving module 111 (FIG. 3), content received from the external electronic devices 10a-10c (FIG. 1), or content received from the server 300 (FIG. 2) over the network 200 (FIG. 2).

Meanwhile, the controller 180 (FIG. 3) may control a list of one or more images depicting different viewpoints of an object. As depicted in FIG. 21, the list of one or more images may be displayed in the third region 13 of the touch screen 151. At least one of the one or more images depicting the different viewpoints of the object may be related to an image displayed in the middle region 15 of the touch screen 151.

For example, the electronic device 100 may share broadcast content received by the third external electronic device 10c over a broadcasting network and display the broadcast content in the middle region 15 of the touch screen 151. In the example depicted in FIGS. 21 and 22, the broadcast content is a soccer game.

Furthermore, the electronic device 100 may display an image corresponding to a viewpoint seen from a broadcast relay base in the middle region 15 of the touch screen 151. The electronic device 100 may also provide a plurality of images corresponding to different viewpoints, such as an image corresponding to a viewpoint seen from the left side of a goalpost and an image corresponding to a viewpoint seen from the right side of the goalpost, in the third region 13 of the touch screen 151.

FIG. 21 shows an example in which the third external electronic device 10c and the electronic device 100 share broadcast content and output the same broadcast content. For example, a first broadcast content 26a is displayed in the third external electronic device 10c and a second broadcast content 26b displayed in the touch screen 151 of the electronic device 100 are the same.

Referring to FIGS. 20 and 22, the controller 180 (FIG. 3) may receive a selection signal for a specific one of the images displayed in the third region 13 at step S310. At step S320, the controller 180 may replace an image currently displayed in the middle region 15 of the touch screen 151 with the image selected at step S310.

With further reference to FIG. 22, the third region 13 of the touch screen 151 provides a plurality of images 27 of an object having different viewpoints than the image of the same object displayed in the middle region 15 of the touch screen 151. In other words, the third region 13 of the touch screen 151 provides a plurality of images depicting different viewpoints of the same content as the content displayed in the middle region 15 of the touch screen 151.

In FIG. 22, when a user selects a specific image 27a from among the plurality of images 27 provided in the third region 13 of the touch screen 151, the controller 180 (FIG. 3) may control the touch screen to display the selected image 27a in the middle region 15 of the touch screen. Moreover, the controller may control the touch screen 151 to display the image currently displayed in the middle region 15 of the touch screen 151 at the position where the selected image 27a was displayed in the third region 13 of the touch screen, thereby swapping the images.

Figure 23:
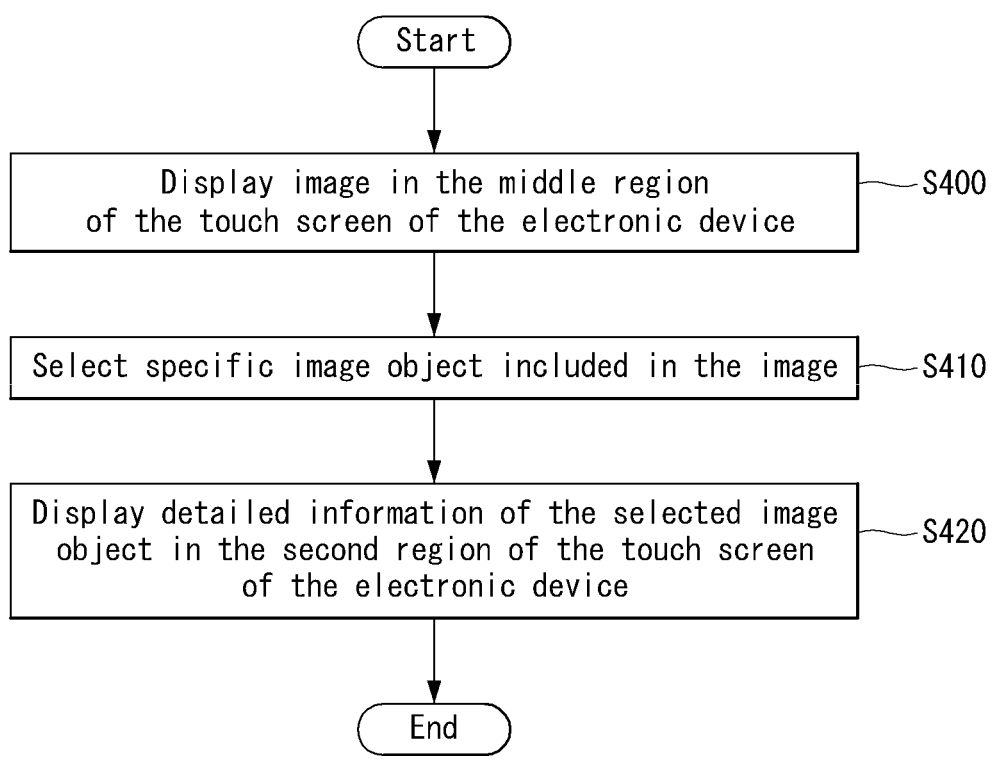
FIG. 23 is a flowchart illustrating a method of controlling an electronic device according to a fourth embodiment of the invention.
Figure 24:
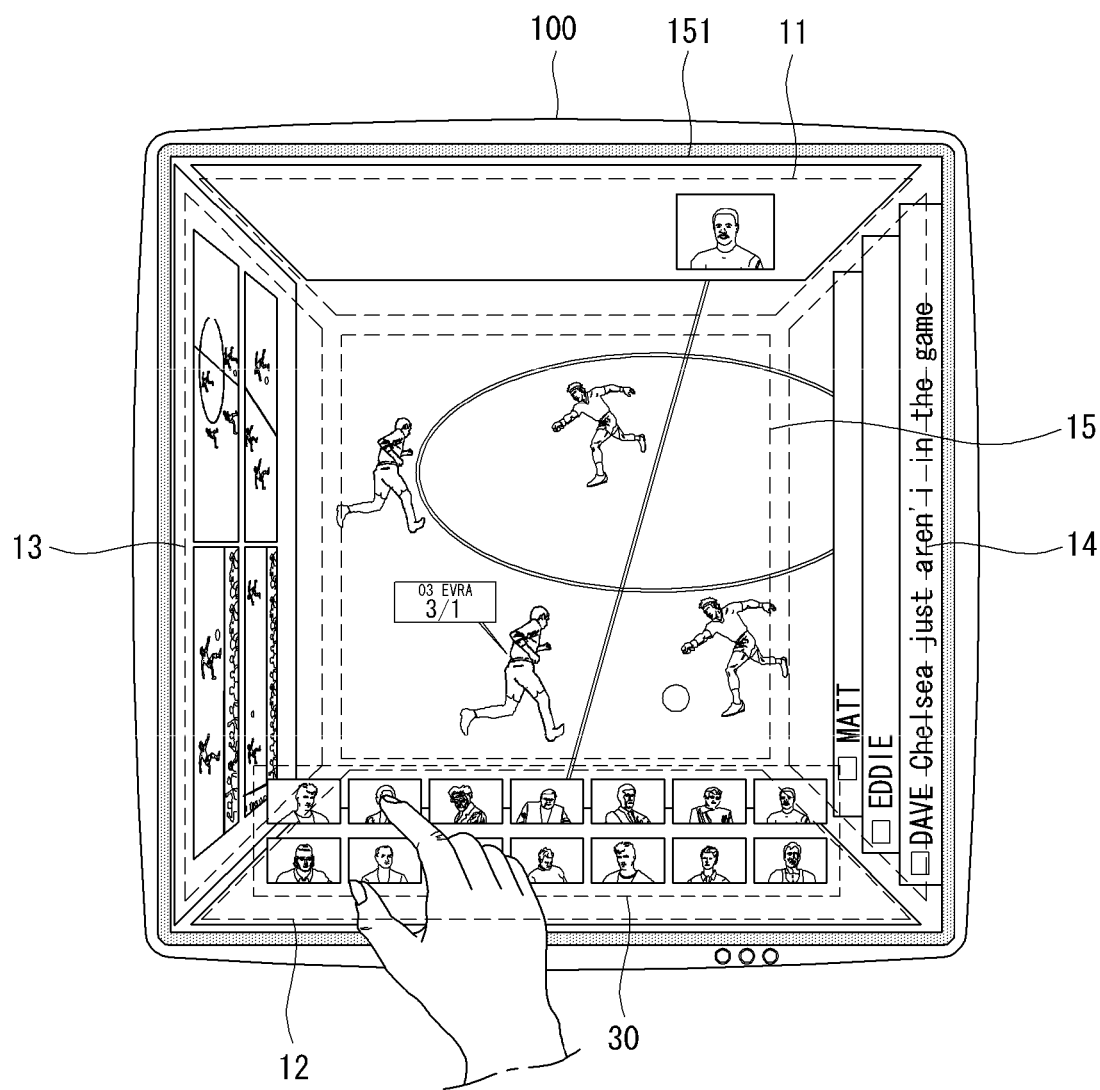
FIGS. 24 and 25 are diagrams illustrating the method of controlling an electronic device according to the fourth embodiment of the invention.
Figure 25:
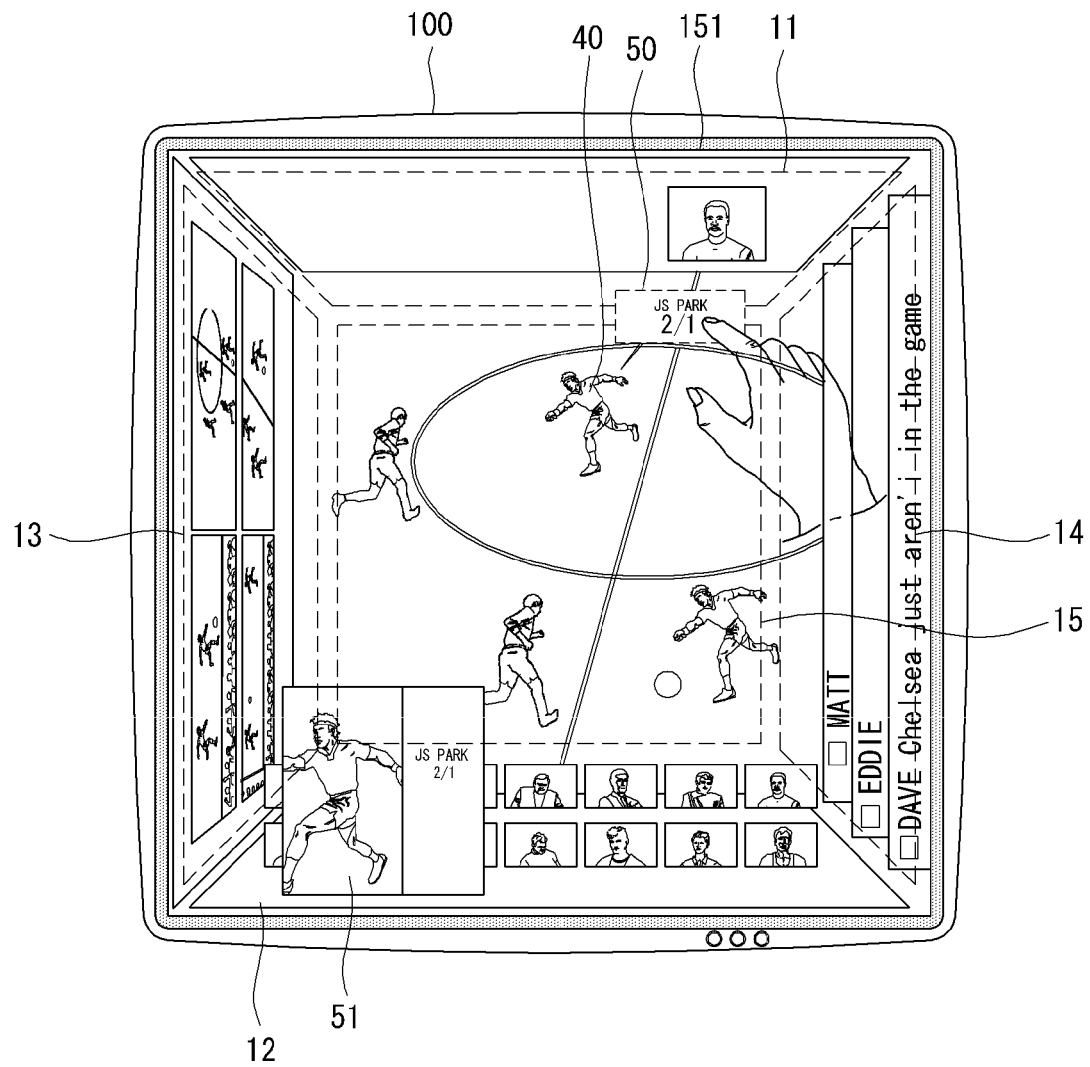

FIG. 23 is a flowchart illustrating a method of controlling an electronic device according to a fourth embodiment of this invention. FIGS. 24 and 25 are diagrams illustrating the method of controlling an electronic device according to the fourth embodiment of this invention.

The method of controlling an electronic device according to the fourth embodiment of this invention may be implemented in the system environment and the electronic device 100 described with reference to FIGS. 1 to 8. The method of controlling an electronic device according to the fourth embodiment of this invention and the operations of the electronic device 100 for implementing the method are described in detail below with reference to FIGS. 23-25.

Referring to FIGS. 23 and 24, the controller 180 (FIG. 3) of the electronic device 100 may control the touch screen 151 to display an image in the middle region 15 of the touch screen 151 at step S400. Step S400 is the same as the step S300 according to the third embodiment of this invention illustrated in FIG. 20. The controller 180 may control the touch screen 151 to display, in the second region 12 of the touch screen, detailed information related to the image displayed in the middle region 15 of the touch screen 151.

FIG. 24 shows an example in which the detailed information related to the image displayed in the middle region 15 is displayed in the second region 12. For example, in FIG. 24, the image displayed in the middle region 15 may be broadcast content related to a soccer game. Here, the controller 180 (FIG. 3) may control the touch screen 151 to display, in the second region 12 of the touch screen, detailed information about players who are now playing the soccer game.

Meanwhile, the image displayed in the middle region 15 of the touch screen 151 may include one or more selectable image objects. For example, in FIG. 24, the players included in the image displayed in the middle region 15 may correspond to the selectable image objects. The controller 180 (FIG. 3) may receive a selection signal for a specific one of the one or more selectable image objects of the image at step S410. The controller 180 may control the touch screen 151 to display, in the second region 12 of the touch screen, detailed information about the selected image object at step S420.

FIG. 25 shows an example of a screen performed at steps S410 and S420 of FIG. 23. For example, referring to FIG. 25, a user may select a specific player 40 included in the image displayed in the middle region 15 of the touch screen 151 or a tag 50, related to the specific player 40, displayed on the touch screen. When the player 40 or the tag 50 is selected, the controller 180 (FIG. 3) may control the touch screen 151 to display, in the second region 12 of the touch screen, detailed information about the selected player 40 or tag 50.

Figure 26:
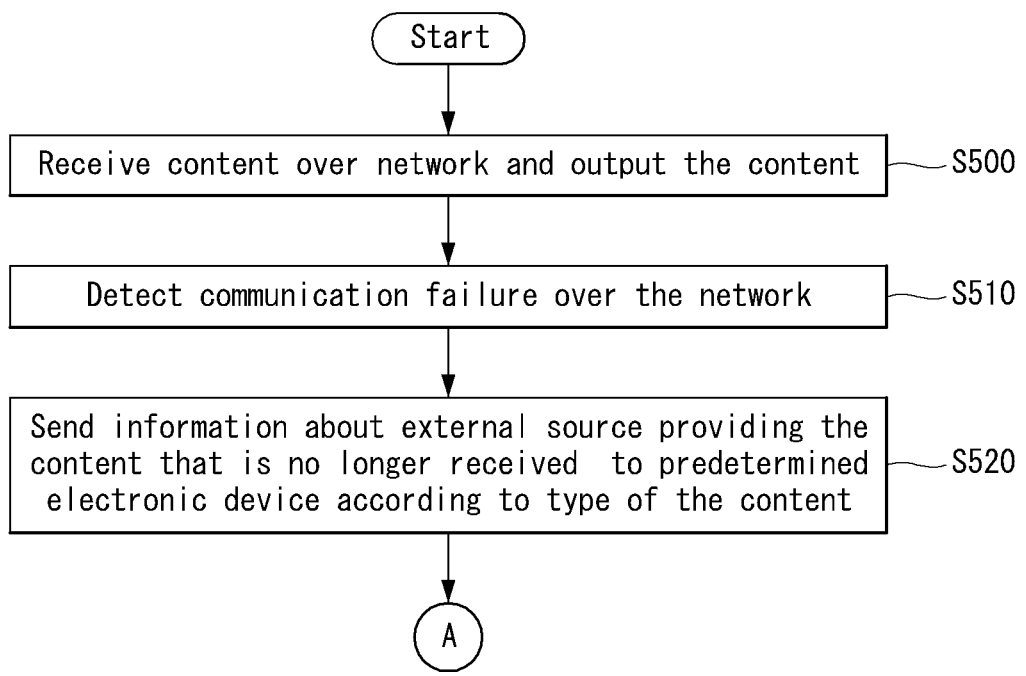
FIG. 26 is a flowchart illustrating a method of an electronic device sending information according to a fifth embodiment of the invention.
Figure 27:
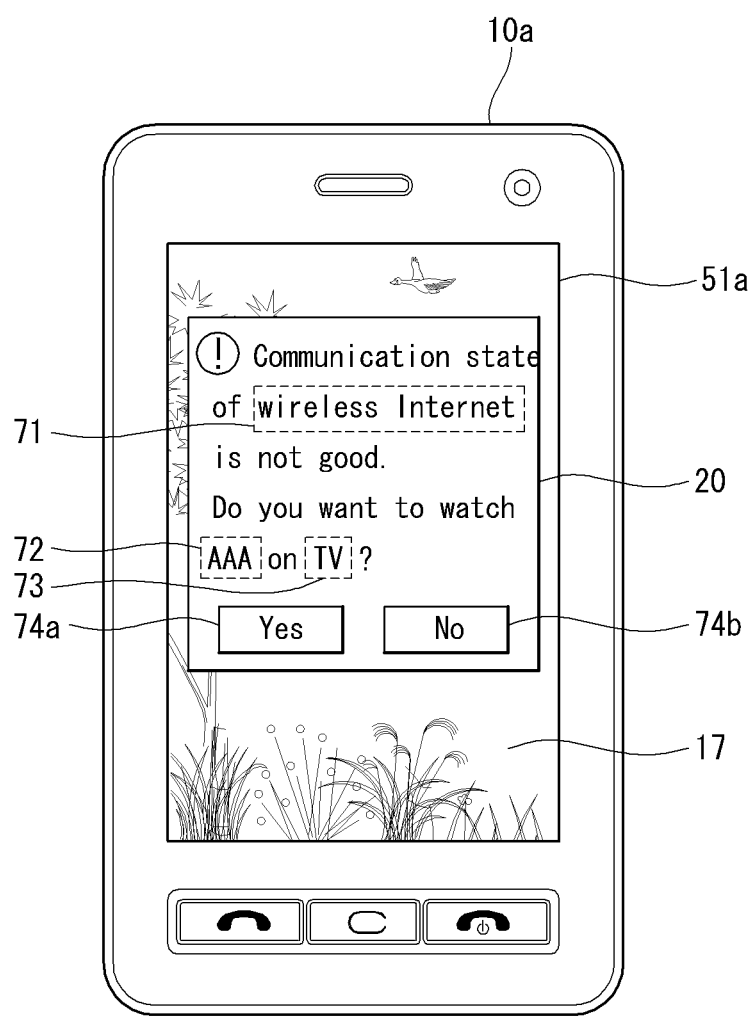
FIG. 27 is a diagram illustrating the method of an electronic device sending information according to the fifth embodiment of the invention.

FIG. 26 is a flowchart illustrating a method of an electronic device sending information according to a fifth embodiment of this invention. FIG. 27 is a diagram illustrating the method of an electronic device sending information according to the fifth embodiment of this invention.

The method of an electronic device sending information according to the fifth embodiment of this invention may be implemented in each of the plurality of electronic devices 100 and 10a-10c described with reference to FIGS. 1 to 8. Hereinafter, the method of an electronic device sending information according to the fifth embodiment of this invention and the operations of the first external electronic device 10a for implementing the method are described in detail on the basis of the first external electronic device 10a for convenience of description. The method of an electronic device sending information according to the fifth embodiment of this invention may also be implemented in each of the second external electronic device 10b (FIG. 9B), the third external electronic device 10c (FIG. 9C), and the electronic device 100 (FIG. 1).

Referring to FIG. 26, the first external electronic device 10a may receive content from the network 200 (FIG. 2) and output the received content at step S500. The first external electronic device 10a can detect communication failure over the network 200 while receiving and outputting the content at step S510. When communication over the network 200 fails, the first external electronic device 10a no longer receives the content.

At step S520, the first external electronic device 10a may send information about an external source providing the content that is no longer received to a predetermined electronic device according to the type of the content being received and output. Step S520 may be automatically performed without a process of confirming a user or may be performed after confirming a user. In performing step S520, the first external electronic device 10a may send a control signal including a command to continue to output the content, together with the information about the external source, to the predetermined electronic device.

FIG. 27 is a diagram showing an example in which the step S520 is performed after confirming a user. When step S520 is preset so that it is performed after confirming a user, the controller of the first external electronic device 10a may control the display unit 51a to display a user interface (UI) 20 for confirming the user. The user interface 20 may include information 71 about the type of network 200 (FIG. 2) over which the content is being received, information about the content 17, such as a title 72, and information 73 about the predetermined electronic device. Here, the predetermined electronic device may be at least one of the second external electronic device 10b (FIG. 9B), the third external electronic device 10c (FIG. 9C), and the electronic device 100 (FIG. 1). In the example of FIG. 27, the predetermined electronic device is the third external electronic device 10c. A user may check a communication failure condition while seeing the information items 71, 72, and 73 provided in the user interface 20 and determine whether to continue to watch the content 17 in the predetermined electronic device by selecting a "Yes" button 74a or a "No" button 74b provided in the user interface 20.

Meanwhile, the first external electronic device 10a may send information about the content 17 to the predetermined electronic device, in addition to the information related to the external source. For example, when the content 17 output at step S500 is video, the first external electronic device 10a may send, to the predetermined electronic device, information about a frame of the video at which output was stopped because of the communication failure. The predetermined electronic device may receive the information about the frame and play the video from the frame where the output was stopped.

As another example, when the content 17 output at step S500 is a web page, the first external electronic device 10a may send, to the predetermined electronic device, user information for logging onto a website providing the web page and an access history of the user to the website, such as cookie information. Accordingly, the predetermined electronic device can automatically log onto the website using the user information or the cookie information without an additional login process or without storing information for the login in its storage unit.

Figure 28:
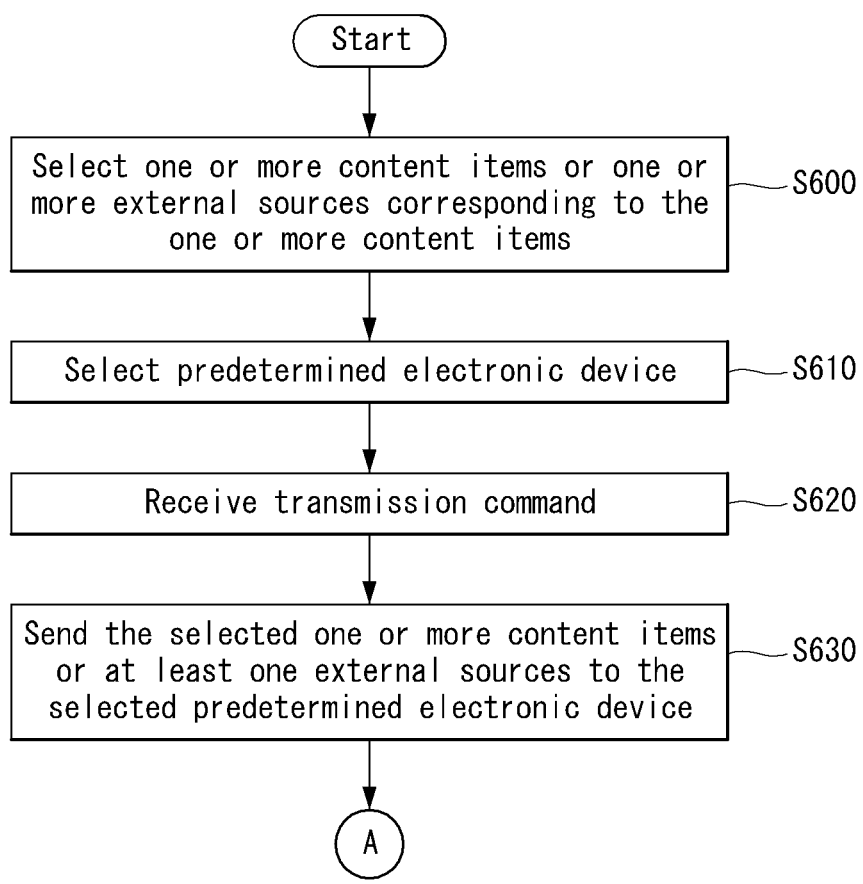
FIG. 28 is a flowchart illustrating a method of an electronic device sending information according to a sixth embodiment of the invention.

FIG. 28 is a flowchart illustrating a method of an electronic device sending information according to a sixth embodiment of this invention. FIGS. 29A to 29C and 30 are diagrams illustrating the method of an electronic device sending information according to the sixth embodiment of this invention.

The method of an electronic device sending information according to the sixth embodiment of this invention may be implemented in each of the plurality of electronic devices 100 and 10a-10c described with reference to FIGS. 1 to 8. For convenience of description, the method of an electronic device sending information according to the sixth embodiment of this invention and the operations of an electronic device for implementing the method are described in detail in relation to the first external electronic device 10a. Alternatively, the method of an electronic device sending information according to the sixth embodiment of this invention may also be implemented in each of the second external electronic device 10b (FIG. 9B), the third external electronic device 10c (FIG. 9C), and the electronic device 100 (FIG. 1).

Referring to FIG. 28, the first external electronic device 10a may select one or more content items or one or more external sources corresponding to the one or more content items at step S600. Such selection may be performed automatically or performed by a user according to a predetermined criterion.

Figure 29A:
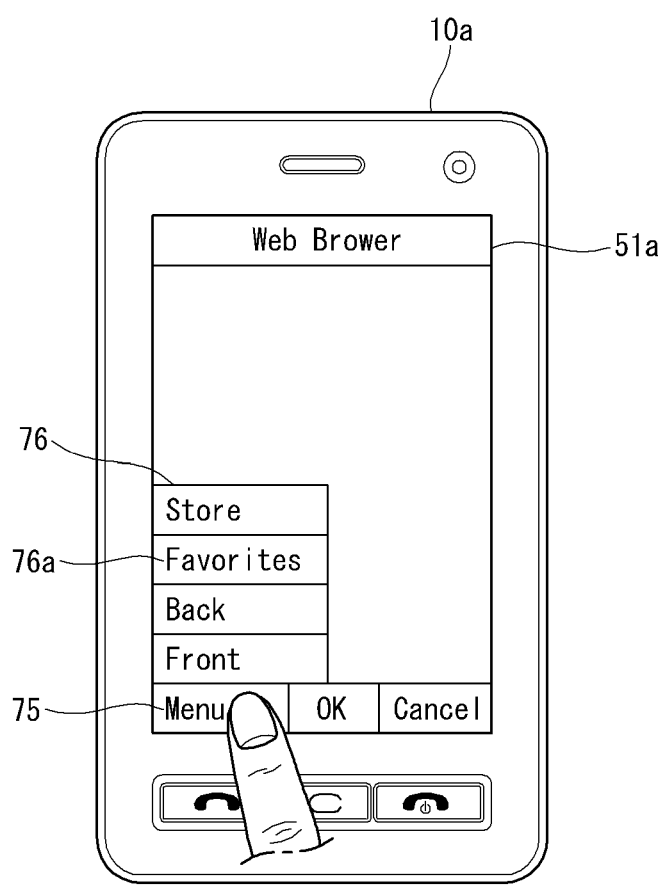
Figure 29B:
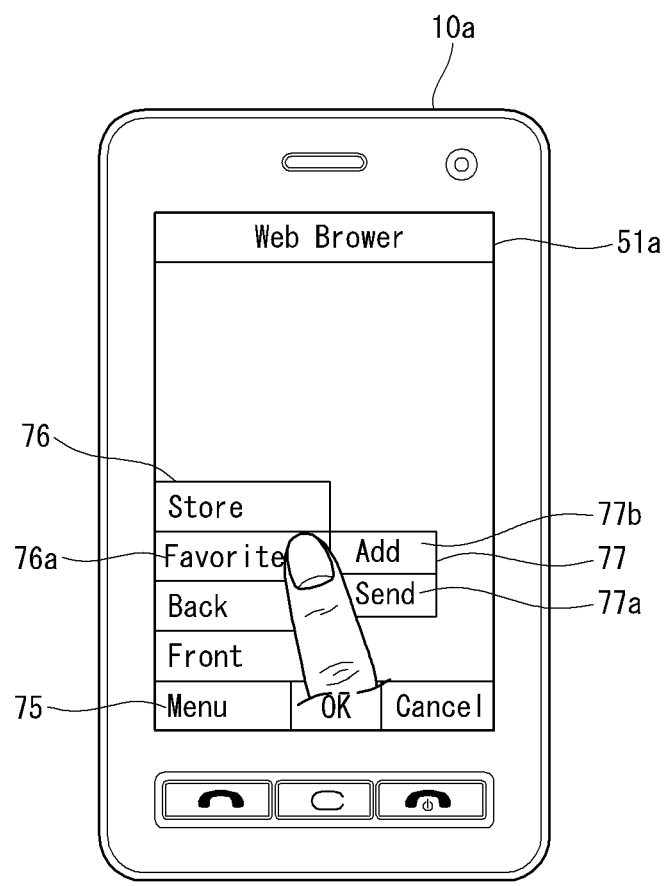

FIGS. 29A and 29B show examples in which a user selects one or more external sources. For example, FIG. 29A depicts a web browser that is driven in the first external electronic device 10a. When a user selects a menu button 75 displayed in the display unit 51a of the first external electronic device 10a, the first external electronic device 10a may display a menu window 76 including a plurality of menus.

The menu window 76, as shown in FIG. 29A, may include a Favorites menu 76a. The Favorites menu 76a includes a list of one or more favorite websites ("Favorites list"). The web browser may manage the Favorites list. Memory or an external storage included in the first external electronic device 10a may store information about the one or more websites included in the Favorites list.

As depicted in FIG. 29B, when a user selects the Favorites menu 76a, the first external electronic device 10a may provide a sub-menu window 77 including sub-menus regarding the Favorites list. The sub-menu window 77 may include at least a 'Send' button 77a and an 'Add' button 77b. When the user selects the 'Send' button 77a included in the sub-menu window 77, the first external electronic device 10a selects a list of the websites included in the Favorites list managed by the web browser.

The first external electronic device 10a may select a predetermined electronic device at step S610 of FIG. 28. As with step S600, step S610 may be performed automatically or performed by a user according to a predetermined criterion. The predetermined electronic device selected at step S610 may be, for example, one or more of the second external electronic device 10b (FIG. 9B), the third external electronic device 10c (FIG. 9C), or the electronic device 100 (FIG. 1).

Figure 29C:
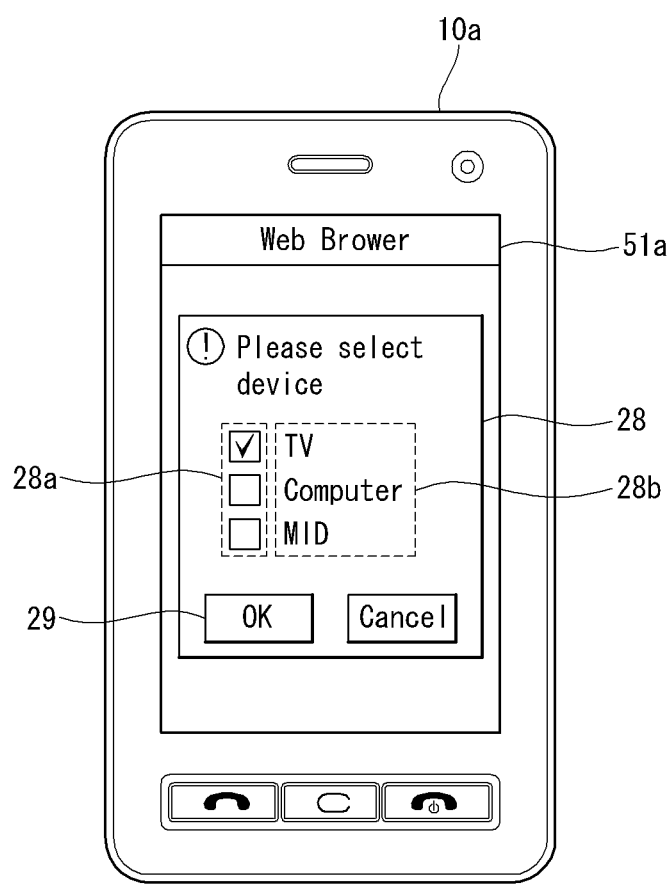

FIG. 29C depicts an example of a screen displayed in the display unit 51a of the first external electronic device 10a when the 'Send' button 77a is selected in FIG. 29B. The screen is used to select one or more electronic device to which the websites in the Favorites list will be sent when the Favorites menu 76a has been selected. The screen includes a window 28 that may be used to select the one or more electronic device to which the websites in the Favorites list will be sent The window 28 may include check boxes 28a and a list 28b of electronic devices corresponding to each of the check boxes 28a. The user may select the one or more electronic device via the check boxes 28a. In FIG. 29C, a check box corresponding to 'TV' is selected, as an example.

Referring again to FIG. 28, the first external electronic device 10a may receive a transmission command at step S620 that instructs that the one or more content items or one or more external sources selected at step S600 be sent to the predetermined electronic device selected at step S610. The first external electronic device 10a may send the selected one or more content items or one or more external sources to the selected predetermined electronic device at step S630 in response to the transmission command of step S620. In one example, the first external electronic device 10a sends the selected Favorites list to the selected TV upon selection of an 'OK' button 29 displayed in the window 28.

FIG. 30 shows an example of the Favorites list. The Favorites list may include information about websites registered by a user or added automatically. The Favorites list may include, for example, web addresses 30, IDs 31 and passwords 32 for logging in to specific web sites. FIG. 30 shows the Favorites list including information about four websites 30a, 30b, 30c, and 30d.

Figure 31:
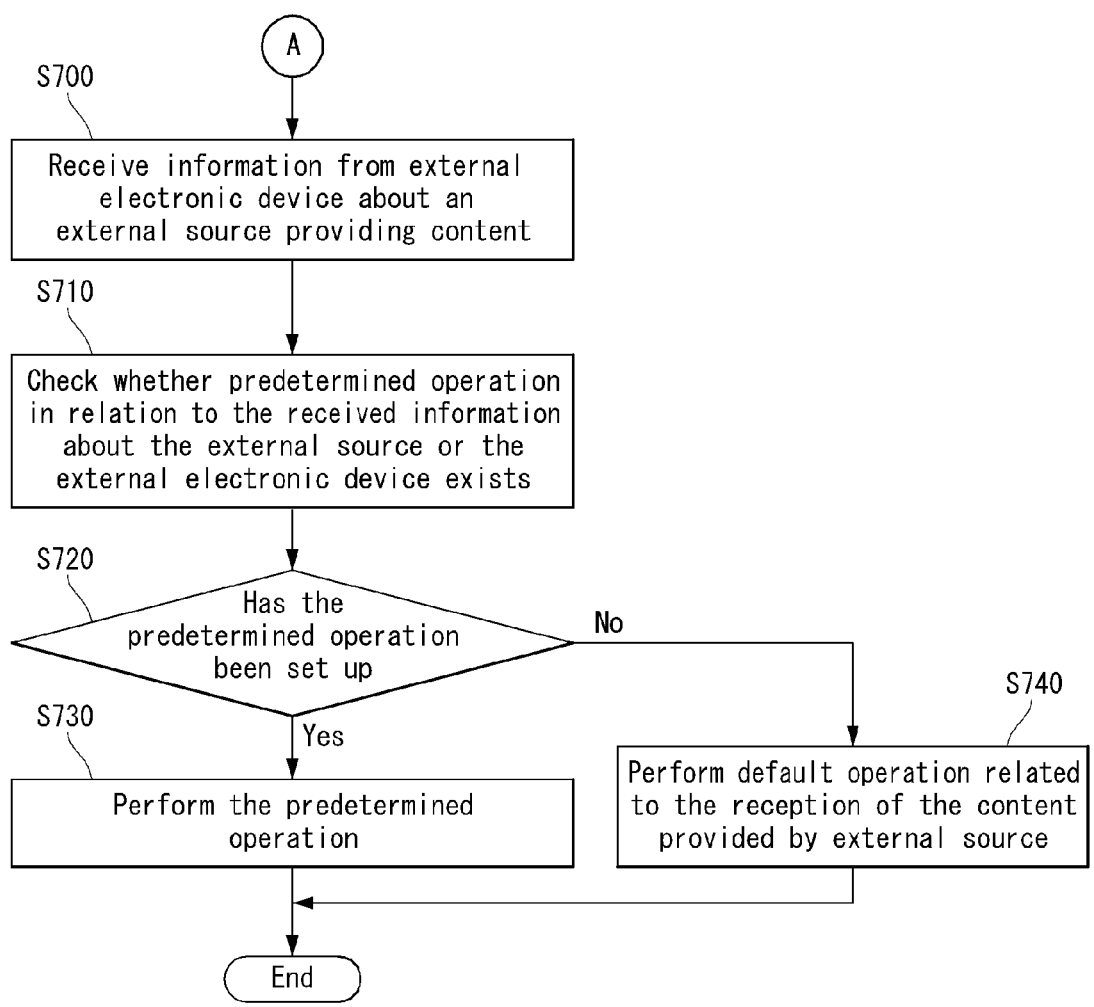
FIG. 31 is a flowchart illustrating a method of controlling an electronic device according to a seventh embodiment of the invention.

FIG. 31 is a flowchart illustrating a method of controlling an electronic device according to a seventh embodiment of this invention. The method of controlling the electronic device according to the seventh embodiment of this invention may be implemented in each of the plurality of electronic devices 100 and 10a-10c described with reference to FIGS. 1 to 8. The method of controlling an electronic device according to the seventh embodiment of this invention and the operations of each of the plurality of electronic devices 100 and 10 for implementing the method are described in detail below.

Referring to FIG. 31, at step S700 a specific external electronic device may receive information from an external electronic device about an external source providing content. The method of controlling an electronic device according to the seventh embodiment of this invention may be combined and implemented with the fifth or sixth embodiment, or both, of this invention.

For example, the specific external electronic device may be the second external electronic device 10b (FIG. 9B) or the third external electronic device 10c (FIG. 9C), or both. The specific external electronic device may receive information transmitted by the first external electronic device 10a according to the fifth embodiment or the sixth embodiment of this invention. The received information relates to an external source providing content.

At step S710, the specific external electronic device may check whether a predetermined operation in relation to the external electronic device or the received information about the external source exists. If the predetermined operation exists, the specific external electronic device may determine whether the predetermined operation has been set up at step S720. If it is determined at step S720 that the predetermined operation has been set up, the specific external electronic device may perform the predetermined operation at step S730. However, if is determined at step S720 that the predetermined operation has not been set up, the specific external electronic device may perform a default operation related to the reception of the content provided by the external source at step S740.

The second external electronic device 10b (FIG. 9B) or the third external electronic device 10c (FIG. 9C), or both, may also receive the information about the external source providing the content, together with information about a specific operation related to the content, from the first external electronic device 10a (FIG. 9A). In this case, the second external electronic device 10b or the third external electronic device 10c, or both, can perform the specific operation.

Figure 32:
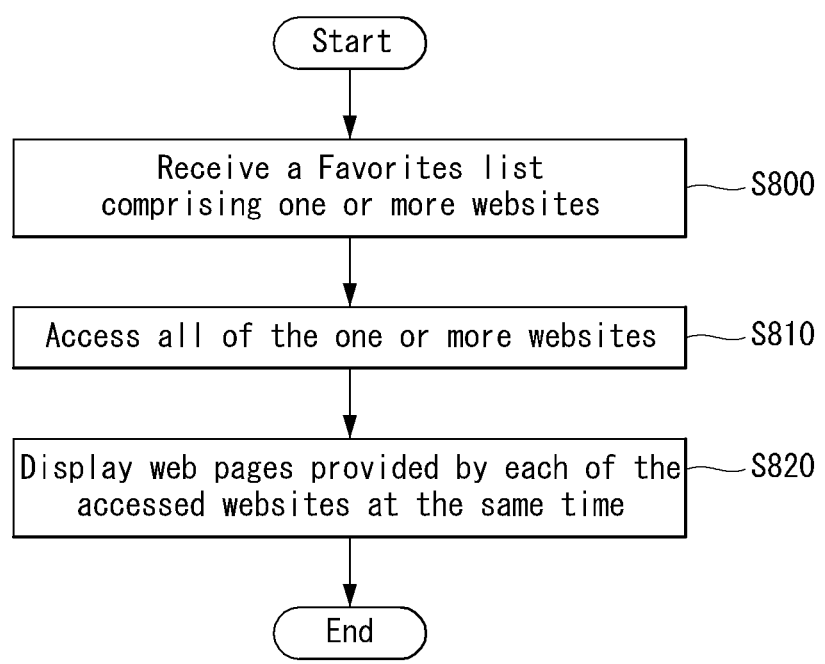
FIG. 32 is a flowchart illustrating a method of controlling an electronic device according to an eighth embodiment of the invention.
Figure 33:
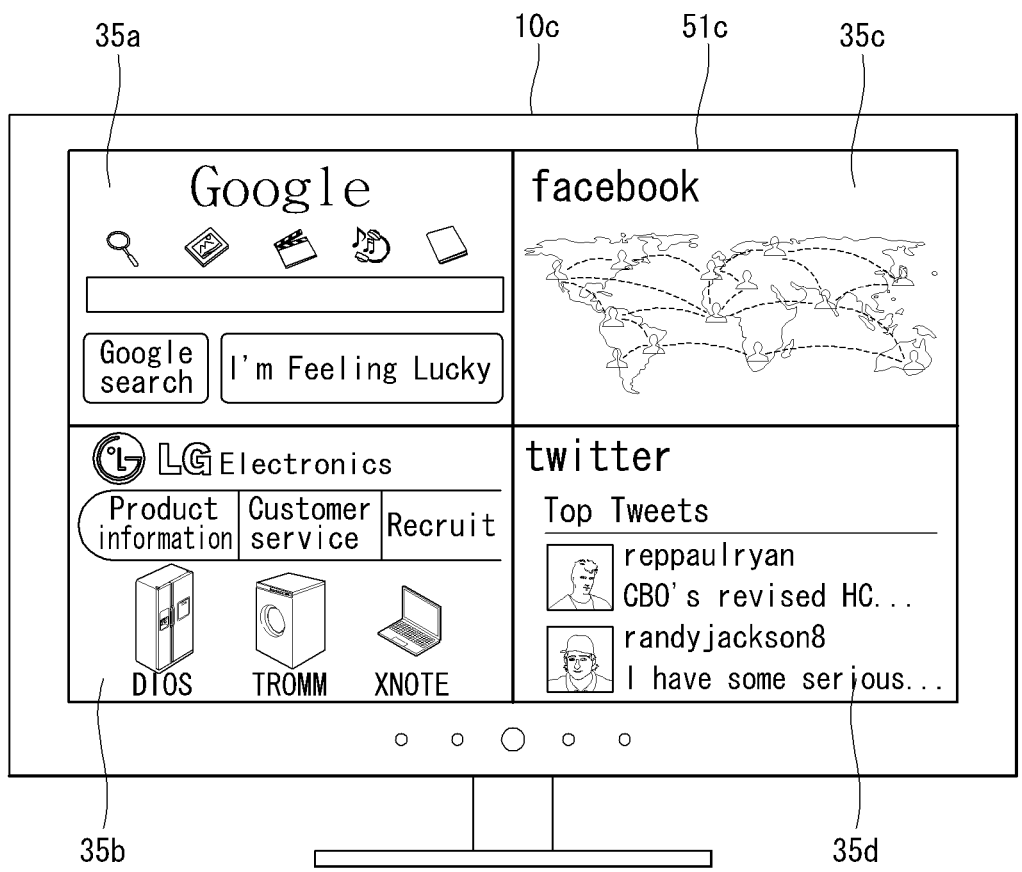
FIGS. 33 and 34 are diagrams illustrating the method of controlling an electronic device according to the eighth embodiment of the invention.
Figure 34:
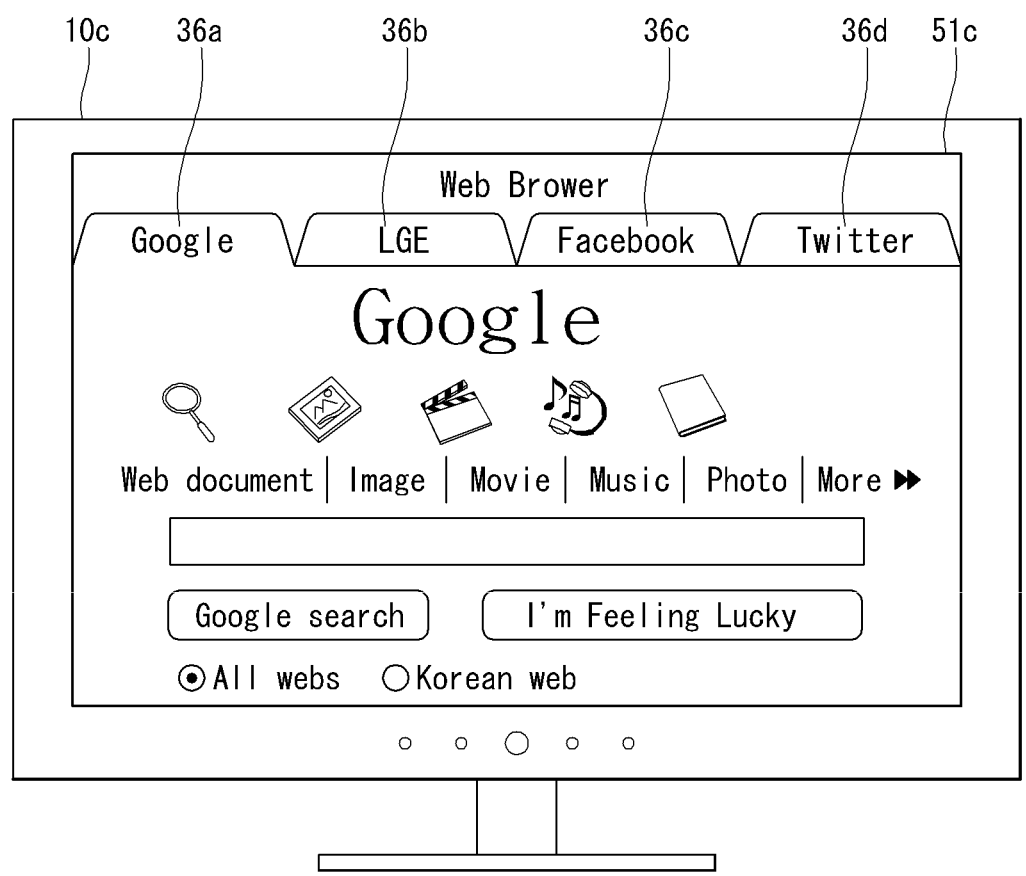

Hereinafter, eighth to eleventh embodiments of this invention are described as detailed examples of the seventh embodiment of this invention. FIG. 32 is a flowchart illustrating a method of controlling an electronic device according to the eighth embodiment of this invention. FIGS. 33 and 34 are diagrams illustrating the method of controlling an electronic device according to the eighth embodiment of this invention.

The method of controlling an electronic device according to the eighth embodiment of this invention may be implemented in each of the plurality of electronic devices 100 and 10a-10c described with reference to FIGS. 1 to 8. Hereinafter, the method of controlling an electronic device according to the eighth embodiment of this invention and the operations of the third external electronic device 10c for implementing the method are described in detail. However, the method of controlling an electronic device according to the eighth embodiment of this invention may alternatively be implemented in each of the first external electronic device 10a (FIG. 9A), the second external electronic device 10b (FIG. 9B), and the electronic device 100 (FIG. 1).

Referring to FIG. 32, the third external electronic device 10c may receive a Favorites list including one or more websites from another external electronic device (e.g., 10a or 10b) at step S800. An example of step S800 is the third external electronic device 10c receiving the Favorites list described in relation to FIG. 30 from the first external electronic device 10a (FIG. 9A) according to the embodiment described with reference to FIGS. 29A to 29C.

Referring to FIGS. 32-34, the third external electronic device 10c may access all of the one or more websites included in the received Favorites list at step S810. The third external electronic device 10c may display, in the display unit 51c, a web page provided by each of the accessed websites at the same time at step S820.

FIGS. 33 and 34 show examples of screens in which the steps S810 and S820 are implemented. For example, referring to FIG. 33, the third external electronic device 10c may access all websites included in a Favorites list, such as the websites included in the Favorites list shown in FIG. 30, received from the first external electronic device 10a and display web pages 35a, 35b, 35c, and 35d provided by the websites on the display unit 51c at the same time.

Referring to FIG. 34, the third external electronic device 10c may access all websites included in a Favorites list, such as the websites included in the Favorites list shown in FIG. 30, received from the first external electronic device 10a and display a plurality of tabs 36a, 36b, 36c, and 36d corresponding to web pages provided by each of the websites included in the Favorites list. In FIG. 34, a user may select a specific one of the plurality of tabs 36a, 36b, 36c, and 36d and the controller of the third external electronic device 10c may display, on the display unit 51c, the web page corresponding to the selected tab. However, when a specific website included in the received Favorites list is already accessed, the third external electronic device 10c may inform the user of such access and update the specific website or not perform any operation.

Figure 35:
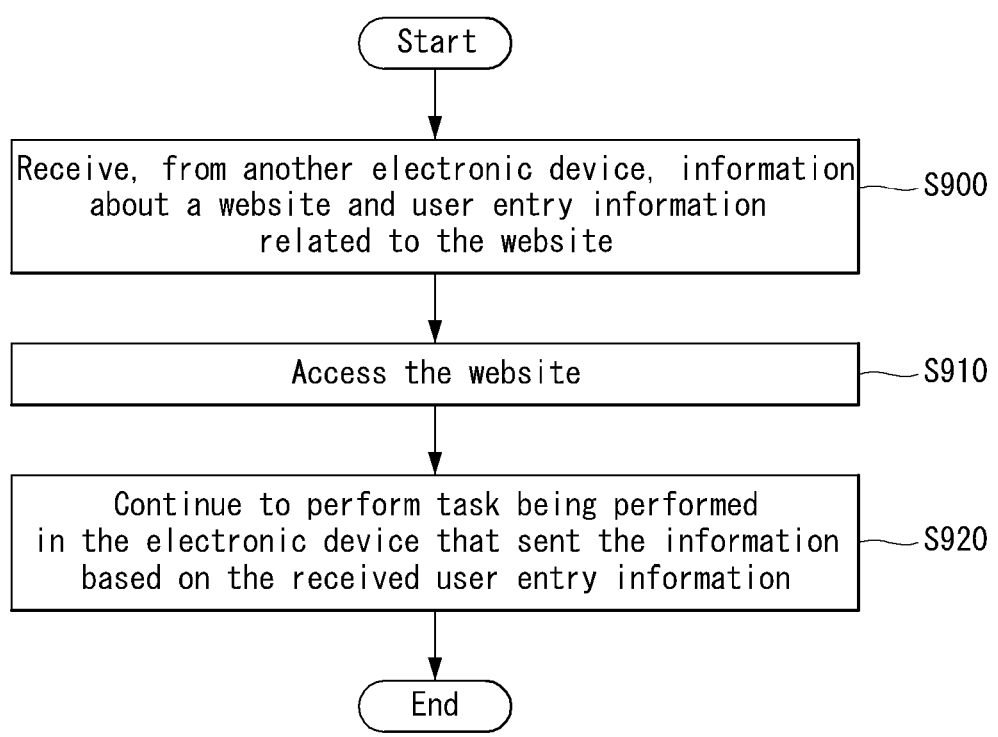
FIG. 35 is a flowchart illustrating a method of controlling an electronic device according to a ninth embodiment of the invention.
Figure 36:
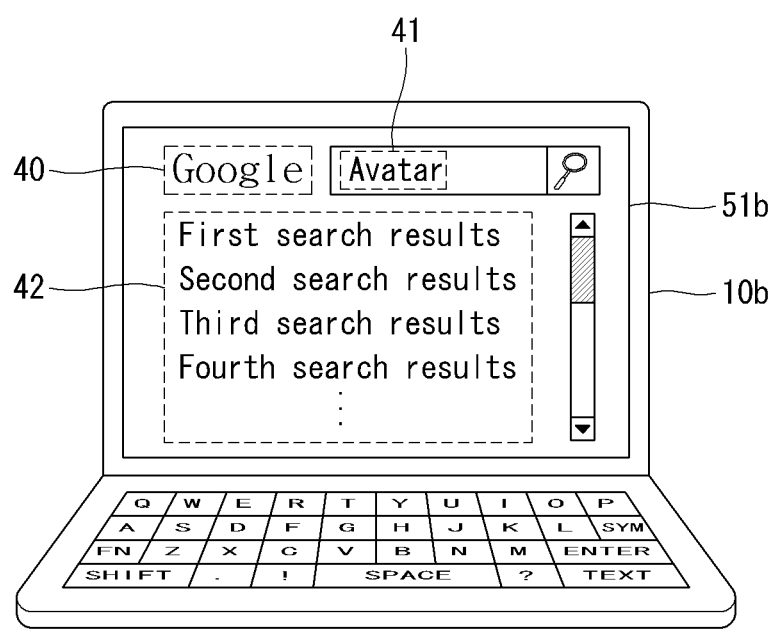
FIG. 36 is a diagram illustrating the method of controlling an electronic device according to the ninth embodiment of the invention.

FIG. 35 is a flowchart illustrating a method of controlling an electronic device according to the ninth embodiment of this invention. FIG. 36 is a diagram illustrating the method of controlling an electronic device according to the ninth embodiment of this invention.

The method of controlling an electronic device according to the ninth embodiment of this invention may be implemented in each of the plurality of electronic devices 100 and 10a-10c described with reference to FIGS. 1 to 8. Hereinafter, the method of controlling an electronic device according to the ninth embodiment of this invention and the operations of the second external electronic device 10b for implementing the method are described in detail. However, the method of controlling an electronic device according to the ninth embodiment of this invention may alternatively be implemented in each of the first external electronic device 10a (FIG. 9A), the third external electronic device 10c (FIG. 9C), and the electronic device 100 (FIG. 1).

Referring to FIGS. 35 and 36, the second external electronic device 10b may receive information about a website and user entry information related to the website from another electronic device at step S900. For example, the second external electronic device 10b may receive, from the first external electronic device 10a (FIG. 9A), a web address of a specific website and a search word input by a user for a web search being performed in the specific website.

The second external electronic device 10b may access the specific website based on the received information about the website at step S910. After accessing the website, the second external electronic device 10b may continue to perform a task that was being performed in the electronic device that sent the information based on the received user entry information at step S920. For example, a web search that was being performed in the electronic device that sent the information may continue to be performed via the accessed website by the second external electronic device 10b by using the received search word.

FIG. 36 shows an example of a screen in which steps S900 to S920 are implemented. Referring to FIG. 36, the second external electronic device 10b may receive information 40 about a website, such as "Google," and a search word 41, such as "Avatar," from the first external electronic device 10a (FIG.

9A). The second external electronic device 10b may continue to perform the web search in the website "Google" by using the search word 41. In FIG. 36, results 42 of the web search using the search word 41 are displayed on the display unit 51b.

Figure 37:
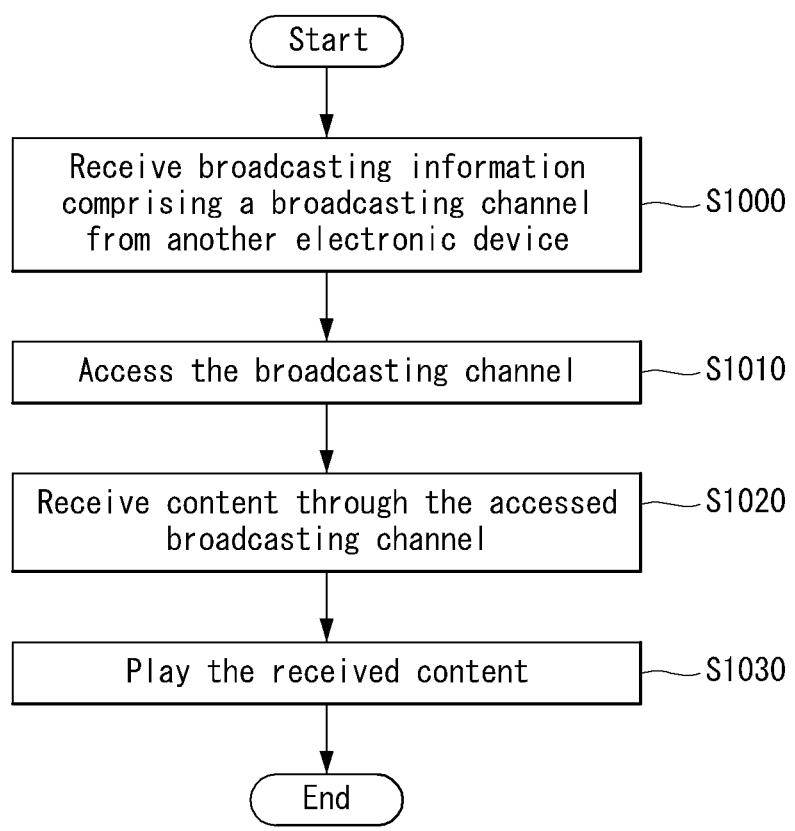
FIG. 37 is a flowchart illustrating a method of controlling an electronic device according to a tenth embodiment of the invention.
Figure 38:
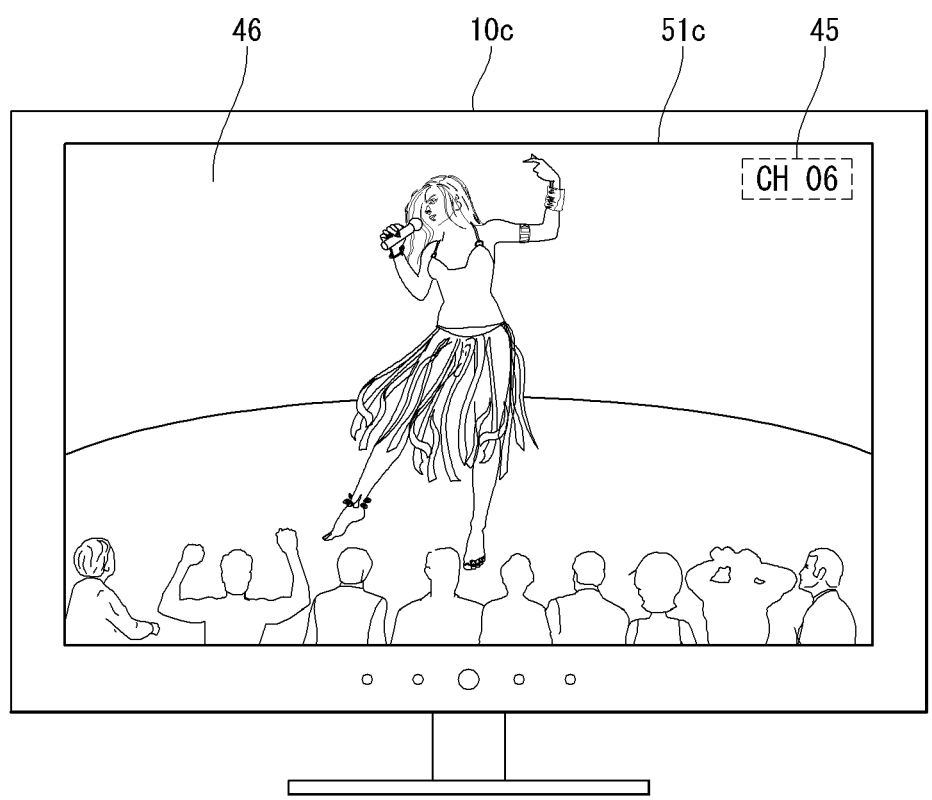
FIG. 38 is a diagram illustrating the method of controlling an electronic device according to the tenth embodiment of the invention.

FIG. 37 is a flowchart illustrating a method of controlling an electronic device according to the tenth embodiment of this invention. FIG. 38 is a diagram illustrating the method of controlling an electronic device according to the tenth embodiment of this invention.

The method of controlling an electronic device according to the tenth embodiment of this invention may be implemented in each of the plurality of electronic devices 100 and 10a-10c described with reference to FIGS. 1 to 8. Hereinafter, the method of controlling an electronic device according to the tenth embodiment of this invention and the operations of the third external electronic device 10c for implementing the method are described in detail. However, the method of controlling an electronic device according to the tenth embodiment of this invention may alternatively be implemented in each of the first external electronic device 10a (FIG. 9A), the second external electronic device 10b (FIG. 9B), and the electronic device 100 (FIG. 1).

Referring to FIGS. 37 and 38, the third external electronic device 10c may receive broadcast information, including a broadcast channel, from another electronic device at step S1010. The third external electronic device 10c may access the broadcast channel included in the broadcast information at step S1010 and receive content through the accessed broadcast channel at step S1020. The third external electronic device 10c may play the received content at step S1030.

FIG. 38 shows an example of a screen in which the third external electronic device 10c receives broadcast information including a broadcast channel 45 from the first external electronic device 10a, accesses the broadcast channel 45, receives the content 46 through the broadcast channel 45, and plays the received content 46. Video of the received content 46 may be displayed on the display unit 51c of the third external electronic device 10c.

Figure 39:
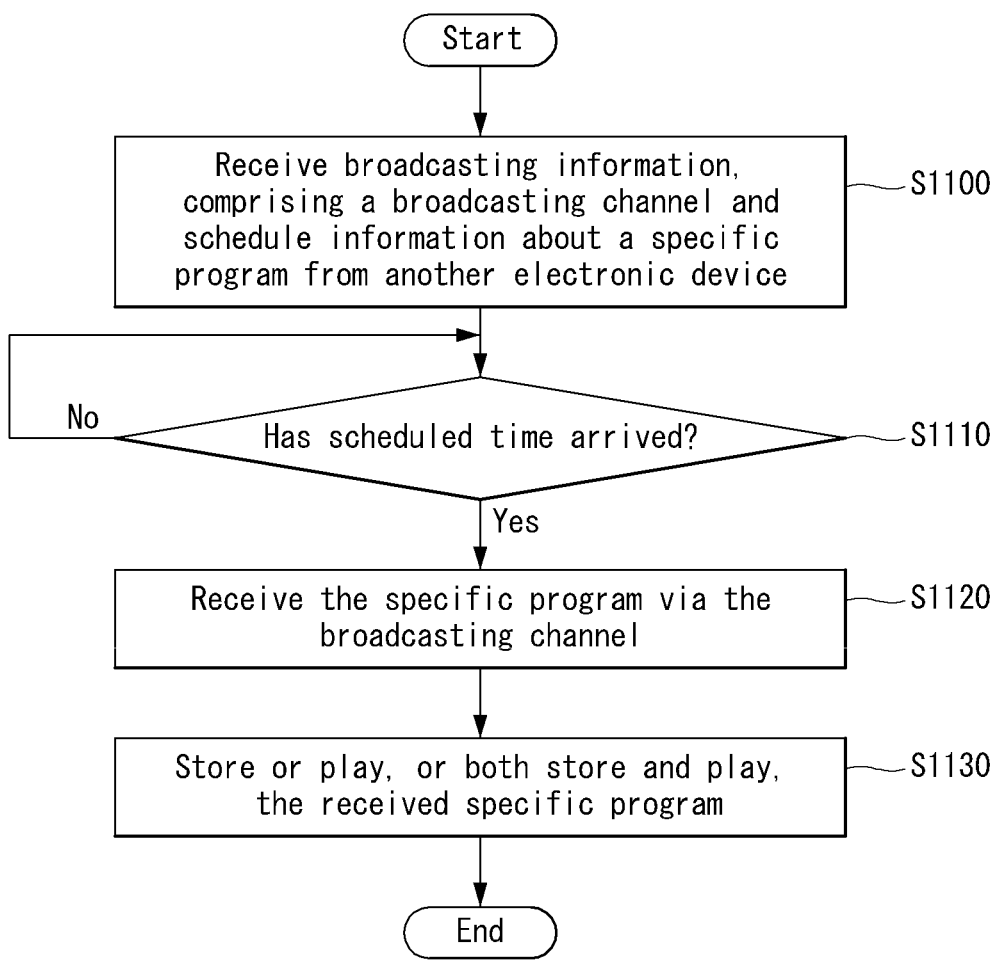
FIG. 39 is a flowchart illustrating a method of controlling an electronic device according to an eleventh embodiment of the invention.

FIG. 39 is a flowchart illustrating a method of controlling an electronic device according to the eleventh embodiment of this invention. The method of controlling an electronic device according to the eleventh embodiment of this invention may be implemented in each of the plurality of electronic devices 100 and 10a-10c described with reference to FIGS. 1 to 8. Hereinafter, the method of controlling an electronic device according to the eleventh embodiment of this invention and the operations of the third external electronic device 10c (FIG. 9C) for implementing the method are described in detail. However, the method of controlling an electronic device according to the eleventh embodiment of this invention may alternatively be implemented in each of the first external electronic device 10a (FIG. 9A), the second external electronic device 10b (FIG. 9B), and the electronic device 100 (FIG. 1).

Referring to FIG. 39, the third external electronic device 10c (FIG. 9C) may receive broadcast information, including a broadcast channel and schedule information about a specific program, from another electronic device at step S1100. The specific program is provided via the broadcast channel. A user may input the schedule information of the specific program in the electronic device and send the broadcast information, including the schedule information, to the third external electronic device 10c (FIG. 9C) automatically or manually.

The schedule information may include information about a detailed operation requested by a user in relation to the specific program. For example, the schedule information may include information related to a request for the specific program to be received at the time when the specific program is broadcasted. The schedule information may also include information related to a request that the broadcasted program be stored or played, or both stored and played, upon receipt of the broadcasted program.

As another example, the schedule information may include information related to a request that the specific program be received from a specific source at a preset time. The specific source may be a specific website that provides the specific program. The schedule information may also include information related to a request that the broadcasted program be stored or played, or both stored and played, upon receipt of the broadcasted program.

The third external electronic device 10c (FIG. 9C) may determine whether a scheduled time included in the schedule information has arrived at step S1110. If it is determined that the scheduled time has arrived, the third external electronic device 10c may receive the specific program via the broadcast channel at step S1120 and store or play, or both store and play, the received specific program at step S1130.

In one alternative, one program may be received based on the received schedule information and another program may be scheduled to be displayed at the same time. The third external electronic device 10c may divide the display unit 51c into two viewing portions and display both of the programs simultaneously.

Figure 40:
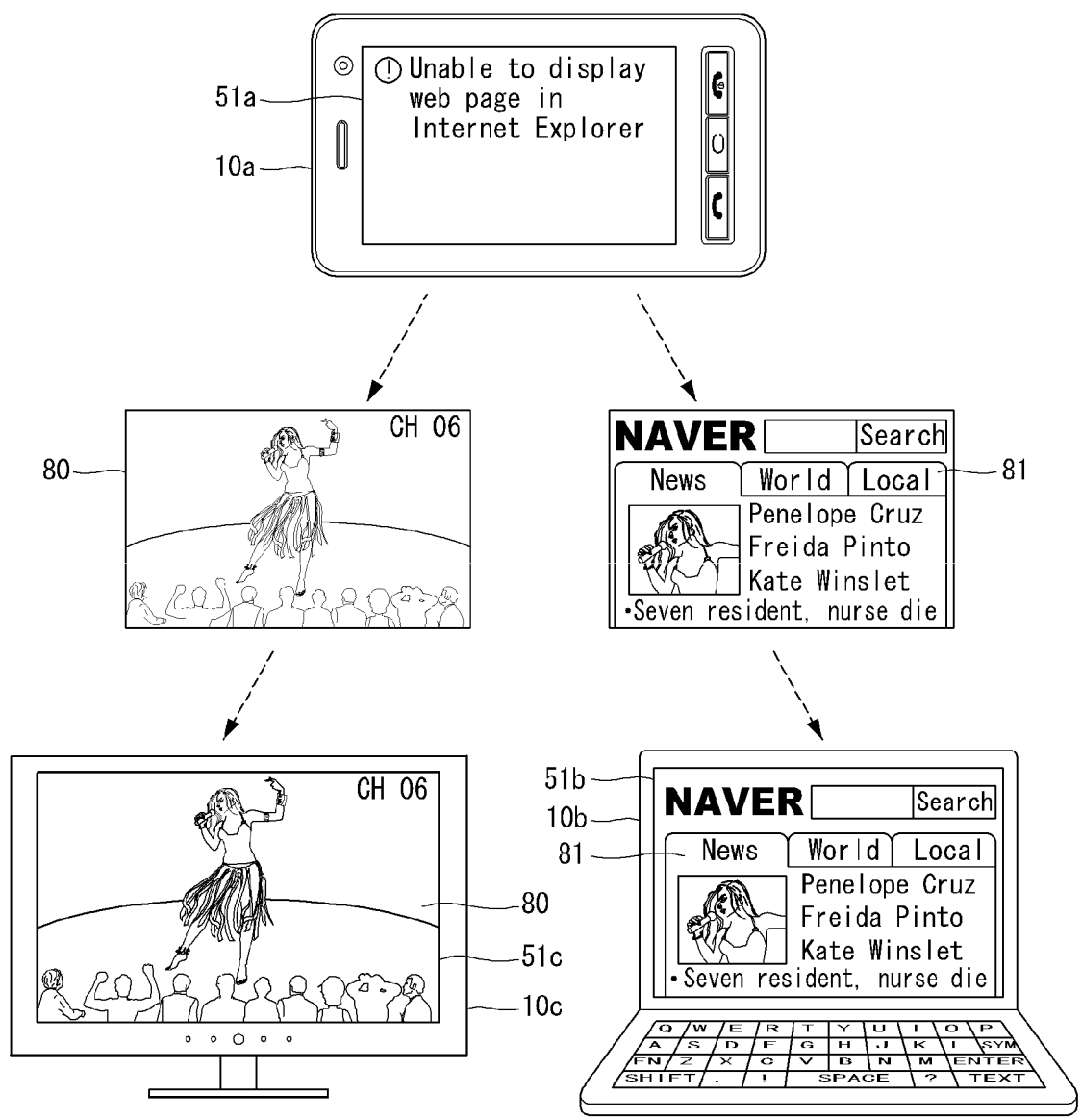
FIG. 40 is a diagram showing an example in which a first external electronic device automatically determines an electronic device to which information will be sent.

In the fifth to eleventh embodiments of this invention, the first external electronic device 10a (FIG. 9A) may send information about the one or more external sources to a predetermined electronic device according to a predetermined criterion. FIG. 40 is a diagram showing an example in which the first external electronic device 10a automatically determines an electronic device to which information will be sent. For example, at steps S500 and S510 (FIG. 26), when communication over the network 200 (FIG. 2) fails while the first external electronic device 10a receives and outputs the content, another electronic device may be automatically determined as a destination to which information about an external source will be sent based on the content or the information about the external source providing the content.

Referring to FIG. 40, when the content that was being played in the first external electronic device 10a before the communication failure occurred is a broadcast program 80, the first external electronic device 10a may send information about an external source providing the broadcast program 80 to the third external electronic device 10c. As an example, the information about the external source may be information related to a broadcast channel. The third external electronic device 10c may receive the information about the external source providing the broadcast program 80, receive the broadcast program 80 based on the received information, and display the received broadcast program 80 via the display unit 51c.

Referring again to FIG. 40, for another example, when content that was being played in the first external electronic device 10a before the communication failure occurred is a web page 81, the first external electronic device 10a may send information about an external source providing the web page 81 to the second external electronic device 10b. As an example, the information about the external source may be information related to a website providing the web page 81. The second external electronic device 10b may receive the information about the external source providing the web page 81 and display the web page 81 on the second display unit 51b based on the received information.

Figure 41:
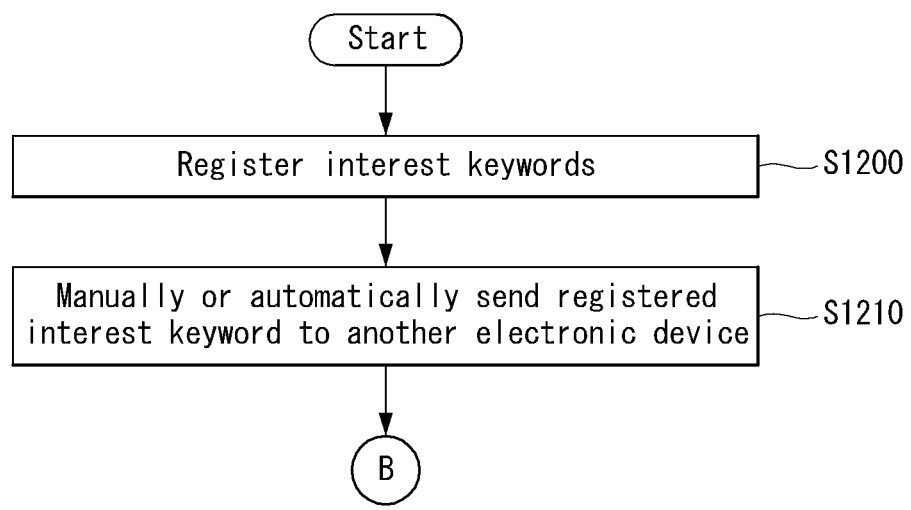
FIG. 41 is a flowchart illustrating a method of an electronic device sending information according to a twelfth embodiment of the invention.
Figure 42:
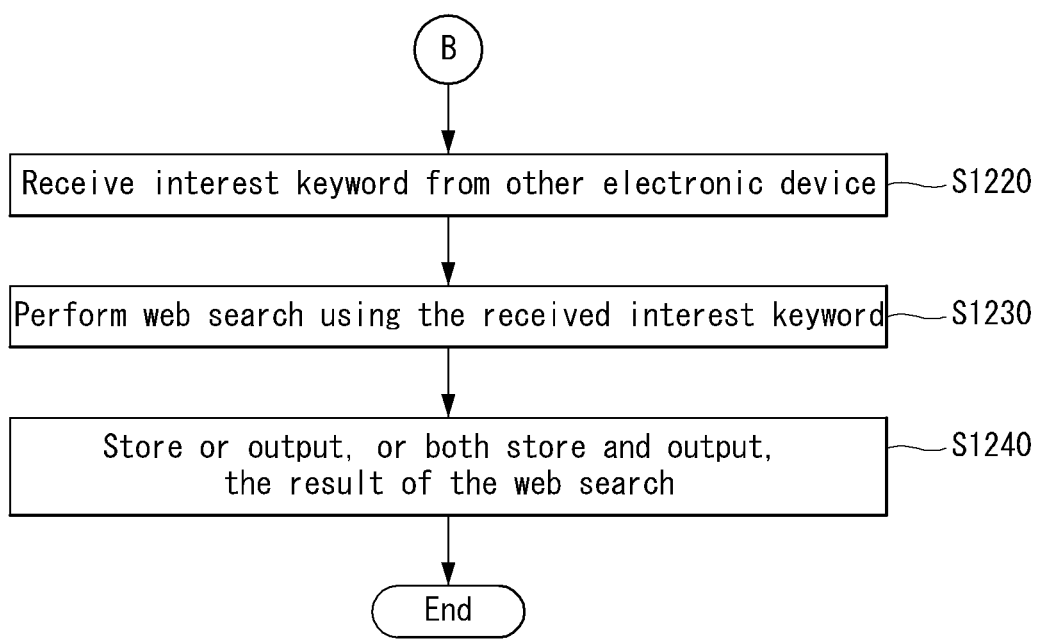
FIG. 42 is a flowchart illustrating a method of controlling an electronic device according to a thirteenth embodiment of the invention.
Figure 43:
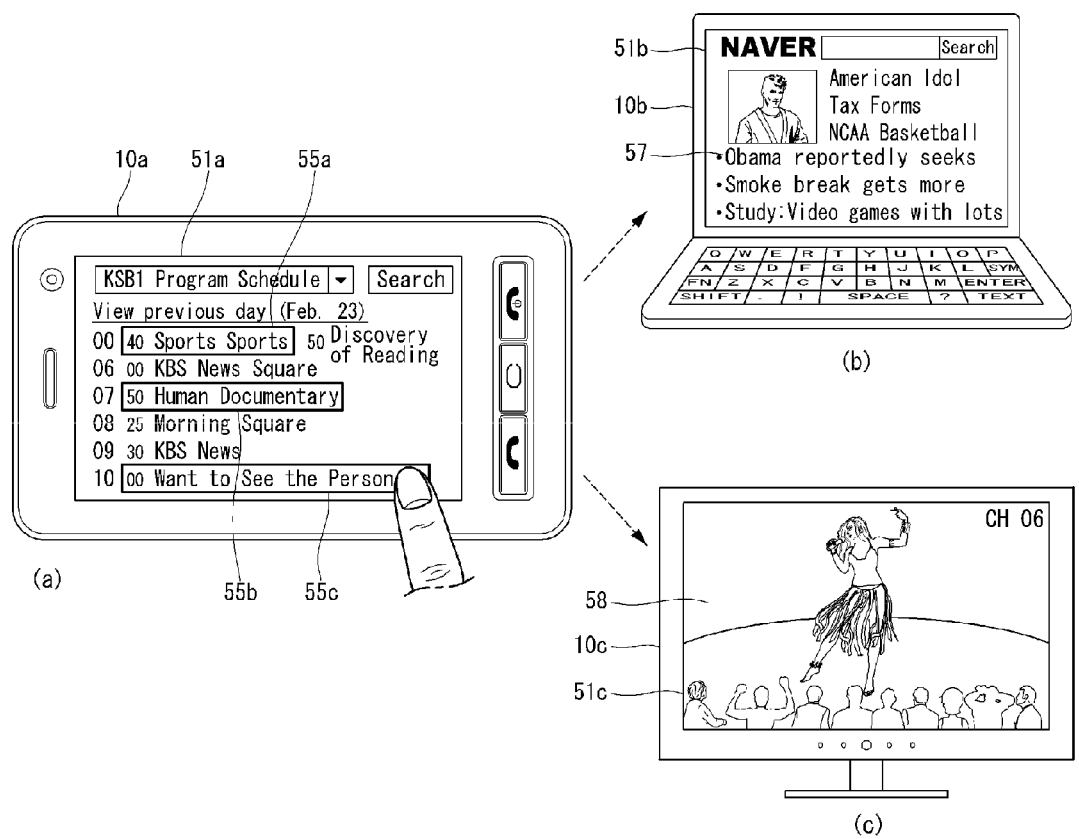
FIG. 43 is a diagram illustrating the twelfth and thirteenth embodiments of the invention.

FIG. 41 is a flowchart illustrating a method of an electronic device sending information according to a twelfth embodiment of this invention. FIG. 42 is a flowchart illustrating a method of controlling an electronic device according to a thirteenth embodiment of this invention. FIG. 43 is a diagram illustrating the twelfth and thirteenth embodiments of this invention.

The method of an electronic device sending information according to the twelfth embodiment of this invention and the method of controlling an electronic device according to the thirteenth embodiment of this invention may be implemented in each of the plurality of electronic devices 100 and 10a-10c described with reference to FIGS. 1 to 8. Hereinafter, the method of an electronic device sending information according to the twelfth embodiment of this invention and the operations of the first external electronic device 10a for implementing the method are described in detail. The method of controlling an electronic device according to the thirteenth embodiment of this invention and the operations of the second external electronic device 10b and the third external electronic device 10c for implementing the method are described in detail. However, the method of an electronic device sending information according to the twelfth embodiment of this invention and the method of controlling an electronic device according to the thirteenth embodiment of this invention may alternatively be implemented in another electronic device, not described herein, from among the plurality of electronic devices 100 and 10a-10c.

Referring to FIGS. 41 and 43, the first external electronic device 10a may register interest keywords therein at step S1200. In order to perform the step S1200, the first external electronic device 10a may provide various forms of user interfaces for registering the interest keywords.

FIG. 43(a) depicts an example of a screen in which a user registers interest keywords in the first electronic device 10. Referring to FIG. 43(a), the user may register the interest keywords by touching keywords 55a, 55b, and 55c that are displayed on the display 51a.

While the touch performed in FIG. 43(a) is not limited to a specific method, the touch may be performed according to a predetermined method. For example, when the touch of one of the keywords 55a, 55b 55c is a long touch, such as a touch for more than a predetermined amount of time, the touched keyword may be registered as the interest keyword. As another example, when the touch of one of the keywords 55a, 55b 55c is a multi-touch, such as two touches, the touched keyword may be registered as the interest keyword. The interest keyword registered at step S1200 may be stored in an external storage or in a memory included in the first external electronic device 10a.

The first external electronic device 10a may send the registered interest keyword to another electronic device manually or automatically at step S1210. At step S1210, the registered interest keywords can be sent to the second external electronic device 10b or the third external electronic device 10c, or to both the second external electronic device 10b and the third external electronic device 10c. However, specific electronic devices to which the registered interest keywords can be sent are not limited thereto.

Specific electronic devices to which the registered interest keywords can be sent may be automatically determined according to the type or characteristic of the registered interest keywords. For example, when the registered interest keyword is related to a broadcast, such as the title of a broadcast program that can be received via a broadcast channel, the registered interest keyword may be automatically sent to the third external electronic device 10c, which can access the broadcast channel. In another example, when the registered interest keyword is a common keyword that is not related to a broadcast, the registered interest keyword may be automatically sent to the second external electronic device 10b, which is configured for web search purposes.

In some embodiments, a user may select other electronic devices through a user interface provided in the first external electronic device 10a such that the registered interest keyword is sent to other electronic devices. As an example, the selected other electronic devices may include the second external electronic device 10b or the third external electronic device 10c, or both the second external electronic device 10b and the third external electronic device 10c.

Referring to FIGS. 42 and 43, the second external electronic device 10b may receive an interest keyword from another electronic device, which in this example is the first external electronic device 10a, at step S1220. The second external electronic device 10b may perform a web search using the received interest keyword at step S1230. The second external electronic device 10b may store or output, or both store and output, results of the web search at step S1240.

FIG. 43(b) depicts an example of a screen 57 on the display 51b of the second external electronic device 10b. The screen 57 displays results of a web search performed by the second external electronic device 10b using an interest keyword that was sent by the first external electronic device 10a that is depicted in FIG. 43(a).

The third external electronic device 10c may also receive the interest keyword from the first external electronic device 10a, as described above. The third external electronic device 10c, like the second external electronic device 10b, may perform a web search by using the received interest keyword. When the interest keyword is related to broadcast information, such as the title of a broadcast program, the third external electronic device 10c may receive a broadcast program corresponding to the interest keyword and play the received broadcast program.

FIG. 43(c) shows an example of a screen 58 on the display 51c of the third external electronic device 10c. The third external electronic device 10c receives a broadcast program corresponding to an interest keyword sent by the first external electronic device 10a of FIG. 43(a) and the screen 58 displays the received broadcast program.

Programs related to the method of controlling electronic devices, the method of sending information via an electronic device, and the method of transmitting and receiving information via the information system according to the embodiments of this invention may be recorded on a recording medium. The programs may be readable by a computer for execution of the programs and then provided to the electronic devices and/or the information system.

The method of controlling electronic devices, the method of the electronic device sending information, and the method of the information system transmitting and receiving information according to the embodiments of this invention may be executed via software. When the methods are executed via software, the elements of this invention are code segments that execute necessary tasks. The program or code segments may be stored in a processor-readable medium or may be transmitted through a transfer medium or a computer data signal combined with carriers in a communication network.

The computer-readable recording medium may include all types of recording devices on which data capable of being read by a computer system is recorded. For example, the computer-readable recording medium may include ROM, RAM, CD-ROM, DVD-ROM, DVD-RAM, magnetic tapes, floppy disks, hard disks, and optical data storages. The computer-readable recording medium may also have its codes, which are distributed into computer apparatuses connected over a network and readable by computers in a distributed manner, stored therein and executed.

Those having ordinary skill in the art to which this invention pertains may change and modify this invention in various ways without departing from the technical spirit of this invention. Accordingly, this invention is not limited to the above-described embodiments and the accompanying drawings. Further, the embodiments described in this invention should not be construed to be limitative from all aspects and some of or all the embodiments may be selectively combined in various ways.

In accordance with the electronic devices and the method of controlling the same according to this invention, there are advantages in that a more user-friendly user interface can be provided and a user can efficiently control the electronic devices and enjoy the same content in a plurality of electronic devices at the same time according to the characteristics of each of the electronic devices, in a system environment including the electronic devices that can communicate with each other.

Furthermore, in accordance with the electronic devices, the method of an electronic device sending information, the method of controlling the electronic devices, and the method of the information system transmitting and receiving information according to this invention, in a system environment including a plurality of electronic devices that can communicate with each other, information can be efficiently transmitted and received between the plurality of electronic devices, and the plurality of electronic devices can be efficiently controlled.

The foregoing embodiments and advantages are merely exemplary and are not to be construed as limiting this invention. The present teaching can be readily applied to other types of apparatuses. The description of the foregoing embodiments is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures. Moreover, unless the term "means" is explicitly recited in a limitation of the claims, such limitation is not intended to be interpreted under 35 USC 112(6).

What is claimed is:

1. An electronic device, comprising:
   a display unit having a middle region and a plurality of side regions surrounding the middle region;
   a transceiver configured to communicate with one or more external electronic devices;
   a proximity sensor configured to detect a first external electronic device of the one or more external electronic devices that is approaching the display unit; and
   a physical controller configured to:
      control the display unit to display information related to the one or more external electronic devices that are communicating with the transceiver in a first side region of the plurality of side regions;
      identify that the first external electronic device is approaching a second side region of the plurality of side regions based on information received from the proximity sensor;
      control the transceiver to receive, from the first external electronic device, content displayed by the first external electronic device and control the display unit to display the received content in the second side region;
      control the display unit to display the content in the middle region in response to a drag input from the displayed content in the second side region to the middle region; and
      control the display unit to display the middle region as having a different spatial depth than the plurality of side regions.

2. The electronic device of claim 1, wherein the display unit comprises a touch screen.

3. The electronic device of claim 1, wherein the controller is further configured to:
   detect a selection of a second external electronic device of the one or more external electronic devices via the first side region;
   control the transceiver to receive an image displayed on the second external electronic device in response to the detected selection; and
   control the display unit to display the received image.

4. The electronic device of claim 1, wherein the controller is further configured to:
   control the display unit to display an image in the middle region;
   detect a selection of a second external electronic device of the one or more external electronic devices via the first side region;
   detect a drag input of the image to the first side region; and
   control the transceiver to output a control signal to the second external electronic device, the control signal for displaying the image on the second external electronic device.

5. The electronic device of claim 1, wherein the controller is further configured to:
   control the display unit to display the content receiving the drag input from the second side region as appearing from an edge of the second side region and moving into the middle region during the drag input.

6. The electronic device of claim 5, wherein the controller is further configured to control the display unit to no longer display the information related to the one or more external electronic devices when a predetermined time elapses or the proximity sensor no longer detects the first external object.

7. The electronic device of claim 1, wherein:
   the controller is further configured to control the display unit to display a first spatial depth and a second spatial depth;
   the first spatial depth coincides with a first portion of each of the first and second side regions;
   the second spatial depth coincides with a second portion of each of the first and second side regions; and
   the middle region coincides with the first spatial depth.

8. The electronic device of claim 1, wherein:
   the display unit further comprises a third side region the plurality of side regions that is different from the first and second side regions;
   the controller is further configured to control the display unit to display, in the third side region, one or more images of an object of the image displayed in the middle region; and
   each of the one or more images displayed in the third side region displays a different viewpoint of the object than the image displayed in the middle region.

9. The electronic device of claim 8, wherein the controller is further configured to:
   detect a selection of one of the one or more images of the third side region; and
   replace the image displayed in the middle region with the selected image.

10. The electronic device of claim 8, wherein the controller is further configured to control the display unit to display the third side region as having the same spatial depth as the first side region and the second side region.

11. The electronic device of claim 1, wherein the information related to the one or more external electronic devices includes an activation state of each of the one or more external electronic devices.

12. The electronic device of claim 1, wherein the controller is further configured to:
    detect a selection of an object in the image displayed in the middle region of the display unit; and
    control the display unit to display detailed information related to the selected object in the second side region.

13. A method for controlling an electronic device, the method comprising:
    displaying a middle region and a plurality of side regions surrounding the middle region on a display of the electronic device;
    communicating with one or more external electronic devices via transceiver of the electronic device;
    detecting a first external electronic device of the one or more external electronic devices that is approaching the display via a proximity sensor of the electronic device;
    displaying information related to the one or more external electronic devices that are communicating with the transceiver in a first side region of the plurality of side regions;
    identifying, via a controller of the electronic device, that the first external electronic device is approaching a second side region of the plurality of side regions based on information received from the proximity sensor;
    receiving content from the first external electronic device via the transceiver, the content displayed by the first external electronic device;
    displaying the received content in the second side region;
    displaying the content in the middle region in response to a drag input from the displayed content in the second region to the middle region; and
    displaying the middle region as having a different spatial depth than the plurality of side regions.

* * * * *